US012731277B2

(12) United States Patent
Gupta et al.

(10) Patent No.: US 12,731,277 B2
(45) Date of Patent: Sep. 8, 2026

(54) METHODS AND APPARATUS FOR CAPTURING IMAGES AND USING IMAGES FOR DEPTH DETERMINATION AND/OR OTHER PURPOSES

(71) Applicant: More, Inc., San Mateo, CA (US)

(72) Inventors: Divya Gupta, Redwood City, CA (US); Rajiv Laroia, Far Hills, NJ (US)

(73) Assignee: More, Inc., San Mateo, CA (US)

(*) Notice: Subject to any disclaimer, the term of this patent is extended or adjusted under 35 U.S.C. 154(b) by 190 days.

(21) Appl. No.: 18/411,045

(22) Filed: Jan. 12, 2024

(65) Prior Publication Data

US 2025/0095181 A1 Mar. 20, 2025

Related U.S. Application Data

(63) Continuation-in-part of application No. 18/369,841, filed on Sep. 19, 2023.

(51) Int. Cl.

*G06T 7/593* (2017.01)
*G06T 5/50* (2006.01)

(Continued)

(52) U.S. Cl.

CPC ................ *G06T 7/593* (2017.01); *G06T 5/50* (2013.01); *G06V 10/60* (2022.01); *H04N 23/73* (2023.01);

(Continued)

(58) Field of Classification Search

CPC . G06T 7/593; G06T 5/50; G06T 2207/20221; G06T 2207/10152;

(Continued)

(56) References Cited

U.S. PATENT DOCUMENTS 5,528,645 A * 6/1996 Koivisto .................. H04N 5/32 378/98.7
9,122,946 B2 9/2015 Zhang et al.
(Continued)

OTHER PUBLICATIONS

Notification of Transmittal of the International Search Report and the Written Opinion of the International Searching Authority, International Search Report and Written Opinion of the International Searching Authority from PCT/US2024/047508, dated Nov. 25, 2024, 42 pages.

*Primary Examiner* — Iriana Cruz
(74) *Attorney, Agent, or Firm* — Straub & Straub; Michael P. Straub; Stephen T. Straub

(57) ABSTRACT

Methods and apparatus for illuminating scene areas to facilitate depth determination are described. A sequence of frames is displayed, e.g., projected, onto a scene area to illuminate the area for image capture. The sequence of frames includes a patterned frame followed by a concealing frame. The patterned frame and concealing frame are each displayed for no more than 1/60 of a second. The concealing frame maybe and sometimes does display a complementary pattern to the preceding patterned frame. When viewed sequentially by a human viewer the human sees a non-distracting uniformly illuminated scene area as a result of the effect of the concealing frame. One or more cameras are used to capture images of the illuminated area during a time in which the pattern is displayed and the scene area is effectively painted with a pattern that can facilitate depth determination based on one or more captured images.

20 Claims, 20 Drawing Sheets

(51) Int. Cl.
*G06V 10/60* (2022.01)
*H04N 23/73* (2023.01)
*H04N 23/74* (2023.01)

(52) U.S. Cl.
CPC ... *H04N 23/74* (2023.01); *G06T 2207/20221* (2013.01); *G06V 2201/07* (2022.01)

(58) Field of Classification Search
CPC .... G06T 7/521; G06V 10/60; G06V 2201/07; H04N 23/73; H04N 23/74; H04N 2013/0081; H04N 23/56; G03B 15/02; G03B 35/02; G03B 21/208
See application file for complete search history.

(56) References Cited

U.S. PATENT DOCUMENTS

| | | | |
|---|---|---|---|
| 9,270,876 | B2 | 2/2016 | Laroia |
| 9,282,228 | B2 | 3/2016 | Laroia |
| 9,374,514 | B2 | 6/2016 | Laroia |
| 9,426,365 | B2 | 8/2016 | Laroia et al. |
| 9,462,170 | B2 | 10/2016 | Laroia et al. |
| 9,467,627 | B2 | 10/2016 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,568,713 | B2 | 2/2017 | Laroia |
| 9,578,252 | B2 | 2/2017 | Laroia |
| 9,671,595 | B2 | 6/2017 | Laroia |
| 9,686,471 | B2 | 6/2017 | Laroia et al. |
| 9,736,365 | B2 | 8/2017 | Laroia |
| 9,749,549 | B2 | 8/2017 | Shroff |
| D802,646 | S | 11/2017 | Laroia et al. |
| 9,851,527 | B2 | 12/2017 | Laroia |
| 9,857,584 | B2 | 1/2018 | Singh et al. |
| 9,912,864 | B2 | 3/2018 | Laroia et al. |
| 9,912,865 | B2 | 3/2018 | Laroia et al. |
| 9,930,233 | B2 | 3/2018 | Singh et al. |
| 9,948,832 | B2 | 4/2018 | Laroia |
| 9,967,535 | B2 | 5/2018 | Laroia et al. |
| 9,979,878 | B2 | 5/2018 | Laroia et al. |
| 9,998,638 | B2 | 6/2018 | Laroia et al. |
| 10,003,738 | B2 | 6/2018 | Lautenbach et al. |
| 10,051,182 | B2 | 8/2018 | Pulli et al. |
| 10,075,651 | B2 | 9/2018 | Laroia et al. |
| 10,091,447 | B2 | 10/2018 | Laroia et al. |
| 10,110,794 | B2 | 10/2018 | Laroia et al. |
| 10,129,483 | B2 | 11/2018 | Shroff |
| 10,191,356 | B2 | 1/2019 | Laroia et al. |
| 10,225,445 | B2 | 3/2019 | Lautenbach |
| 10,306,218 | B2 | 5/2019 | Shroff et al. |
| 10,365,480 | B2 | 7/2019 | Laroia et al. |
| 10,491,806 | B2 | 11/2019 | Lai et al. |
| 10,670,858 | B2 | 6/2020 | Schmieder et al. |
| 10,931,866 | B2 | 2/2021 | Laroia et al. |
| 11,180,117 | B2 | 11/2021 | Maharshi et al. |
| 11,537,027 | B2 | 12/2022 | Maharshi et al. |
| 11,827,216 | B2 | 11/2023 | Hart |
| 11,846,940 | B2 | 12/2023 | Cutu |
| 12,067,740 | B2 | 8/2024 | Maharshi et al. |
| 2002/0149750 | A1 | 10/2002 | Kane |
| 2009/0011370 | A1 | 1/2009 | Nakamura et al. |
| 2010/0246989 | A1 * | 9/2010 | Agrawal .................. G06T 5/20 382/255 |
| 2012/0262600 | A1 * | 10/2012 | Velarde ................. H04N 23/73 348/223.1 |
| 2014/0078490 | A1 | 3/2014 | Higo et al. |
| 2014/0085398 | A1 * | 3/2014 | Tian ........................ H04N 7/15 348/14.01 |
| 2016/0253812 | A1 | 9/2016 | Grossinger et al. |
| 2018/0095165 | A1 | 4/2018 | Cohen et al. |
| 2019/0156557 | A1 * | 5/2019 | Gordon ................ G06V 10/145 |
| 2019/0394441 | A1 * | 12/2019 | Simek .................. H04N 13/271 |
| 2020/0382765 | A1 | 12/2020 | Gravante et al. |
| 2021/0195146 | A1 | 6/2021 | Christmas |
| 2021/0215476 | A1 | 7/2021 | Boisson et al. |
| 2021/0225136 | A1 | 7/2021 | Hare, Jr. et al. |
| 2021/0334992 | A1 | 10/2021 | Nistico |
| 2023/0296372 | A1 | 9/2023 | Wang et al. |
| 2024/0179281 | A1 | 5/2024 | Furui et al. |
| 2024/0331199 | A1 | 10/2024 | Laroia et al. |
| 2025/0097377 | A1 | 3/2025 | Gupta et al. |
| 2025/0097561 | A1 | 3/2025 | Laroia et al. |

* cited by examiner

METHODS AND APPARATUS FOR CAPTURING IMAGES AND USING IMAGES FOR DEPTH DETERMINATION AND/OR OTHER PURPOSES

RELATED APPLICATIONS

The present application is a continuation-in-part of U.S. patent application Ser. No. 18/369,841 which was filed on Sep. 19, 2023 which is titled: Methods and Apparatus for Illuminating Areas to Facilitate Depth Determination and which is hereby expressly incorporated by reference in its entirety.

FIELD

The present application relates to illumination, image capture and image processing techniques and, more particularly, to methods and apparatus for illuminating one or more areas to facilitate image taking, capturing of images and/or processing of images, e.g., for depth determination and/or other purposes.

BACKGROUND

Depth is useful in a wide range of applications. Depth is often used to refer to the distance to an object from a known point or location such as a camera position or position of a LIDAR device. Accordingly, in the context of depth determinations depth and distance are often used interchangeably and such terms will be used interchangeably in various locations in the present application.

Common applications for depth determination include device control operations relating to movement of a device. For example, depth information can be used to control a vehicle or robot to avoid obstacles, move to a desired location and/or navigate in an area. For example, in the case of vehicle control depth information may be used to control the vehicle to avoid obstacles in a road or path while the vehicle travels towards a desired destination. Similarly in the case of a robotic device depth information may be used to control movement of the robotic device in a factory or warehouse and/or movement of a robotic arm or other attachment to implement an operation such as pick up or move a package. Other applications for depth information include quality control operations such as the inspection of manufactured parts for defects. Such defects can include surface defects in the form of protrusions and/or cavities in an object. For example, inspections of welds are an example of one application where depth information can be used to determine if the weld is defective.

Various techniques for determining depth exist. For example, LIDAR, an acronym of "light detection and ranging" or "laser imaging, detection, and ranging", is a method for determining distance by targeting an object or a surface with a laser and measuring the time for the reflected light to return to the receiver. Radar is another technique for determining distance.

While such techniques can be useful, in particular applications LIDAR has the distinct disadvantage of requiring use of laser light. This can be particularly undesirable in various applications, such as in areas where humans are working and where the use of visible lasers can be distracting or even damaging to a human's eye depending on the intensity and/or duration of light exposure. In addition, LIDAR tends to produce what may be considered a low resolution depth, since it tends to produce far fewer depth measurement points than the number of pixels included in common images of a scene area. In such a case while the depth measurements may be accurate, the number of depth measurements tends to be sparse.

Radar, while not being visually distracting to humans, also has the disadvantage of producing relatively low resolution/sparse depth information, with the resolution often well below that achieved by Lidar systems and far below that achieved in many cases using stereoscopic depth determination techniques.

Thus, while radar and Lidar may be suitable for some applications, they suffer disadvantages that make them unsuitable for many applications particularly, where a large number of depth measurement points corresponding to an area or surface are desired.

Other ways of measuring depth often involve the use of cameras to capture images and analysis of captured images to determine depth, e.g., distance from a camera or known position relative to a camera used for image capture.

One technique for determining depth involves projecting a known geometric pattern showing an expanding grid or other set of fixed lines, e.g., straight and/or curving lines having a known spatial relationship. An image of the projected geometric pattern is captured using a camera, and the position of objects relative to the lines in the projected information provides rough position and thus distance information in some applications. Such systems can be implemented using a single camera and generally do not involve determining differences between images captured by different cameras, as is the case in stereoscopic depth determinations.

Because projected line patterns can be distracting to humans if they are visible, systems which depend on the projection of a line pattern often rely on the use of infrared light which is not visible to the human eye. While infrared cameras are available, they tend to be less common than visible light cameras and the need for infrared light sources and cameras can add to the cost of some products. More significantly however, such approaches which depend on the projection of lines to facilitate depth determination often result in high latency and/or low resolution results and limited range, which is not suitable for many applications.

Stereoscopic depth determination is a technique sometimes used to determine depth and often has the advantage of relatively high resolution in terms of the number of points for which depth can be determined in a given scene area. In at least some stereoscopic depth determinations two or more cameras, which are separated from one another, each capture an image of a scene area. The output of the cameras provides at least two different images of a scene area, corresponding to different camera positions, which can be compared. Differences between the images can be used to make depth determinations. As part of a stereoscopic depth determination process, portions of the images captured by different cameras, e.g., sets of pixels from each image, are compared. Information about the difference in the location of matching sets of pixels in the different images is used to determine distance to surfaces, e.g., surfaces of objects, in the captured images. A depth map in some cases is generated in the form of a set of distance values with each distance/depth being associated with a different pixel of a camera image, e.g., a reference camera image. Thus in at least some cases the depth, indicated in the depth map, indicates the distance from the reference camera to the object captured in the image, to which the pixel corresponds.

A depth map, generated using stereoscopic techniques, has the advantage that a depth can be determined for each pixel of an image in at least some cases. This stereoscopic based approach can often produce a much more detailed depth map than Lidar or radar, given the relatively large number of pixels in images captured by even low cost cameras that are available today.

While stereoscopic depth determination offers the possibility of a relatively high resolution/dense depth determination as compared to some other techniques, it often depends on the ability of capturing good quality images of a scene area for which depth determinations are to be made. In many locations, such as indoor applications, ambient light may not provide sufficient lighting for stereoscopic depth determinations. For example, while warehouse lighting might be satisfactory for human workers to perform warehouse tasks, normal warehouse lighting may be unsuitable for capturing images using many visible light cameras without additional lighting.

While simply adding bright ceiling lights or other lights to an area, e.g., a warehouse, might seem like a solution to the lighting problem associated with stereoscopic image capture, the use such lights can introduce problems in terms of reflections and/or result in the bright light saturating portions of a camera's image sensors.

Plastic wrap is commonly found on boxes or other packages. Reflections can occur due to the use of such plastic wraps or simply the presence of other reflective surfaces in a warehouse. In such a case the reflection of a bright ceiling light can overwhelm a camera sensor. In addition, direct reflections from lights may result in stereoscopic depth techniques determining the distance to the light source that is reflected from an object rather than the distance to the object reflecting the light.

While light reflection from bright ceiling lights or other light sources are one problem for stereoscopic depth determinations, large uniform surfaces present another problem. Such surfaces can often be found in a variety of indoor and outdoor environments. For example, walls of buildings and rooms are often painted a uniform color or boxes of uniform color are stacked together. Since stereoscopic depth determination involves matching a small region in one image to a corresponding region in another image areas of uniform color can make the pixel matching process difficult and often lead to inaccurate results with mismatches being made between areas in the different images. Thus, uniform surfaces appearing in images can, and sometimes do, lead to errors in depth/distance predictions.

For stereoscopic depth determination purposes, it is desirable that captured images have variation within the image. While painting walls or surfaces to be non-uniform in appearance may facilitate stereoscopic depth determinations, such painting can be costly and, in some cases, may lead to an appearance which is unsightly or distracting to people working in the area where such painting is applied.

From the above it should be appreciated that stereoscopic depth determination can be desirable for many applications, but that there is a need for improved methods of illuminating an area to facilitate stereoscopic depth determinations. It would be desirable if methods and/or apparatus could be developed which could be used to facilitate stereoscopic image capture and/or stereoscopic depth determinations while allowing other images to be captured or generated for various other applications such as training of models used to detect objects in 2D images.

It is desirable that at least some of the methods and/or apparatus operate using visual light and/or visible light cameras without causing distractions to humans in the area.

While improved illumination methods are desirable, it is also desirable that one or more methods of capturing and/or generating images which do not include patterns be developed. In particular it would be desirable if it were possible to develop methods and apparatus which allowed for the capture of images including patterns and images without patterns of the same objects be developed and/or that methods and apparatus be developed for generating non-patterned images from images of objects including patterns be developed so that both patterned and non-patterned images of objects be available for various applications or uses.

SUMMARY

In some embodiments an illumination device illuminates an area with visible light. This involves projecting an illumination image pattern followed by projecting a concealing image pattern.

A consistent illumination pattern may be projected during an illumination time period followed by projection of a consistent concealing pattern during a concealing time period. However, in other embodiments, e.g., some digital light projector (DLP) embodiments, the projection of the illumination and/or concealing pattern is achieved by projecting different images during individual sub-frame time periods with the composite of the patterns during the sub-frame time periods of the illumination time period resulting in the illumination pattern being displayed and the composite of the patterns projected during the concealing pattern sub-frame time periods resulting in the concealing pattern being displayed.

Thus, in some but not all embodiments, projecting an illumination image pattern may, and sometimes does, involve projecting a set of image patterns, e.g., with different sub-frame image patterns being projected in sub-frame time periods. The set of image patterns projected during the illumination pattern time period will result in a camera, capturing an image with an exposure matching the illumination pattern time period, capturing an image including the illumination pattern. The time in which the illumination image pattern is projected, e.g., by displaying a single consistent pattern or series of sub-frame patterns corresponding to the illumination pattern, is referred to as a pattern illumination time interval or illumination frame time.

An illumination image pattern may occupy all or a portion of a projected image frame.

Projection of the illumination image pattern by the illumination device is followed by illumination, e.g., of the same area, with a concealing image pattern used to conceal the illumination pattern from a human observer. Projecting a concealing image pattern may involve projecting a consistent pattern during a concealing pattern time period. However, in some embodiments projecting a concealing image pattern involves projecting a concealing set of image patterns, e.g., with different concealing sub-image patterns being projected in different sub-frame time periods of the concealing pattern time period/concealing pattern frame time. The concealing set of image patterns will be perceived by a viewer as displaying the concealing image pattern. The time in which the concealing image pattern is displayed, e.g., by displaying a single consistent concealing pattern or concealing series of sub-frame patterns, is referred to as a concealing pattern time interval or concealing frame time. The concealing image pattern may occupy all or a portion of a projected image frame.

In some embodiments, where the illumination image pattern does not occupy the full frame projected during an illumination time period, the concealing image pattern will normally occupy the same portion of the concealing frame that was occupied by the illumination pattern in the illumination frame.

A pattern refers to a spatial variation of local light intensity in the projected image. The pattern or patterns projected during the concealing pattern time interval help conceal from a human observer the pattern or patterns displayed during the illumination pattern time interval. This is because the pattern or patterns displayed during the concealing pattern time interval, when combined with the pattern or patterns displayed during the illumination pattern time interval, tend to average to what is generally perceived, at least locally, as uniform illumination of the scene. Locally uniform illumination implies that the light intensity does not abruptly change over small regions of the scene but can smoothly vary across a big region of a scene.

In many locations in the current document for purposes of explanation, the illumination pattern time interval and the concealing pattern time interval will be referred to as frame times. For simplicity of implementation, the illumination pattern frame time and concealing pattern frame time normally have the same duration. However, this is not a requirement for all embodiments and in some embodiments the illumination pattern frame time and the concealing pattern frame time (e.g., duration) are different.

Humans and camera devices normally capture light over a period of time and the image that is captured or perceived depends on the time period over which the light is captured. By following an illumination pattern time period with a concealing pattern time period the light observed during the time interval including both the illumination pattern time period and concealing time period will be generally perceived by a human observer as providing locally uniform illumination of a scene.

By keeping the illumination frame time and concealing frame time short, e.g., less than 1/60 of a second, a human will not perceive the different patterns but will rather perceive a generally uniform or locally uniform illumination of the area which is illuminated by the illumination pattern and concealing pattern. That is, the display of the concealing pattern, which is nominally the inverse of the illumination pattern, will effectively conceal to a human the illumination pattern being projected during the illumination pattern time period. A camera having an exposure time corresponding to just the illumination frame time will result in a captured image showing the illumination pattern while a camera having an exposure time corresponding to just the concealing pattern frame time will result in a captured image showing that includes the concealing image pattern. Either the illumination pattern or the concealing pattern can be used for depth determination purposes.

It should be appreciated that the exposure time of a camera can be controlled or selected so that the exposure time of a camera can be relatively short allowing a camera to be used to detect patterns that are not observable to the human eye due to a humans inability to distinctly recognize patterns that are displayed for a short period of time, e.g., less than 1/60th of a second. Thus, a camera can capture an image of a pattern displayed during an illumination frame time or concealing frame time which may not be observable to a human view given the short time period in which the individual pattern is displayed.

While for depth determination purposes it is desirable to capture a pattern in an image, for other applications the presence of an illumination pattern in a captured image can be undesirable. Applications in which it can be undesirable to include an illumination pattern in a captured image include 2D model training for object recognition purposes. In such applications, it is desirable that the images of objects not include patterns, due to projection of patterned light, since this can interfere with observation of an object's actual features. For work areas in which humans are located, human visible illumination patterns can be undesirable since a patterned illumination of a scene can be very distracting to a human observer. Following display of an illumination pattern with a concealing pattern can be useful in allowing the capture or generation of non-patterned images while also reducing or avoiding distractions that might otherwise be caused to a human observer if a constant light pattern was continuously used to illuminate an area for a long period of time.

From the above, it should be appreciated that it is desirable to capture an image pattern used to illuminate objects for depth determination purposes but may be desirable to avoid capturing such a pattern for other applications. In many cases, it is desirable to avoid illumination patterns caused by lighting in images which are intended for machine learning, visualization, and/or other purposes. In particular, illumination patterns are undesirable in many cases where 2D images are intended to be used for object recognition model training and/or model inference (e.g., prediction) purposes where an object is to be recognized using a previously trained model. Various other uses for non-patterned images also exist. Accordingly, it is desirable to avoid illumination patterns in images when the images are intended for machine learning, visualization, and/or other purposes where a light pattern, due to the illumination of an area using patterned light, is undesirable.

It can be desirable to generate a set of images which can support both depth determination and model training, e.g., by including one or more images of an object including a lighting induced pattern and one or more additional images of the same object without a lighting induced pattern. The images with the lighting induced pattern can be used to provide information about the physical size and shape of an object, e.g., as determined by stereoscopic image processing or other depth determination techniques, while the corresponding non-patterned image or images of an object can be used for 2D model training purposes. By capturing images of objects which are suited for both depth determination and model training, e.g., 2D model training, a reliable set of data can be produced associating physical object size information with a corresponding 2D model that can be used for object recognition and/or other purposes. Depth information generated from images of objects with illumination patterns shown thereon, provides information about the size and/or dimensions of an objects. This information can be, and sometimes is, used in determining relative proportions or shapes with such information then being used in some embodiments to generate a 3D model of an object. The generated 3D model of an object can be, and sometimes is, then associated with a model (e.g., 2D model) which can be used to perform object recognition based on one or more 2D captured images.

The image illumination and capture methods thus allow for the capture of images which are well suited for providing 3D modeling information, e.g., depth information, along with images that are well suited for training recognition models which are used to support recognition of objects based on one or more 2D images. The 2D and 3D models and information corresponding to an object can be, and sometimes are, then associated or stored together for future use, e.g., in recognizing the same or similar objects.

In various embodiments camera exposure time and/or synchronization with the illumination light source, e.g., a light projector, are controlled to capture one or more images in which a pattern from the illumination light source is visible. In addition, in some embodiments exposure time and/or synchronization with the illumination device is controlled in a camera so that the camera captures an image in which an illumination pattern is not visible and/or to generate an image in which an illumination pattern is not visible.

While exposure time of a camera is sometimes controlled so that a captured image does not include an illumination pattern, e.g., a light pattern projected during an illumination frame time period, in other embodiments a non-patterned image of an illuminated object or area is generated by combining images of the illuminated area or object. For example an image captured by a camera corresponding to an illumination frame time period can be combined with an image captured by the same camera corresponding to an illumination frame time to produce a non-patterned image which is the same or similar to what would have been captured if the exposure time of the camera was controlled to have an exposure corresponding to the combination of the illumination frame time period and concealing frame time period.

In at least one embodiment one or more captured images including an illumination pattern or concealing pattern are combined to generate a non-patterned image of an object or area. The non-patterned image is stored with the patterned image so that the resulting set of images is a set of images well suited for 3D model training, 2D model training and/or a wide variety of applications where it might be desirable to have some images of an object with an illumination pattern shown thereon and other images of the same object without an illumination pattern being shown on the image of the object.

In various embodiments a digital light projector is used to project the illumination frame during the illumination frame time and the concealing frame during the concealing frame time. During different sub-frame time periods of the illumination frame time different illumination sub-frame patterns are displayed by controlling pixel elements to be either in an on state or off state. The composite result, e.g., averaging the light output of the pixel elements during different subframes of the illumination frame time, results in the illumination pattern of the illumination frame being perceived. During different sub-frame time periods of the concealing frame time different concealing sub-frame patterns are displayed by controlling pixel elements to be either in an on state or off state. The composite result, e.g., averaging the light output of the pixel elements during different subframes of the concealing frame time, results in the illumination pattern of the illumination frame being perceived. The digital light projector is able, in some embodiments, to display sub-frame images at a rate of hundreds or even thousands of sub-frames per second resulting in the digital light projector being able to support a wide range of illumination frame and concealing frame patterns.

While use of a digital light projector may involve the use of multiple sub-frame patterns to achieve an overall illumination corresponding to a desired illumination pattern of an illumination frame time period, by following the display of the sub-frames corresponding to an illumination pattern frame with the sub-frames of a concealing pattern frame concealment of the illumination pattern can be achieved.

In some embodiments the patterned and non-patterned images of an object which are captured or generated are stored together in memory. The images of an object can be, and sometimes are, stored with, or associated with, both 2D and 3D object recognition models corresponding to the captured object. Thus, a memory or other storage device in some embodiments stores the captured or generated images and/or one or more models generated from such images can support a wide range of applications as well as potential updating of the stored models based on additional images which may be used in combination with one or more stored images to update the models.

Various embodiments can include one or more of the above-described features. Thus, it should be appreciated that not all embodiments include the full set of features discussed above.

Numerous variations on the above-described methods, apparatus and applications are possible with details of various exemplary embodiments discussed below in the detailed description which follows.

DETAILED DESCRIPTION

Figure 1:
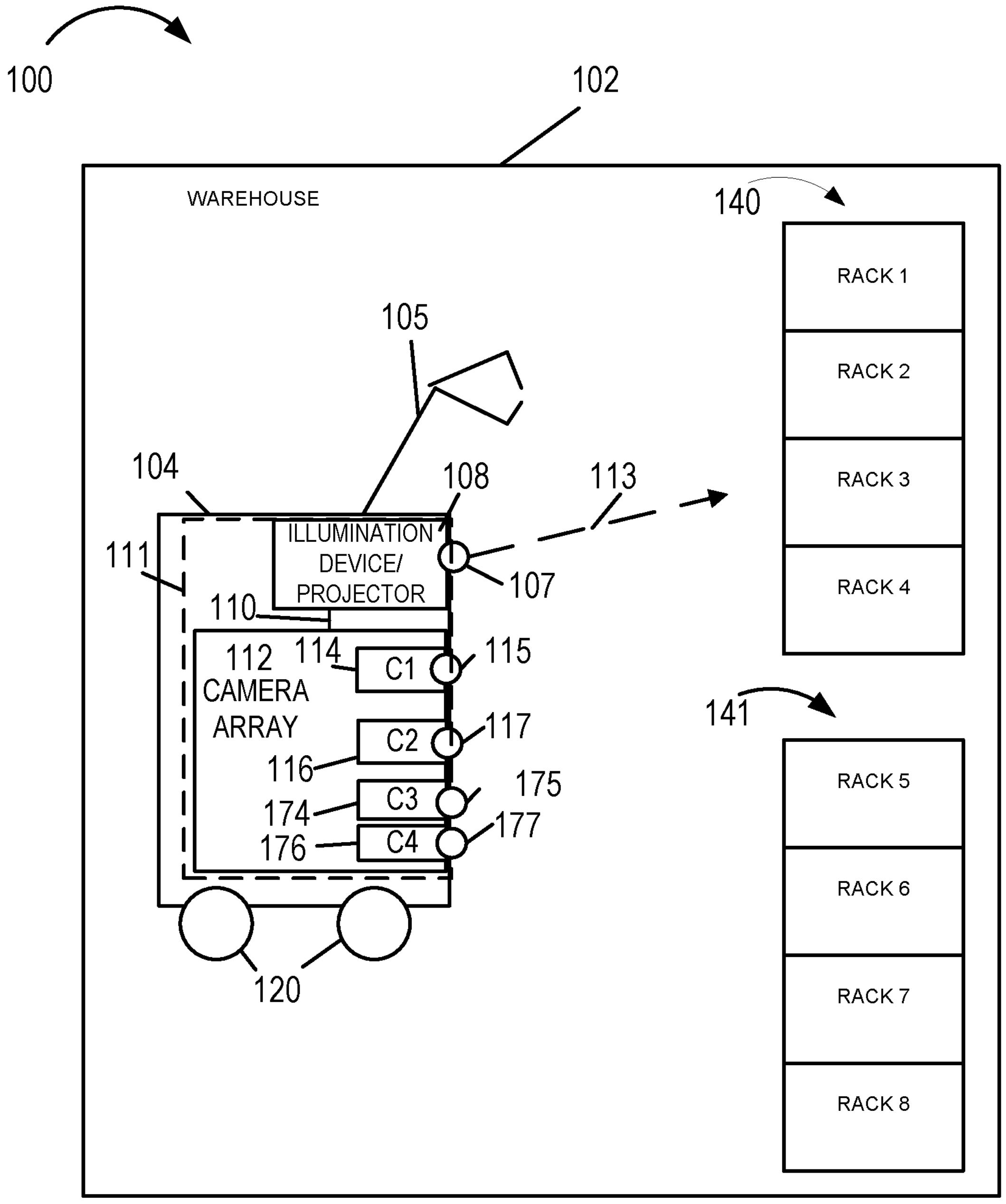
FIG. 1 is a diagram showing an exemplary apparatus including an illumination device and image capture system implemented in accordance with one embodiment of the invention in an environment where the apparatus may be used.

FIG. 1 is a diagram 100 showing a warehouse 102 in which a robotic device 104 with a controllable arm 105 and wheels 120 can move. The warehouse 102 includes a first set of racks 140 and a second set of racks 141 including shelves on which boxes or other items are stored and which can be picked or moved by the robotic device 104, e.g., to satisfy a customer order.

While explained in the context of a robotic device, it should be appreciated that the illumination system and/or camera capture system can be used in a wide variety of application including station applications such as where monitoring of items, e.g., manufactured products, is performed for quality control purposes or where a stationary robot used in manufacturing items is located. In such cases the illumination device 108 and/or camera array 112 may be mounted in a stationary or movable mount which can be part of or separate from the robot or other device in the area being monitored. In some embodiments the robotic device 104 is a vehicle with a pick arm 105.

The robotic device 104 includes an illumination and stereoscopic camera system 111 implemented in accordance with the invention. The illumination and stereoscopic camera system 111 includes an illumination device 108 and one or more cameras C1 114, C2 116. The illumination device 108 in some embodiments is a light projector which can project images through lens 107. The images are in the form of frames which display a pattern. The displayed images are used in accordance with the invention to illuminate an area, e.g., a portion of the warehouse 102 including the racks 140 on which boxes may be, and sometimes are, positioned. In some embodiments the illumination device 108 is collimated light projector, but collimated light is not used in all embodiments. The system can include multiple illumination devices. In some embodiments the system 104 includes a second illumination device/light projector (ID/LP2) 109 in addition to the first illumination device 108. The individual illumination devices 108, 109 are each positioned in some embodiments adjacent to one of the multiple cameras 114, 116. Thus, in some embodiments each camera 114, 116 is paired with a physically adjacent light projection device 108, 109. Both light projection devices 108, 109 can be, and sometimes are, implemented in the same manner. The light projection devices 108, 109 can output the same or different images. In some embodiments the light projection devices 108, 109 each include multiple light emitting elements 103, 105.

Figure 22:
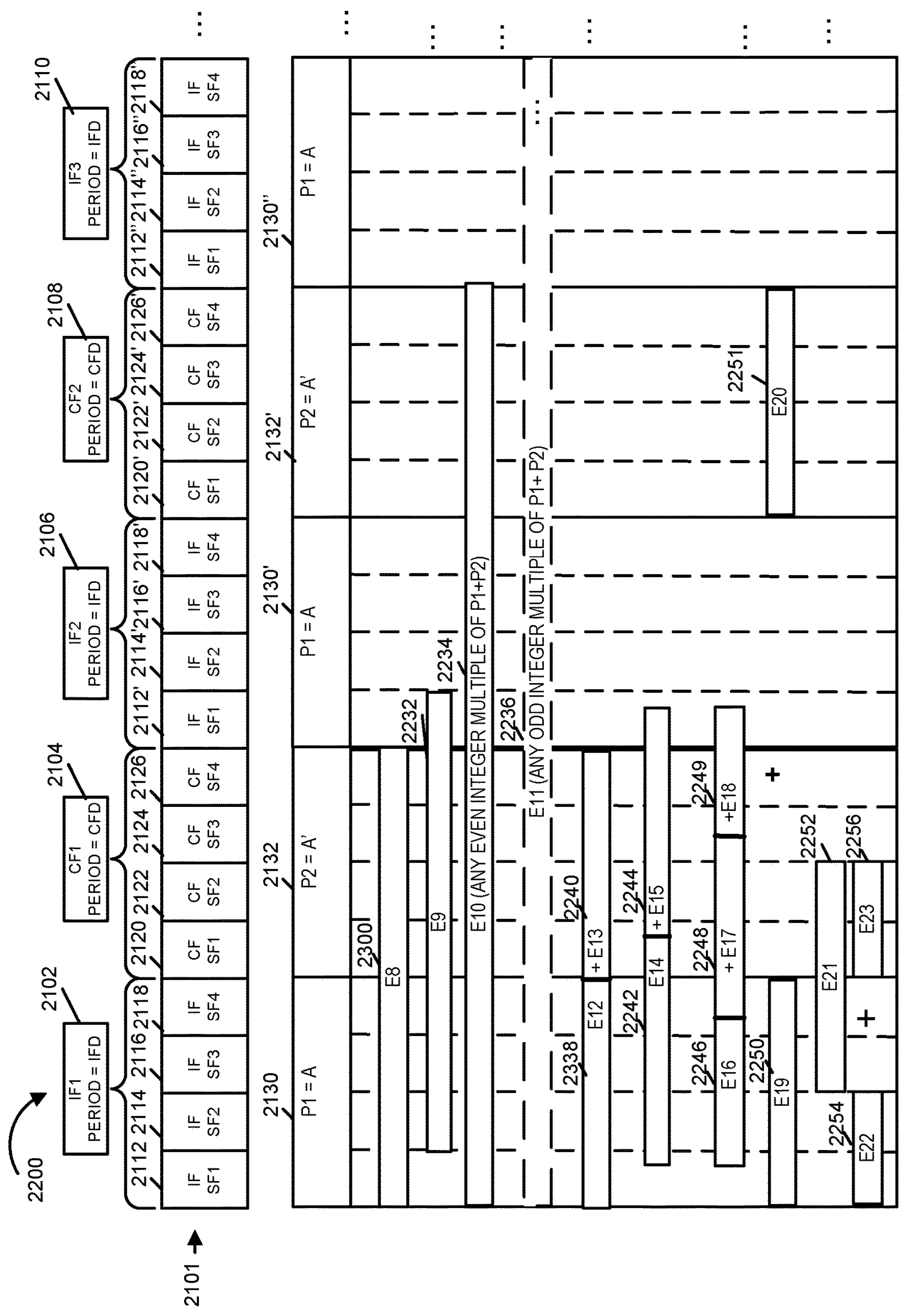
FIG. 22 shows various exposure times and/or exposure start times relative to display of illumination and concealing frames that will result in an image not showing an illumination pattern being captured and/or showing how a non-patterned image can be generated by combining multiple images which each include a visible illumination pattern.

In some embodiments in which collimated light is used the rays 113 of light are directed at an angle which is not a right angle (an angle which is not a 90 degree angle) relative to the vertical and horizontal surfaces in the warehouse 102 to reduce the risk of reflections of light off the vertical and horizontal surfaces being reflected directly into the lenses 115, 117 of the cameras C1 114, C2 116 from the walls, floor, ceiling and sides of boxes on the racks 140, 141. In various embodiments the apparatus 104 further includes one or more additional cameras C3 174 and C4 176. Camera C3 174 includes lens 175 while camera C4 includes lens 177. Cameras C3 174 and/or C4 176 can capture images of an illuminated area and/or object illuminated by illumination device 108 in parallel or asynchronously with the image capture performed by cameras C1 114, C2 116. In some cases one or more of the additional cameras C3 174, C4 176 are used to capture images, e.g., images which are in addition to images captured by cameras C1 114 and C2 116. The images captured by the additional cameras C3 174 and C4 176 can have different exposure times and/or occur at different times that the times at which images are captured by cameras C1 114 and C2 116. In some embodiments cameras C3 174 and/or C4 176 are used to capture images which have an exposure time which is selected or controlled so that the illumination pattern included in an illumination frame or concealing frame will not be visible in the captured image and/or to capture images which when combined will produce an image in which a pattern is present in an illumination frame and/or concealing frame will not be visible. While in some cases additional images captured by cameras C3 174 and C4 176 are combined to produce an image in which an illumination pattern is not visible in other cases one or more images captured by one of the additional cameras C3 174 or C4 176 are combined with an image or images captured by one of the cameras C1 114, C2 116 which are used for stereoscopic depth determination. The non-patterned images captured or generated from images captured by additional cameras C3 174 and/or C4 176 are well suited for 2D model training and/or object recognition applications and can be associated with depth information generated based on the stereoscopic depth determinations made based on images captured by cameras C1 and C2 114, 116. In some embodiments cameras C1 and/or C2 114, 116 are used to capture images which do not include the illumination pattern and/or to generate images which are combined to produce an image in which an illumination pattern projected by the illumination device 108 is not visible. Various techniques for capturing images which do not show the illumination pattern included in an illumination frame and/or which do not show a pattern included in a concealing frame or the images included therein are shown in FIG. 22 and discussed with regard to that Figure.

The light projector 108 is shown coupled to the camera array 112 by connection 110. The connection 110 can be a wired or wireless connection and is optional. The connection 110 is used in some embodiments to synchronize the light projector display frame rate with the image capture rate of the cameras C1 114 and C2 116 of the camera array 112. While two cameras are shown, more cameras may be used, and the camera array 112 includes 3 or more cameras, in some embodiments, to facilitate stereoscopic image capture. In cases where structured lines are projected and stereoscopic depth determination is not used, a single camera C1 114 may be used instead of multiple cameras C1 114, C2 116.

The light projector 108 in some but not all embodiments is a digital light projector (DLP) capable of projecting different images at a rate of 100s or even thousands of images per second. In such a case, individual light emitting elements of the DLP 108 are normally set to a full on or full off output during each image display period which is sometimes referred to as a sub-frame time period. The average light output corresponding to a pixel is controlled by displaying multiple sub-frames within a frame period with the viewer perceiving the average light output corresponding to a pixel as the intensity of the pixel. In the case of a monochrome DLP device, an on pixel normally corresponds to a DLP output set to maximum (full on—e.g., white in the case of a black and white image) for that pixel and an off pixel corresponds to a DLP output set to 0) (black in the case of a monochrome black and white image) for the corresponding light emitting element or elements. In the case of color, in the case of a DLP illumination device 108, the DLP illumination device has different sets of light emitting elements for each color with the light emitting elements being controllable so that different color combinations are possible but with each of the light emitting elements normally being in either one of an on or off state at any given time.

In order to achieve various illumination patterns, in the case of a DLP illumination device 108, the images output by the DLP device 108 during a frame time, i.e., the multiple sub-frames corresponding to a frame time, are controlled so that the average light output achieves the desired image pattern that is to be displayed.

In the case of non-DLP illumination devices capable of supporting different levels of light output for different pixels over consistently over a frame time, the projected image output by the illumination device 108 will be consistent over the duration of the entire frame but this may not be the case for a digital light projection device since different patterns, e.g., on/off pixel combinations, may be displayed during different sub-frames to achieve the desired illumination pattern to be displayed during a frame time.

While the illumination device 108 and cameras C1 114, C2 116, C3 174, C4 176 are facing in the same general direction, the illumination device 108 directs light 113 in a direction intended to minimize the chance of direct reflections being returned into the cameras C1 114, C2 116, C3 174, C4, 176.

In some, but not necessarily all, embodiments a Collimated light projector 108 is used to project the image patterns using visible light. The parallel or generally parallel light 113 output by the Collimated light projector reduces the risk of unwanted reflections from the light projector directly back into one or more camera lenses used to capture images. To further reduce the risk of reflections directly into a camera, in some embodiments, the illumination source 108 is directed so that it projects light at an angle, other than a 90 degree angle, relative to the vertical and horizontal planes of the environment in which illumination and observation operations are being performed. This is because in real world environments walls, ceilings and floors, as well as racks and stacks of boxes often tend to have flat horizontal or vertical surfaces, e.g., relative to the ground, off of which light can reflect. By directing light at an angle to such surfaces, light reflected by such surfaces is likely to be directed away from the cameras used to collect such light rather than directly into the cameras particularly where the cameras and illumination device are mounted on the same apparatus and oriented in the same or generally same direction. While light reflected by surfaces preferably does not get reflected directly back to the camera, light diffused by illuminated surfaces will be captured by the camera(s) and is well suited for use in making depth determinations.

Thus, in some embodiments the illumination device 108 which may be, and sometimes is, a light projector is oriented in a manner that reduces the risk of reflections directly back into the camera and increases the chance that light diffused by the surface of objects illuminated by the light projector will be captured and observed without overwhelming the sensor of the camera(s).

In some embodiments, there may be multiple light projector devices that are used to illuminate a scene. The light projector devices may or may not overlap in certain regions. There is no requirement for the light projectors to be synchronized with respect to each other or with respect to the camera for stereo depth determination. In some embodiments, one or more light projector devices may be set to the same display rate or a multiple of the other light projector devices so that a non-stereo camera system can observe a uniform illumination pattern by setting an appropriate exposure time and without overexposing the image. In some embodiments, the light projector devices and cameras may be synchronized to achieve maximum pattern contrast. In some embodiments, the projectors may be synchronized to display the same non-pattern frame so that an image can be captured by a non-stereo camera system.

The location of the projector(s) relative to the camera need not be calibrated or even fixed for a stereoscopic system. It can be advantageous to locate the projector as close as possible to the one of the cameras used for depth determination, ideally the camera used as a reference camera when making depth determinations. This positioning is in order to have maximal overlap between the shadow regions created by the projector (where the pattern illuminated by the projector is not visible in the scene and cannot aid depth determination) and the occlusion regions of the camera. In some embodiments, the projector optics and orientation may be selected such that the display region of one or more projectors approximately matches the field of view of the camera so that the projector pattern can aid depth determination across the whole image. In some embodiments, the projector design may be selected so that the illuminated area covers a region of the image where depth determination is most relevant or most challenging.

Figure 3:
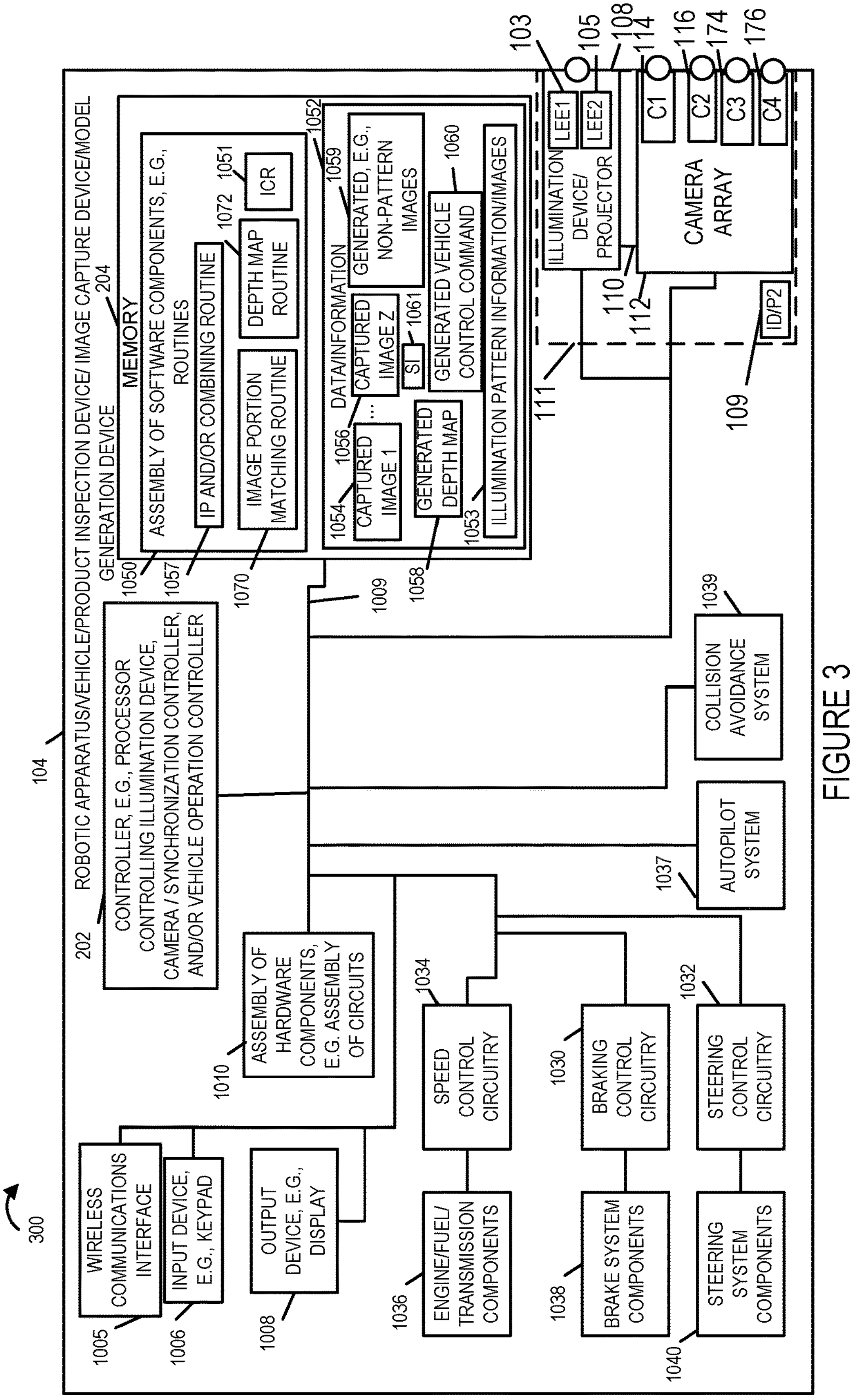
FIG. 3 is another diagram showing the exemplary apparatus shown in FIG. 1 in greater detail.

In the FIG. 3 example, the illumination devices 108, 109 are physically adjacent the cameras 114, 116 so that the illumination area of each illumination device closely matches the image capture area of the corresponding camera or pair of cameras 114, 116. In some embodiments a single illumination device 108 is used but more than one illumination device may be used.

While a collimated light source 108 is used in some embodiments, in other embodiments the illumination device 108 is a simple projector, e.g., a digital or analog projector, capable of projecting the patterns to be used for illumination purposes and to support depth determinations.

It is advantageous for the projection device to match the scanning mode of the capture device. For a global shutter capture device, it is best for the projector to display all pixels in the image as a global update (or have a fast enough scan rate to appear as a global update) rather than by sequentially updating every row or column in a rolling or scanning fashion. Otherwise, the projected image may show the original pattern in one portion of the image and the concealing pattern in the other. In some embodiments, this may be realized by using a digital micromirror device (DMD) which uses an array of tiny mirrors to direct light produced by an illumination source (e.g. lamp, LED, laser, etc.) and may pass through a spinning color wheel, through a lens. For a rolling shutter capture device, the projector should be progressive scanning and the devices should be synchronized to time image capture.

While the cameras are shown as coupled to the illumination device 108 to facilitate synchronization, in some embodiments the cameras do not receive sync signals from the illumination device 108 and instead capture images independently. In some such embodiments camera sync may be, and sometimes is, achieved with the illumination device 108 based on processing of captured images.

In accordance with some embodiments a first image pattern is projected by the illumination device 108 followed by a second image pattern with each pattern corresponding to a displayed frame being projected for a fraction of a second, e.g., less than 1/60 of a second. Various patterns which can and are displayed in accordance with some embodiments are shown in FIGS. 4-13 which will be discussed in detail below.

Figure 2:
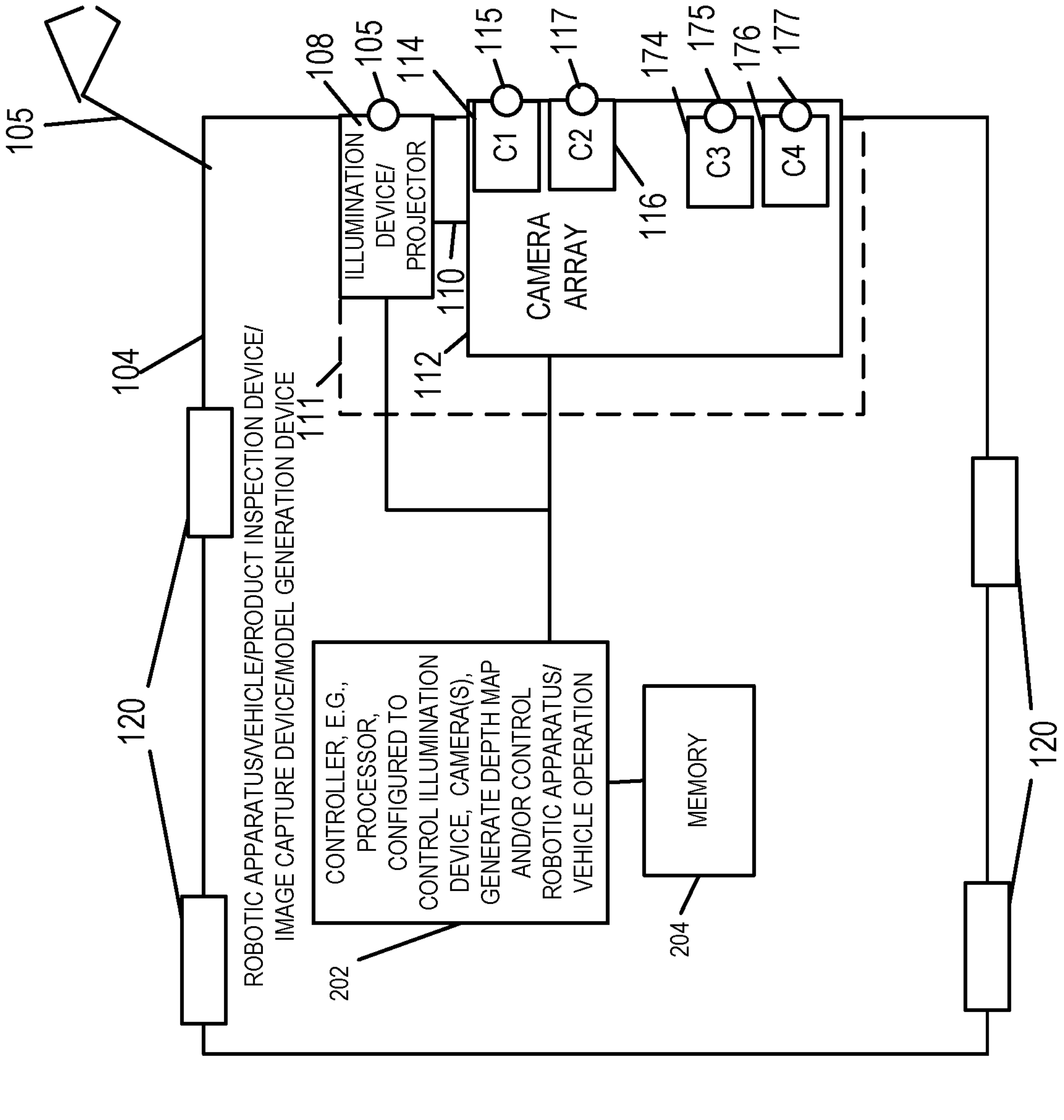
FIG. 2 is a diagram showing the exemplary apparatus shown in FIG. 1 in greater detail.

FIG. 2 is more detailed drawing 200 of the robotic apparatus/vehicle 104 shown in FIG. 1. The apparatus 104 includes a controller 202, e.g., a processor coupled to a memory 204 and the illumination/camera system 111 of FIG. 1.

The apparatus 104, e.g., robotic device/vehicle, supports illumination of a scene area and image capture using one, but in many cases, multiple cameras. The apparatus 104 performs image processing in accordance with the invention to identify matching portions of images and to produce depth information and performs vehicle control vehicle operations based on the depth information obtained from the image processing. While in some embodiments the apparatus 104 performs image processing and depth determination using online processor 202, in other embodiments captured images are communicated, e.g., wirelessly, to a web or cloud based system for processing and depth determination operations with in some cases depth information being returned to the apparatus 104 and used by the processor 202 for device control.

FIG. 3 is another drawing 300 of the exemplary apparatus 104, e.g., robotic device or vehicle which supports illumination and image capture for depth determination purposes with still more details shown. Exemplary apparatus 104 includes a plurality of cameras, camera 1 (C1) 114, camera 2 (C2) 116 which are part of the camera array 112. The cameras capture images of the scene area illuminated by illumination device 108 in accordance with the invention. Exemplary vehicle 104 further includes controller 202, e.g., a processor, configured to control illumination and camera operation including camera synchronization with the output, e.g. displayed images, of the illumination device 108. The controller 202 is configured to identify matching portions of images to produce depth information, generate a depth map, and/or control vehicle operation. Memory 204 stores illumination pattern information 1053 which includes the patterns, e.g., first and second images, to be displayed and the sequence in which the patterns are to be displayed for illumination purposes. A wide variety of patterns, e.g., black and white and/or color pixel patterns can be stored in information 1053 and displayed e.g., by illumination device 108, as part of a video sequence used for illumination purposes. The patterns which are images may be stored in a variety of data formats depending on the embodiment and need not be stored as a bitmap but can be stored as equations or other data used to render the images to be displayed as part of the illumination process.

The first camera C1 114 and second camera C2 116 are mounted on apparatus 104 facing in the direction of the scene area that is illuminated by illumination device/projector 108. Controller 202 is coupled to each of the cameras (C1 114, C2 116, C3 174, C4 176). Controller 202 controls the illumination device 108 to illuminate a scene area, e.g., by sequentially displaying image patterns in accordance with the information stored in illumination pattern information 1053, while cameras C1 114, C2 116 are controlled to capture images of the illuminated scene area.

Controller 202 receives images captured by each of the cameras (C1 114, C2 116) during a frame time in which a pattern is displayed by illumination device 108. In some embodiments controller 202 identifies matching portions of images corresponding to the same frame time, e.g., captured from different cameras at the same time, and uses the information about which portions match to determine depth to objects in the scene area. Thus, in some embodiments controller 202 uses matching portions of images to produce depth information and generate a depth map.

In other embodiments controller 202 causes captured images to be communicated, e.g., wirelessly via wireless communications interface 1005, to a cloud or network based image processing system. The cloud or network based image processing system processes the communicated images and returns a depth map to the apparatus 104 to be used for device control.

In some embodiments, controller 202 controls a vehicle control operation, e.g., one of a direction, braking, or speed control operation, to be performed in response to a generated depth map. In various embodiments, controller 202 uses the depth map information to perform collision avoidance operations and/or perform autopilot operations.

Exemplary apparatus 104 shown in FIG. 3 will now be discussed further. Apparatus 104 includes the processor 202, e.g., a CPU acting as a controller, e.g., illumination device controller. a camera/synchronization controller and/or vehicle operation controller, an input device 1006, e.g., a keypad, an output device 1008, e.g., a display, an assembly of hardware components 1010, e.g., an assembly of circuits, memory 204, the plurality of cameras (camera 1 114, camera 2 116, C3 174, C4 176), speed control circuitry 1034, braking control circuitry 1030, steering control circuitry 1032, an autopilot system 1037, and a collision avoidance system 1039 coupled together via a bus 1009 over which the various components may interchange data and information. In some embodiments, the autopilot system 1037 and/or the collision avoidance system 1039 are coupled together and/or to the speed control circuitry 1034, braking control circuitry 1030 and/or steering control circuitry. Apparatus 104 further includes engine/fuel/transmission components 1036, e.g., a motor, internal combustion and/or electric, computer controlled fuel injection system, electronically controlled transmission, etc., which is coupled to speed control circuitry 1034. Apparatus 104 further includes brake system components 1038, e.g., ABS system, brake sensors, wheel motion sensors, wheel position sensors, actuators, hydraulic components, electronically controlled brakes, etc., coupled to braking control circuitry 1030. Apparatus 104 further includes steering system components 1040, e.g., rack and pinion unit, steering input controls and steering drive components including motors, etc., coupled to steering control circuitry 1032. In some embodiments, the steering control circuitry 1034, braking control circuitry 1030 and/or steering control circuitry 1032 is part of an autonomous or semi-autonomous driving control system and/or an assisted driving control system. A wireless interface 1005, e.g., including a wireless radio transmitter and receiver, which allows the controller 202 to communicate captured images to a cloud based image processing system and to receive depth map information generated from captured images back from the cloud based system.

Memory 204 includes an assembly of software components 1050, e.g., an assembly of software routines or software modules, and data/information 1052. Memory 204 includes stored information (SI) 1061 which can include image data as well as other information. SI 1061 includes, in some embodiments, one more or all of: depth information generated from captured images, generated models, e.g., 2D and/or 3D object recognition models, non-patterned images of an object and/or area, and/or illumination patterned images of the object and/or area.

Assembly of software components 1050 includes illumination control routine (ICR) 1051, an image processing and/or combining routine 1057, an image portion matching routine 1070 and a depth map routine 1072. ICR 1051 when executed by controller 202 controls the apparatus 104 to display a sequence of images, indicated in stored illumination pattern information 1053 by causing the illumination device 108 to output, e.g., display the image patterns in sequence. Image processing and/or combining routine 1057 in some embodiments combines images showing a pattern captured by one or more cameras to produce an image in which the pattern is not visible. Routine 1057 in some embodiments also performs processing relating to model generation and/or stores information associating depth data, e.g., a depth map, generated from stereoscopic images captured by cameras C1 114, C2 116, with a non-patterned image or images captured by one of the cameras used to generate the depth information and/or another camera or generated by combining images, e.g., captured by one of the cameras C1 114, C2 116, C3 174, C4 176 during consecutive exposure time periods.

Data/information 1052 includes captured images (captured image 1 1054, . . . , captured image Z 1056), generated, e.g. non-pattern images 1059, a generated depth map 1058, e.g., generated from captured images, and a generated vehicle control command 1060, e.g., to be sent to speed control circuitry 1034, braking control circuitry 1030, steering control circuitry, autopilot system 1037 and/or collision avoidance system 1039, e.g. in response to a detected change and/or problem, detected by analyzing the generated depth map, e.g., a stopped or disabled truck suddenly is detected in front of the vehicle resulting in a control command for avoidance. Depending on the exposure time and/or length of exposure, in some but not all embodiments, some captured images 1054, 1056, 1059 will include a visible illumination pattern while in other captured images, e.g., having a different exposure duration and/or start time than an image showing an illumination pattern, will not show an illumination pattern. In some embodiments one or more non-patterned images 1059 are generated by processing routine 1057 combining images showing an illumination pattern present in all or a portion of an illumination frame display period and/or an illumination pattern (e.g., concealing pattern) present in all or a portion of a concealing frame display period. Routine 1057 in some embodiments simply averages and/or time averages corresponding pixels of images (e.g., captured frames) being combined so that the combined image has pixel values which correspond to what would have been obtained if a single image was captured by using an exposure time corresponding to the total exposure time of the images being combined. The capture and combining of images to produce an image which does not show an illumination pattern will be discussed further in regard to FIG. 21. Note that when generating an image that does not include a pattern routine 1057 may crop and/or resize an image to elimination portions which are not of interest, e.g., portions which do not include an illumination pattern or concealing pattern or which show objects or surfaces which are not of interest. For example, when a product or object is being illuminated and inspection image processing routine 1057 may and often will delete the portions of a captured image which are not of interest. Thus, the stored and/or generated images produced by image processing routine 1057, e.g., images which can but often do not include an illumination pattern, may be, and sometimes are, images of an object of interest which is to be inspected, measured in 3D and/or modeled.

Apparatus 104 can be any of a wide range of devices including any of: a robotic device, an product inspection device, an image capture device, a 3D model generation device, a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

The upper portions of FIGS. 4-6 and 11 show drawings 400, 500, 600, 1100 that show various frame sequences which can be used to illuminate a scene area in accordance with the invention.

The frame sequences shown in FIGS. 4-6 and 11 include a first frame F1 (402, 502, 602, or 1102), which displays a first pattern P1, followed by a second frame F2 (404, 504, 604, or 1104), which displays a second pattern P2. The second frame F2 is sometimes referred to as a concealing (C) frame since it helps conceal from a human viewer the pattern P1 by displaying a complementary image pattern P2 which helps conceal the first pattern P1. The displayed image sequence repeats over time, e.g., in a periodic manner in some embodiments.

Each small square in the first frame (402, 502, 602, 1102) of FIGS. 4-6 and 11 is intended to correspond to an individual pixel of an image in some embodiments but may, and often will, correspond to a group of adjacent pixels in other embodiments. The number of adjacent pixels used to correspond to a square may and often will depend on the resolution of the projector and/or the ability of the cameras 114, 116, 174, 176 to detect the pattern when projected with the number of pixels being selected so that the pattern will be detectable in the captured images. While a small number of squares are shown this is for illustration purposes and it should be appreciated that the displayed image patterns used for illumination purposes will likely include many more pixels than the number shown in the figures.

Each of the frame sequences in FIGS. 4, 5, 6, 11 and 13 includes a pair of frames (402, 404), (502, 504), (602, 604), m (1102, 1104), (1302, 1304), respectively. The first frame (402, 502, 602, 1102, 1302) in each sequence includes a first illumination pattern while the second frame includes a concealing illumination pattern (404, 504, 604, 1104, 1304) also referred to as a complementary image pattern.

The square (406, 506, 606, 1106, 1306) in lower portion of each of FIGS. 4-6, 11, and 13 represent the composite of the two patterns shown in the upper portion of the corresponding figure and is intended to convey an idea of the generally uniform illumination pattern that would be perceived by a human viewer when the patterns shown in the upper portion of the figures are shown sequentially, e.g., with each pattern being displayed by the illumination device 108 for 1/60th of a second or less. It should be appreciated that while a human viewer of the image sequence shown at the top of the FIGS. 4-6, 11 and 13 would perceive generally uniform illumination of a scene area while the cameras 114, 116, 174, 176 will capture images of the scene area illuminated with the patterns shown in the top of the figures. During each frame time multiple images of each pattern will be captured, e.g., with one image being captured by each of the cameras in the array. For example, camera 114 and camera 116 will each capture an image of the illuminated scene area from different perspectives during a frame time period in which a pattern is displayed by illumination device 108. Thus cameras 114 and 116 will each capture an image of the illuminated scene area illuminated by the first pattern. They will then capture images of the illuminated scene area with the second concealing pattern. From the perspective of the cameras 114, 116 it will appear as if the illuminated scene area were "painted" with the first pattern and then "painted" with the second pattern. From the perspective of a human observer the patterns will not be observable.

The pair of images captured during a single frame time is sufficient for stereoscopic depth determination purposes. Thus, where images of patterns are captured at a given frame rate, depth maps can be and sometimes are generated at the corresponding frame rate.

In various embodiments the pattern shown in a frame used for illumination purposes where stereoscopic depth determinations are to be made should and sometimes do have one, more than one, or all of the following characteristics:

i. The pattern is concealed when averaged over time with a concealing frame pattern.

ii. The pattern has lots of texture so that it is easy to match. Various examples shown in the figures, show a random noise pattern which has an impulsive autocorrelation function so it produces sharp minima in the cost function used to compare portions of different captured images which leads to more accurate and precise matches when matching is performed between image portions of different images for stereoscopic image determination purposes. There are many different patterns which can be used and the illustrated patterns are merely exemplary.

iii. The pattern has a gradient over the image for complexity reduction during matching. This could be a gradient in the average local intensity values of one or more channels in the image displaying the pattern, where the channels can be color and/or luminance channels. The gradient direction should and in some embodiments does match the stereo baseline orientation (e.g., horizontal baseline should and sometimes does have a horizontal gradient while a vertical baseline should and sometimes does have a vertical gradient). The gradient can repeat within the image pattern.

Various exemplary initial illumination patterns and corresponding complementary patterns will now be discussed with regard to FIG. 4-6, 11 and 13.

Figure 4:
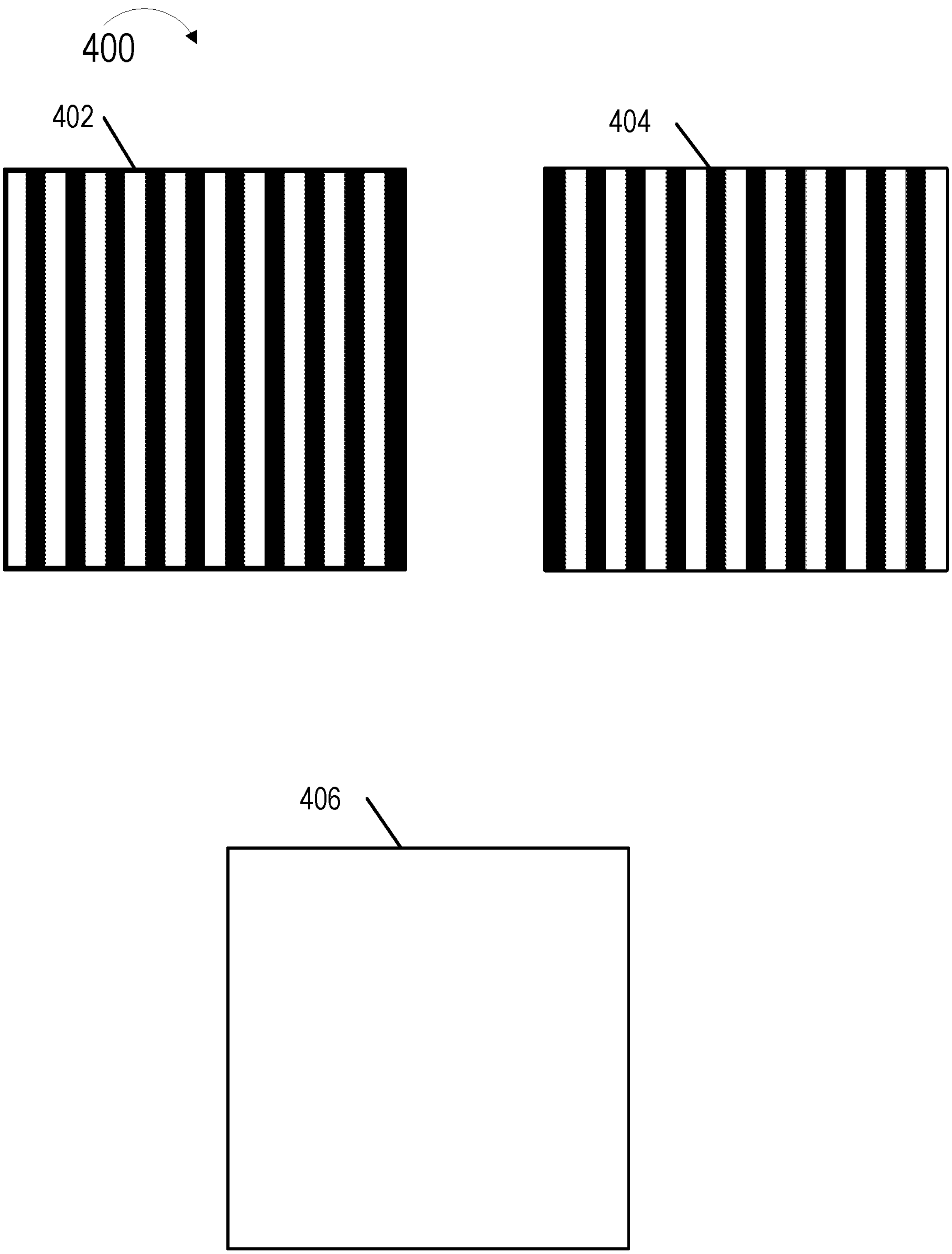
FIG. 4 is a diagram showing exemplary complimentary image patterns which are used in some embodiments as images which are displayed, e.g., sequentially, as part of an illumination process intended to facilitate depth determination.

FIG. 4 shows a first line pattern 402 and corresponding concealing line pattern 404. The line patterns 402, 404 are particularly useful when structured light based depth determinations are to be made as opposed to more complicated stereoscopic depth determinations. When a scene area is illuminated sequentially by patterns 402, 404, e.g., with each pattern being displayed for 1/60th of a second or less, a human viewer will perceive uniform illumination such as shown in diagram 406 and the patterns 402, 404 will not be perceived but they will be captured by one or more cameras 114, 116. When structured light depth determinations are used to determine distance a single camera 114 can be used and the second camera can be omitted from the apparatus 104. While the illumination pattern shown in FIG. 4 is suitable for structured light depth determinations, more complicated and more random patterns are preferable for supporting stereoscopic depth determinations.

Figure 5:
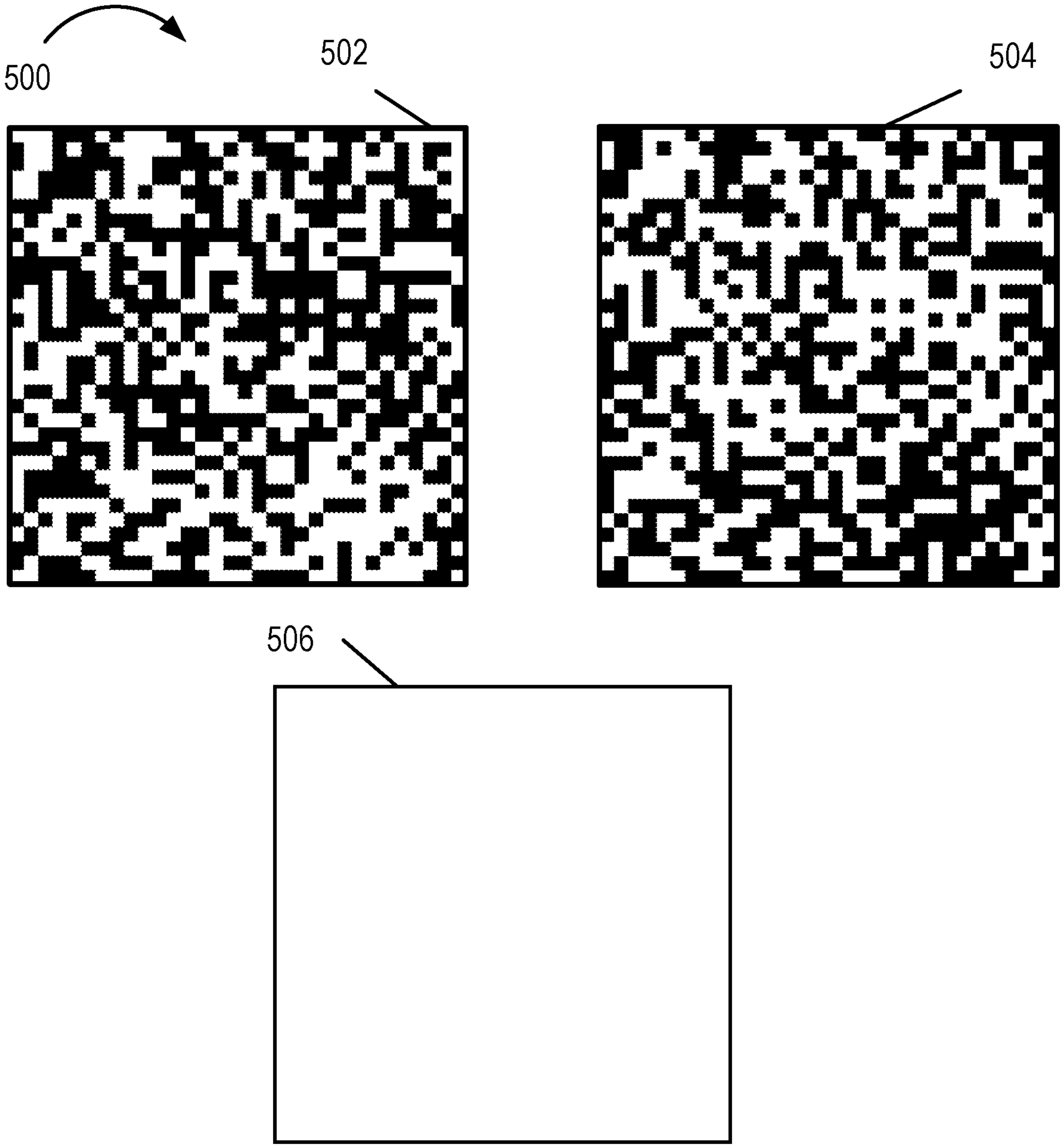
FIG. 5 is a diagram showing exemplary complimentary image patterns which are used in some embodiments as images which are displayed, e.g., sequentially, as part of an illumination process intended to facilitate depth determination.

FIG. 5 shows one example where black and white image patterns 502, 504 are used to illuminate a scene area for stereo scope depth determination. Note that in concealing image pattern 504 areas which were white in image pattern 502 are black. Similarly, in concealing image pattern 504 areas which were black in image pattern 502 are white. Thus, concealing image 504 when used immediately following image 502 will conceal from a human viewer the image pattern 502 and result in a human viewer perceiving uniform illumination of the scene area as represented by box 506. Note that in each of the initial image pattern 502 and the concealing image pattern 504 the same number of pixels are on and the same number of pixels are off resulting in uniform illumination.

Assuming a pixel value of 0 was used to represent an off state and assuming a pixel value of 255 represented a full on state, summing corresponding pixel values of each of the images would result in a value of 255 corresponding to the pixels of the image 506. However, given that each frame 502, 504 corresponds to half of the time to which image 506 corresponds, the illumination perceived by a human would be only half that which would be perceived if all of the pixels were fully on in both frames used to display patterns 502, 504.

The ideas relating to an initial illumination pattern displayed as a first frame followed by a concealing pattern displayed as a second frame can be extended to color patterns. In the case of some color patterns each pixel corresponds to the output of three different color elements, a red element, a green element and a blue element. The composite image that will be perceived as a result of using an initial color pattern and a complementary concealing pattern will result in a uniform image being perceived but with the uniform illumination being potential white or some shade of color. In the case where separate R, G and B control values are used for individual pixels of an image, the sum of an R pixel value of the initial image 602 and the corresponding pixel of the complementary image 604 will result in a consistent value throughout the image. This will similarly be true if the control value of a G pixel element of the image 602 is summed with the corresponding control value of a G pixel element of the corresponding location in the concealing image 604 with the sums of the G pixel values at corresponding locations resulting in a consistent value over the entire image. Similarly, if B pixel element control values are summed for a given location in images 602 and 604 it will result in the same value for each of the pixel locations.

Figure 6:
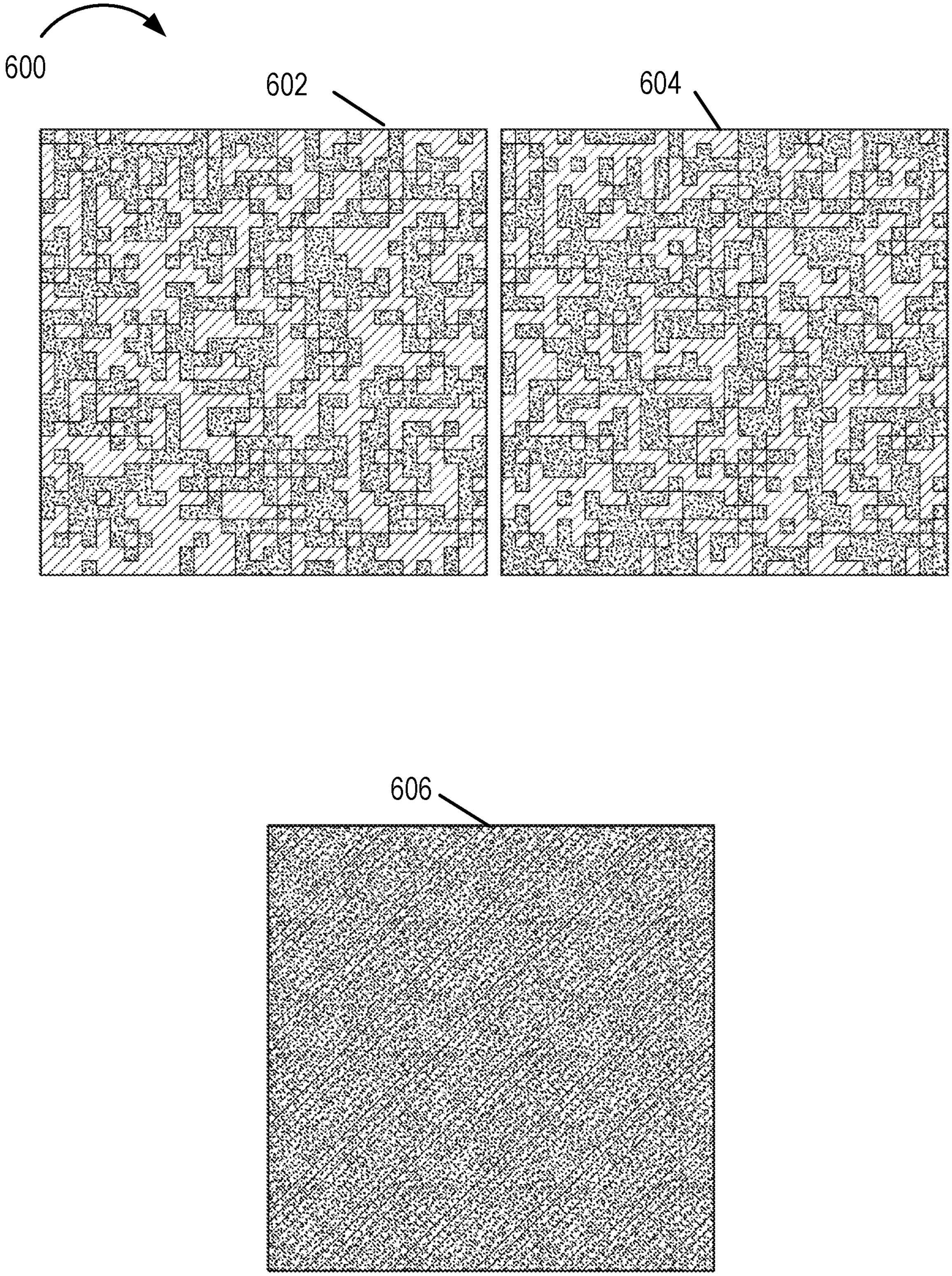
FIG. 6 is a diagram showing exemplary complimentary image patterns which are used in some embodiments as images which are displayed, e.g., sequentially, as part of an illumination process intended to facilitate depth determination.

In FIG. 6, slanted lines are used to represent a first color while stippling is used to represent a second color. The resulting viewed illuminated scheme area will appear to a human observer to have been painted or illuminated with a consistent color, e.g., white or some other color, as shown in block 606 which will be the composite of the colors used for the individual pixel areas of frames/patterns 602, 604 while a camera capturing an image corresponding to frame time 602 will detect the color pattern shown in frame 602 and a camera capturing an image corresponding to frame time 604 will capture the color image shown in block 604.

FIGS. 7-10 show exemplary frame/pattern sequences displayed in some embodiments. Each frame/pattern shown in FIGS. 7-10 is used to illuminate a scene area for 1/60th of a second or less.

Figure 7:
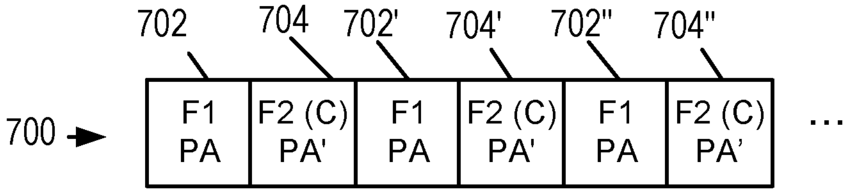
FIG. 7 shows image/pattern sequences used for illumination purposes in accordance with various exemplary embodiments.

FIG. 7 shows a first frame sequence 700 which includes a recurring set of frame patterns PA, PA', where PA' is a concealing pattern which is displayed immediately following the display of pattern PA. In illumination frame sequence 700 frame 702, which is frame F1, is used to display pattern PA, while the next frame 704, which is frame F2, is used as a concealing frame which displays pattern PA' which is complementary to pattern PA. The pattern display sequence PA, PA' continues in frames 702', 704', 702", 704" onward in the FIG. 7 example.

Figure 8:
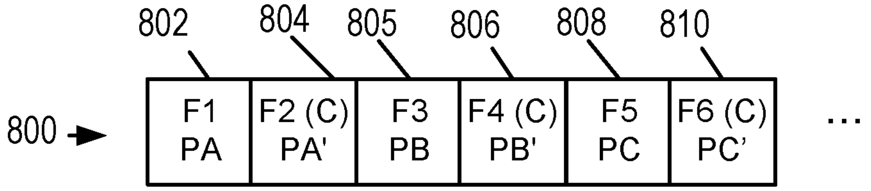
FIG. 8 shows image/pattern sequences used for illumination purposes in accordance with various exemplary embodiments.

For depth determination purposes it can be useful to vary the patterns used as the initial pattern and corresponding concealing pattern, since a particular pattern may interact poorly with some areas of an environment. FIG. 8 shows a sequence frame pairs (F1 802, F2 804), (F3 803, F4 805), (F5 808, F6 810) which show a sequence of patterns PA, PA', PB, PB', PC, PC' where patterns A, B and C are different, and the ' is used to indicate the corresponding concealing pattern.

For purposes of capturing images of a scene area without a pattern, it can be desirable to interspace one or more images which provide consistent, e.g., non-patterned, illumination. Such images can be desirable for training 2D object detection models which can then be associated with 3D object information obtained by generating a depth map of a scheme area.

Figure 9:
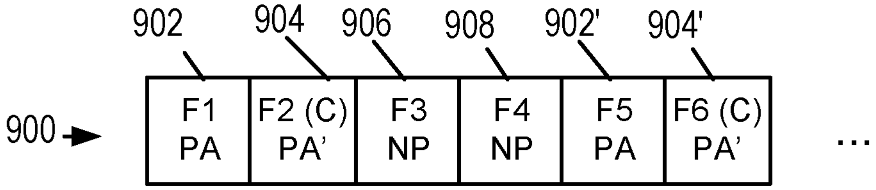
FIG. 9 shows image/pattern sequences used for illumination purposes in accordance with various exemplary embodiments.

FIG. 9 shows an embodiment where a sequence of frames 900 includes frames 906, 908 without a pattern. The non-pattern (NP) frames F3 906, F4 908, are used to illuminate a scene area between sets (F1 902, F2 904), (F5 902', F6 904') of patterned frames. The non-patterned frames F3 906, F4 908 allow images of the illuminated scene area to be captured free of the patterns PA, PA' used in other frame times. A non-patterned captured image can be preferable to generating a composite image from images captured in sequential patterned frame times 902, 904 because more camera movement is likely to occur over a pair of sequential frames than during a single frame time. To avoid a human perceiving the change from a patterned frame to a non-patterned frame, the light output corresponding to individual pixels of the NP frame may be reduced to half the light output of "on" pixels of the patterned frames or display time of the non-patterned frame could be halved compared to the patterned frame.

In this way a uniform consistent illumination will be perceived by a human viewer even though a change is made from use of a pattern frame to illuminate an area to a non-patterned frame.

Figure 10:
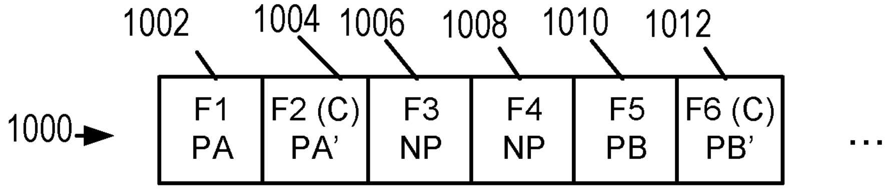
FIG. 10 shows image/pattern sequences used for illumination purposes in accordance with various exemplary embodiments.

The concept of using different patterns interspaced with non-patterned frames for illumination purposes is shown by the exemplary frame sequence 1000 of FIG. 10. The patterned frame pair (F1 1002, F2 1004) which display the pattern sequence PA, PA', is followed by non-pattern frames F3 1006, F4 1008 which are then followed by the patterned frame sequence F5 1010, F6 1012, which have different patterns PB, PB', than the patterns PA, PA' of frames F1 1002, F2 1004.

Various additional exemplary illumination patterns and features of such patterns will now be discussed with regard to the examples shown in FIGS. 11 to 13.

Figure 11:
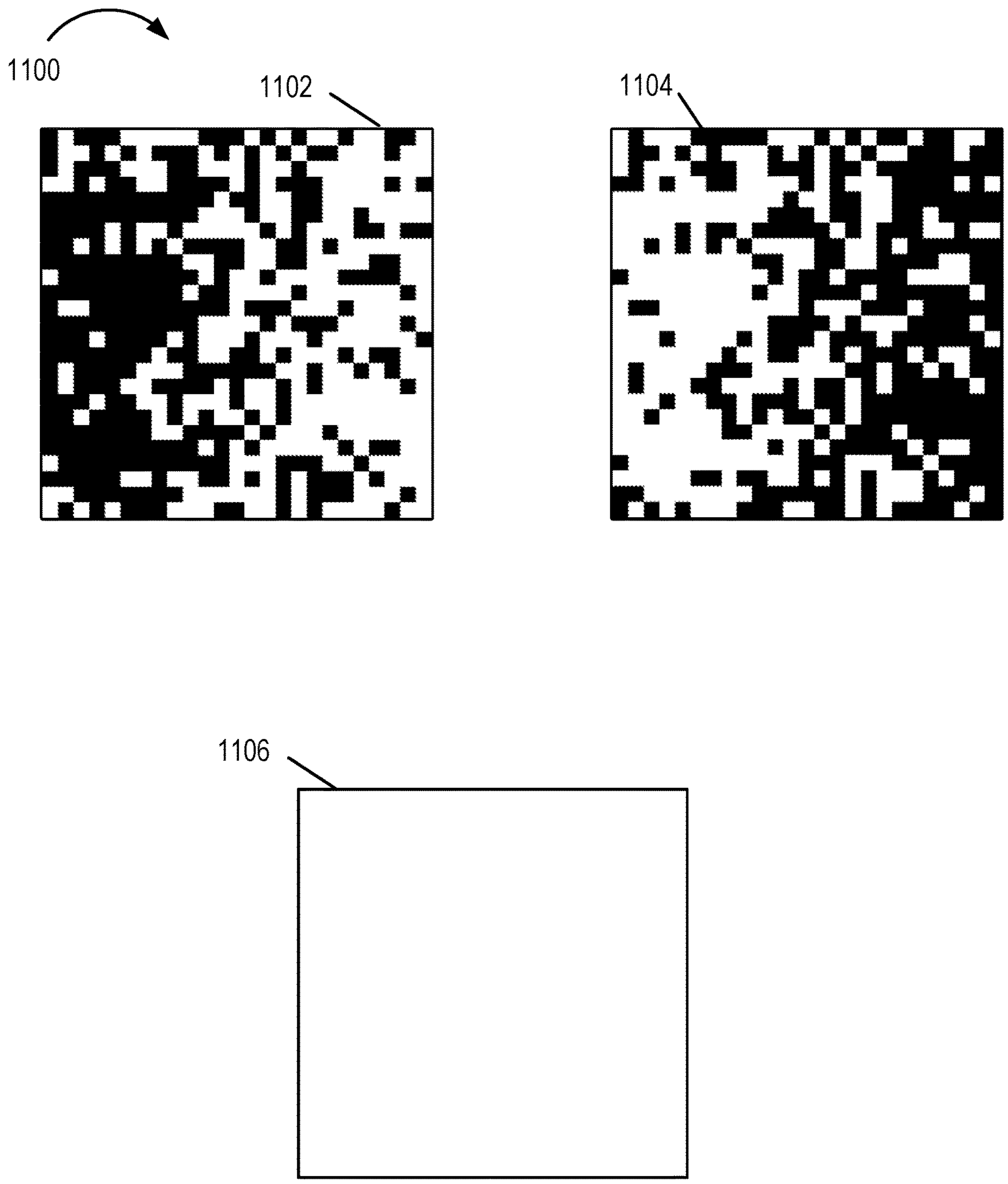
FIG. 11 is a diagram showing additional exemplary complimentary image patterns, at least some of which are color image patterns, which are used in some embodiments as images which are displayed for illumination purposes.

FIG. 11 is a diagram 1100 showing a first BW pattern 1102 and corresponding concealing pattern 1104 which when viewed by a human sequentially will result in a perceived uniform illumination as represented by block 1106.

The FIG. 11 example is an example of the use of a monochrome B/W pattern in patterned image 1102 where the average intensity varies from 25% to 75% from left to right in the image. In the corresponding concealing image 1104 the average intensity will vary in the opposite direction from right to left.

For a color image, the intensity gradient included in the initial patterned image and its concealing complement can be in one or more color channels where the R, G and B components of each pixel can be treated as an independent color channel.

Figure 12:
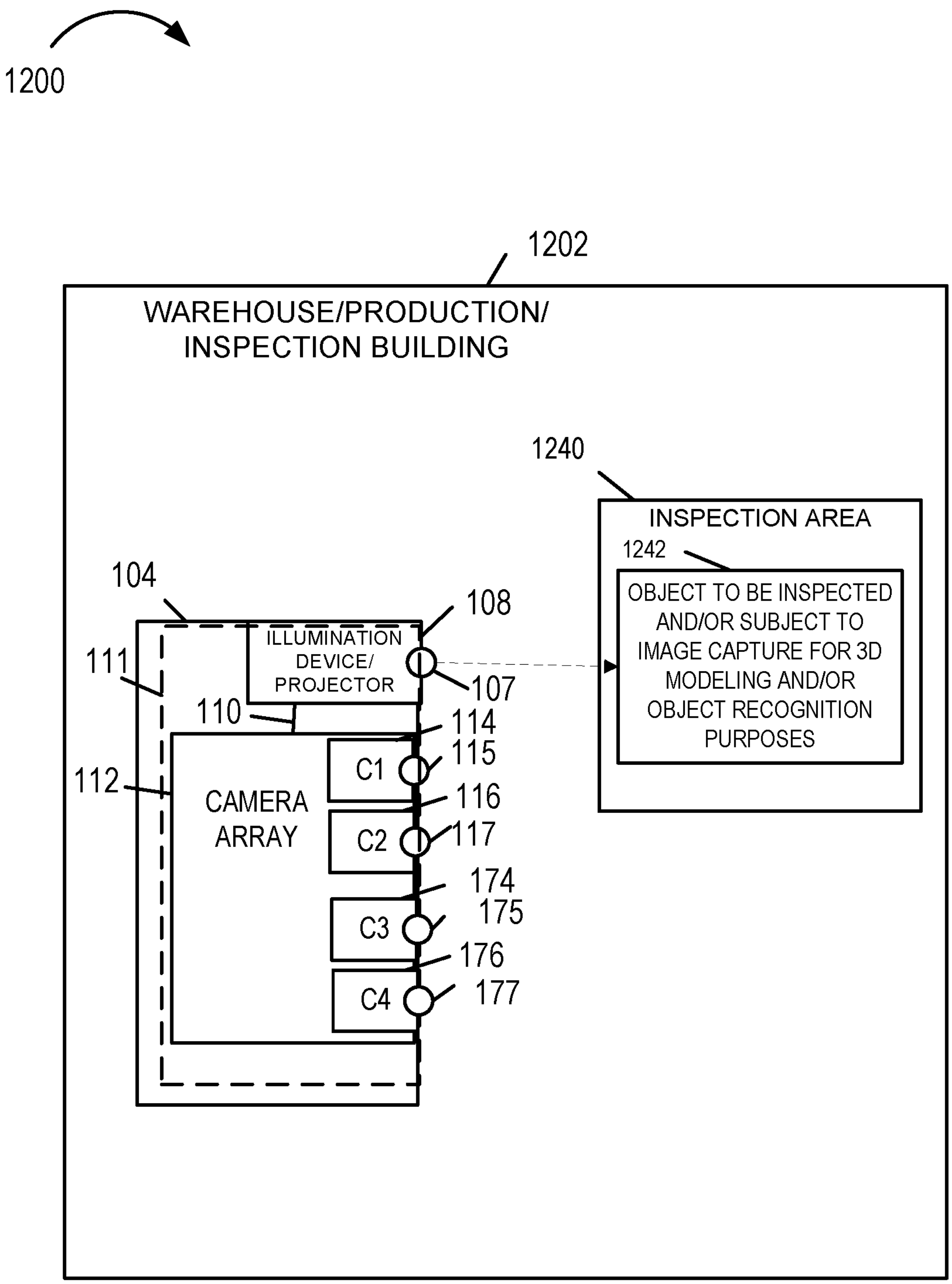
FIG. 12 is a simplified diagram showing an embodiment in which the apparatus of the invention which includes illumination and camera devices is used to support object inspection, e.g., in a warehouse or inspection area of a building.

FIG. 12 is a simplified diagram 1200 showing an embodiment in which the apparatus 104 of the invention, which includes an illumination device 108 and camera devices 114, 116, 174 and/or 176 is used to support object inspection, e.g., in a warehouse or inspection area of a building and/or for other purposes such as capturing images which can be used for 2D object recognition training purposes and/or 2D images of an object to be associated with stereoscopic determined depth information generated from captured images.

In the diagram 1200, the illumination device 108 is seen illuminating an object in an inspection area. The illumination device 108 illuminates the inspection area 1240, and the object 1242 located therein with a sequence of illumination images, e.g., illumination frames, and concealing images, e.g., concealing frames. The image displayed during each of the illumination and concealing image periods, e.g., frame times, may be a consistently displayed image or, in the case of a digital light projector embodiment, a second of one or more subframes which in combination display the pattern to be displayed during the illumination image period or concealing image period to which a set of sub-frame correspond. In the FIG. 12 example, multiple cameras 114, 116, 174, 176 are used. The cameras can be used alone, in parallel or asynchronous with one another. In many embodiments cameras 114, 116 are used in parallel to capture patterned images in which the illumination patterns included in an illumination image or concealing image are visible. The patterned image is then processed for stereoscopic depth determinations, e.g., to generate a depth map and/or 3D model of an object or area. While illumination patterns on objects can, and in some embodiments do, facilitate stereoscopic depth determinations, such patterns can be problematic for other applications where the illumination introduced pattern may interference with detecting an object's features.

In some embodiments an image captured by a camera which includes a pattern is combined with a subsequent image to produce an image which does not include the illumination pattern or concealing pattern. In other embodiments one or more additional cameras 174, 176 are operated to capture a non-patterned image or images which are combined to generate a non-patterned image. Thus apparatus 104 is capable of capturing multiple images which can facilitate stereoscopic depth determination and/or application where non-patterned images are preferable.

Applications where patterned images are captured and used in some embodiments normally involve stereoscopic depth determination. When cameras are controlled to capture an illumination pattern, e.g. for depth determination from images captured by stereo cameras C1 114, C2 116, the cameras should time capture when the projector is projecting a single pattern of an illumination frame or concealing frame and for good pattern contrast. As should be appreciated if a portion of an illumination frame and a concealing frame are captured in an image the concealing frame portion may conceal or cancel out some of the pattern visible in the illumination frame image pattern.

For max contrast, in some embodiments the exposure used for cameras intended to capture a pattern, e.g., cameras C1 114, C2 116, are set to the pattern frame duration and the start of capture is aligned with the start of the frame which includes the pattern to be captured, e.g., to the start of the illumination frame.

The alignment of frame capture with the frame display of the illumination device 108 can be, and sometimes is, achieved through electronic or wireless synchronization between the illumination device 108 and cameras of the camera array 112. However, in other embodiments the synchronization is achieved based on processing of images captured by the camera to be synchronized with the illumination device. In various embodiments synchronization between the frame display rate of the illumination device 108 can be, and sometimes is, achieved by taking a test capture and delaying the start of the next camera capture based on how much contrast is present in the test shot. In one such embodiment, the delay is repeatedly adjusted by the processor 202 in the device 104 that is controlling image capture until maximum contrast between consecutive images taken by a camera C1 114, C2 116, C3 174, and/or C4 176 is obtained indicating synchronization with the frame rate of the illumination device 108 has been achieved.

In some embodiments when an image with a pattern is to be captured, the camera exposure is set longer than the pattern frame duration, but the longer exposure time is at the cost of lower contrast in the illumination pattern since some of the concealing pattern will be captured. The exposure can be set less than the pattern/illumination frame duration, but the captured pattern may be different than the intended pattern particularly in the case where a DLP is used.

In some embodiments while cameras C1 114, C2 116 are used to capture images with illumination patterns to facilitate stereoscopic depth determination, additional camera C3 174 and/or camera C4 176 are operated under control of processor 202 to capture non-patterned images, e.g., images in which the illumination pattern of an illumination frame or concealing frame are not visible or noticeable visible. However, in some cases camera C1 114 and/or C2 116 is used to capture a non-patterned image, e.g., at a time it is not capturing an image showing an illumination pattern.

Capture of a non-patterned images is useful in a wide range of applications including 2D machine learning (2D ML) and/or artificial intelligence (AI) virtualization applications and/or various other non-stereo applications which are supported in various embodiments. In some cases when a camera is controlled to capture a non-patterned image when the illumination device 108 is illumination an area, the capture time, e.g., exposure time used to capture a non-patterned image, is controlled by the processor 202 to be an integer multiple of the combined duration of the illumination frame and concealing frame of an illumination frame/concealing frame pair. In such a case the combined frame duration=illumination frame duration+concealing frame duration. Setting the exposure equal to a multiple of the combined frame duration (=pattern frame duration+concealing frame duration) results in a captured image where the pattern will not be visible. Equivalently, in some embodiments image processing is implemented by the processor 202 under control of IP/combining routine 1057. The combining of images generates a composite image from multiple successive captured images where the combined exposure corresponding to the successively captured images being combined is equal to a multiple of the combined frame duration. This results in the illumination pattern if the illumination frame not being visible in the composite image due to the concealing effect of the concealing pattern of the concealing frame which is also incorporated into the composite image.

The benefits of avoiding the inclusion of an illumination pattern in an image intended for machine learning (ML) can be considerable. ML models may be trained on large datasets of images without a pattern and the presence of a pattern in some image but not others or the absence of such patterns in objects encountered in real world conditions, could cause the trained appearance model to fail to infer correctly. Retraining or fine tuning on a new dataset of images with illumination patterns may be cost and/or time prohibitive. Similarly, illumination patterns on objects may interfere with other computer vision algorithms, e.g. for edge detection, foreground/background segmentation, etc. and thus it can be desirable to have non-patterned images available for such applications/uses. Thus, for a variety of reasons it is beneficial that the apparatus 104 can capture and/or generate non-patterned images even when patterned light is used for illumination purposes to facilitate stereoscopic depth determination.

Having discussed the ability of the device 104 to capture images including the displayed illumination pattern as well as images which do not include the illumination pattern, the fact that the illumination pattern need not occupy the full illumination frame, and in some embodiments does not occupy the full area of the illumination frame will now be discussed with reference to FIG. 13.

It should be appreciated that where an object 1242 or other small area is to be illuminated, the illumination device 108 need not display the patterned illumination image over the entire area of a frame. Thus, while in some embodiments the illumination pattern occupies the entire illumination frame, in other embodiments the illumination pattern occupies only a portion of the illumination frame. The concealing pattern will normally occupy an area of a concealing frame corresponding to the area occupied in the illumination frame by the illumination pattern.

Figure 13:
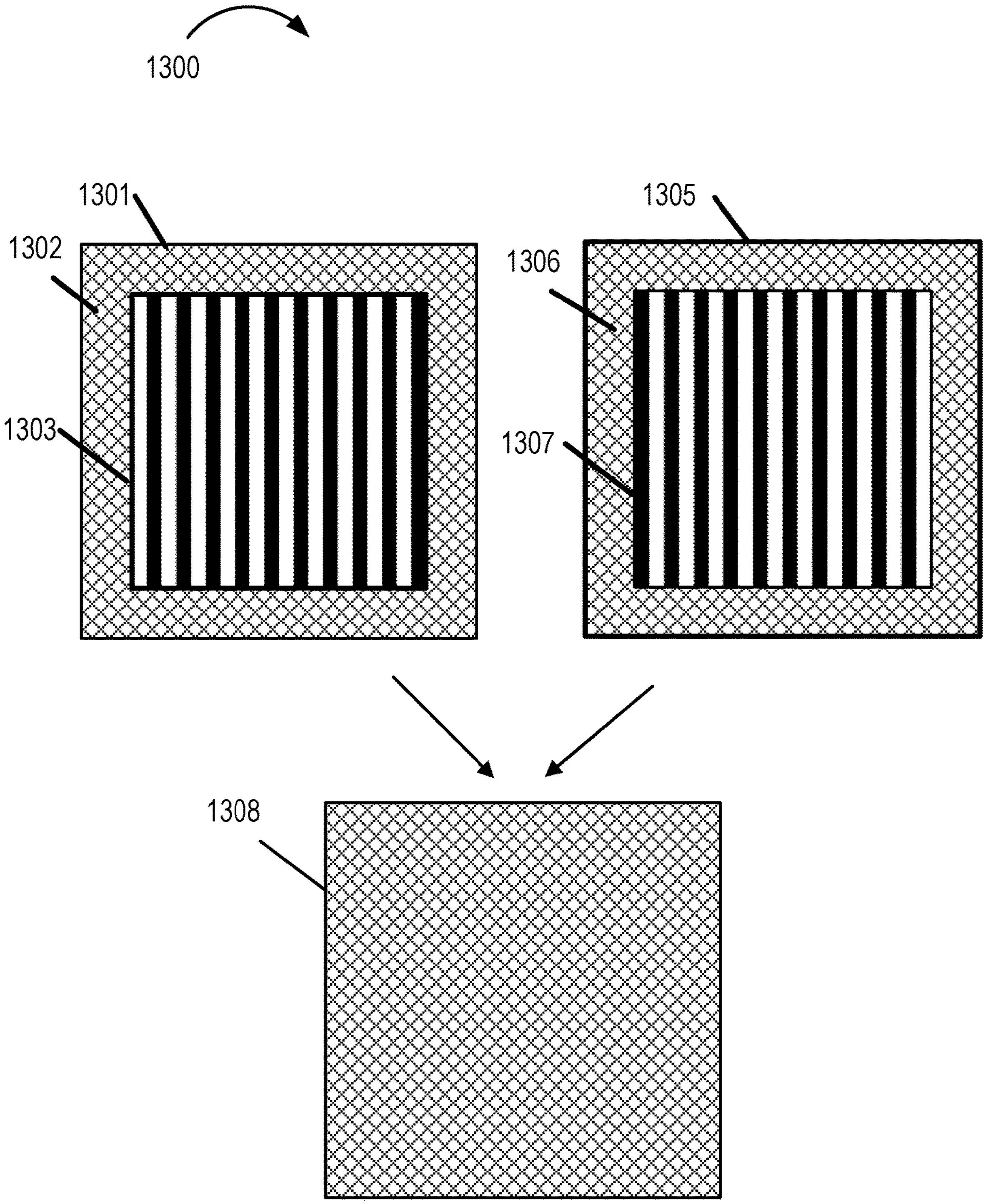
FIG. 13 is a diagram showing how a portion of a displayed illumination and/or concealing frame can include a pattern, in the form of a patterned illumination image, while other portions might not include a pattern.

FIG. 13 is a diagram showing how a portion of a displayed illumination and/or concealing frame can include a pattern, in the form of a patterned illumination image, while other portions might not include a pattern.

As shown in diagram 1300 of FIG. 13, the patterned illumination image 1303 may occupy a portion of the overall illumination frame 1301 with a concealing image pattern 1307 occupying a similar corresponding portion of a concealing frame 1305. Border area 1302 of the illumination frame 1301 and border area 1306 of the concealing frame 1305 may be black of a uniform illumination, e.g., 50% illumination in the FIG. 13 example. The display of the images shown in frames 1301, 1305 will be perceived as a single composite image in the case where they are displayed consecutively with each frame being displayed for a period of 1/60 of a second or less. Thus in at least one embodiment, when the displayed frames which are each displayed for a period of 1/60 of a second or less, are viewed consecutively or when captured in a contiguous exposure, the illumination frame 1301 and concealing frame 1305 will result in a perceived or captured image of uniform intensity as represented by image 1308. In embodiments where the non-patterned area 1302, 1306 is black to the extent the border area is captured in an image it will appear as a normal ambient background light level since the black border area will not contribute to the perceived light. Such an illumination approach is useful where a small object is to be illuminated and it may be desirable to avoid projecting light into areas around an object of interest which are not to be measured or used in subsequent image processing operations. By limiting the alternating light pattern to a small area of interest rather than as large an area as possible, the risk of the pattern being noticed or interfering with other image capture operations in an area is reduced as compared to when the patterned illumination area is displayed over a larger than necessary area.

Figure 14:
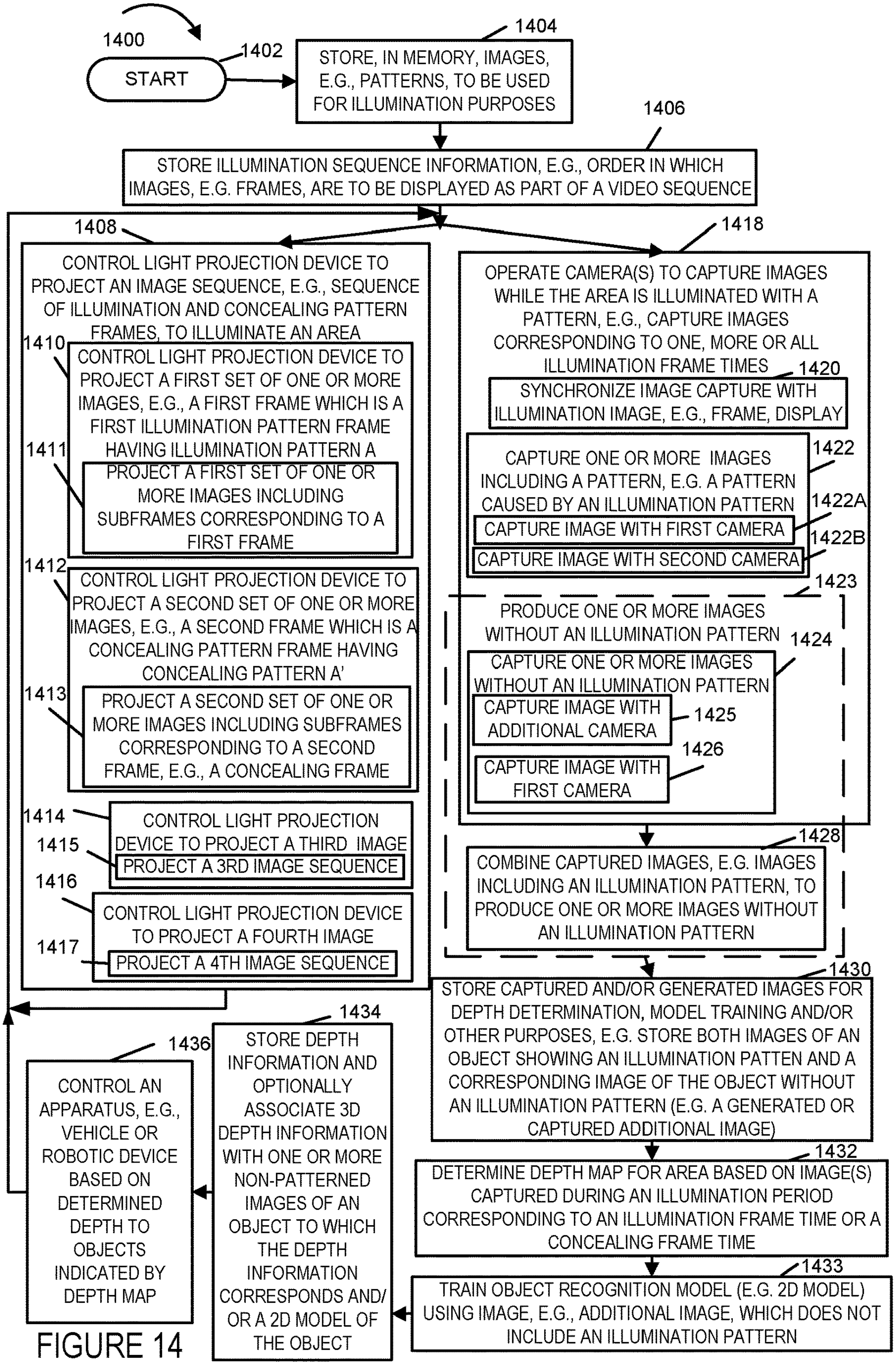
FIG. 14 shows a flow chart of a method implemented in accordance with the invention involving illumination, depth determination, capture of images including illumination pattern, capture or generation of non-patterned images and/or other features which are supported embodiments.

FIG. 14 shows a flow chart 1400 of a method implemented in accordance with the invention involving illumination and depth determination based on captured images of an illuminated area. The method 1400 starts in start step 1402 with an apparatus, e.g., apparatus 104 being powered on. Operation proceeds from start step 1402 to step 1404 in which images, e.g., patterns, to be used for illumination purposes are stored in memory 204, e.g., as part of illumination information 1053. The images in some embodiments are frames and include an illumination frame with an illumination pattern A and a concealing frame with the concealing pattern A'. In the case of a static display during a frame time an image in the form of a frame with the pattern A will be displayed during the illumination frame time and an image in the form of a frame with the pattern A' will be displayed during concealing frame time. In cases where an illumination frame and concealing frame are displayed using a digital light projector, the image information stored in step 1404 will normally include the sub-frame images which are displayed during different portions of a frame time to perform the display of the illumination frame or concealing frame to be displayed. Thus, in the case of a DLP embodiment, the subframes represent a set of images corresponding to a frame to be displayed. The frame in the case of a DLP embodiment will be sometimes referred to as an aggregated image since it represents the combination of the sub-frame images which are displayed to produce the frame image with the illumination pattern A or concealing pattern A'.

The stored images/patterns may be, e.g., the patterns shown in any of FIGS. 4-6, 11 and 13.

Then in step 1406 illumination sequence information is stored in the memory 204. The illumination sequence information includes information on the sequence in which images, e.g., frames and/or subframes, are to be displayed by the illumination device 108 and/or 109. The image sequence information may indicate any of the sequences shown in FIG. 7 to 10, 21 or 22 for example but other sequences are also possible. Some sequences are formed from the successive display of the illumination and concealing frames shown in FIGS. 15-20 with FIGS. 21 and 22 showing a sequence that can be generated using any of the illumination and concealing frame sets shown in the other figures. With the sequence information stored and available it is used in combination with the stored image information by processor 202 to control the illumination device 108 and/or 109 to project a sequence of images in accordance with a stored illumination pattern. In step 1408 the processor 202 controls the illumination device(s) 108 and/or 109 to project images as part of a video sequence to illuminate an area, e.g., the area 1240 of FIG. 12 or the area in which the racks 140, 141 of FIG. 1 are located. As part of step 1408 each image, e.g., frame, in the sequence is projected for 1/60th of a second or less in some embodiments. Step 1408 includes steps 1410, 1412, 1413, 1414 and 1416 in some embodiments.

In step 1408 the processor 202 controls the light projection device 108 to project an image sequence, to illuminate a scene area. The sequence may be a sequence 2101 shown in FIGS. 21 and 22 or a frame sequence as shown in one of the other figures. The displayed image sequence, in some embodiments, includes an alternating sequence of illumination pattern frames displaying the pattern A and concealing pattern frames displaying the pattern A'.

As part of projecting an image sequence in step 1408, steps 1410 and 1212 are preformed.

In step 1410 the light projection device 108 is controlled to project a first set of one or more images. The first set of images may be, and sometimes is, a single image such as an illumination frame 2102 in the case of a static image display during a frame time or a set of subframes in the case where a DLP projector is used as the projector 108. Thus, the first set of one or more images includes a single image having the illumination pattern A in the case where the first set of images is projected as a stationary image for a first period of time, e.g., time period 2130, corresponding to a frame time in step 1410. However, in the DLP case the first set of one or more images will correspond to a set of sub-frames, e.g., including IF SF1 2112, IF SF2 2114, IF SF3 2116, IF S4 2118 in the case of a DLP embodiment that projects subframes which in combination represent the illumination frame and produce the pattern A to illuminate the area (1240). In the case of a DLP embodiment step 1410 includes step 1411 in which a first set one or more images including multiple subframes corresponding to a first frame are displayed. The first frame may be, and sometimes is, an illumination frame displaying an illumination pattern A.

Step 1408 also includes step 1412 which involves displaying a second set of one or more images. This is implemented in some embodiments by controlling the light projector 108 to project during a second period of time, e.g., time period 2132 of FIG. 21, following said first period of time, a second set (e.g., the individual concealing frame 2104 or subframes corresponding to concealing frame 2104) of one or more images. A single image having the concealing pattern A' will be displayed in step 1412 in the case of a stationary image being projected for the second period of time or in the case of a DLP embodiment a set of sub-frames CF SF1 2120, CF SF2 2122, CF SF3 2124, CF SF4 2126 which in combination produce the concealing pattern A' will be displayed. The displayed second set of one or more images corresponds to a second pattern A', where the second pattern is a concealing pattern with respect to the illumination pattern A.

Step 1412 includes step 1413 in the case of a DLP embodiment where the second set of one or more images will include sub-frames corresponding to the second frame, e.g., concealing frame, which is displayed as the result of displaying the corresponding set of sub-frames.

In some embodiments as part of projecting an image sequence some non-patterned frames or a sequence of non-patterned frames may be displayed. Thus, the overall frame sequence can involve more than just illumination frames/images and concealing frames/images. Step 1408 includes, in some embodiments, steps 1414 and step 1416. In step 1414 the light projection device 108 is controlled to project a third image, e.g., frame. This involves in the case of DLP embodiment controlling the light projector 108 to project in sub-step 1415 a third image sequence, e.g., a third set of sub-frames corresponding to a third frame which is the third image. In step 1416 the light projection device 108 is controlled to project a fourth image, e.g., frame. This involves in the case of DLP embodiment controlling the light projector 108 to project in sub-step 1417 a third fourth image sequence, e.g., a fourth set of sub-frames corresponding to a fourth frame which is the fourth image.

The light projector is controlled by the processor 202 to project images, e.g., frames, on an ongoing basis as represented by the arrow showing operation proceeding from the bottom of step 1408 back to the top of step 1408.

While the light projector, e.g., illumination device 108, projects images, the processor 202 controls one or more cameras to capture images which are then stored, processed and/or used for various operations. Operation is shown in FIG. 14 proceeding from step 1406 in parallel to step 1408, which has already been described, and to image capture step 1418 which will now be described.

In step 1418 the processor 202 operates one or more cameras, e.g., cameras 114, 116, 174, 176 to capture images. For purposes of explanation, it will be presumed that the first camera C1 114 is used to capture an image used for depth determination purposes. In the case where the depth determination is made based on a structured light pattern captured by a single camera the image or images captured by camera C1 114 is used for depth determination purposes. In cases where stereoscopic depth determinations are made, images captured by the first and second cameras, C1 114 and C2 116 are used for depth determinations with the images used including light patterns due to the projection of a light pattern by the illumination device 108.

In addition to capturing light patterns including a visible illumination pattern images without a visible illumination pattern are captured in some embodiments and/or generated by combining captured images as will be discussed further below.

The same camera used to capture a patterned image for stereoscopic depth determination can be used to capture a non-patterned image and/or images captured with patterns by a camera used for stereoscopic depth determinations can be combined to form a non-patterned image. However, it is often useful to include additional cameras for the capture of non-patterned images or of images intended for image combining. In some embodiments additional cameras C3 174 and/or C4 176 are used for capturing additional images which can include a pattern, not include a pattern and/or be combined to form a non-patterned image. Thus, any of the cameras C1 114, C2 116, C3 174 and/or C4 176 can be used to capture a pattern or non-pattern image. Exposure times which can be used to capture images which show an illumination pattern will be explained with respect to FIG. 21 while exposure times which can be used capture images which do not show an illumination pattern will be explained with reference to FIG. 22. As mentioned above images captured with exposure times which result in the image including a visible illumination pattern can be combined in many cases to produce a non-patterned image, e.g., an image of an object which does not show an illumination pattern caused by the patterned illumination images projected by illumination device 108. The lower portion of FIG. 22 shows how various images corresponding to different exposure times can be combined to form non-patterned images even though the images being combined include illumination patterns. Normally images being combined to form a non-pattern image are captured by the same camera to simplify the combining process. However combined images could be, and sometimes are, captured by different cameras and combined, but this may involve registration and/or other processing to make sure that the pixel values being combined to form a pixel in the image being generated by the combining process correspond to the same portion of an object or scene area included in the captured image. For purposes of explaining the invention it will be assumed that patterned images being combined are captured by the same camera C1 114, C2 116, C3 174 or C4 176.

Referring once again to image capture step 1418, in this step the processor 202 controls the cameras to capture images while the area, e.g., area 1240, is illuminated by the illumination device 108 which in some but not all embodiments is a digital light projector. In the case of a non-DLP embodiment a constant image, e.g., an illumination pattern or concealing pattern will normally be projected during a frame time while in the case of a DLP light projector embodiment multiple sub-frames, each corresponding to a sub-frame image, are displayed during portions of a frame display period with the composite of the sub-frames representing the pattern being used to illuminate an area during which the sub-frame images are displayed.

Step 1418 includes one, some or all of the steps 1420, 1422, and 1424 with step 1424 in some embodiments being a portion of a step 1423 in which one or more images without an illumination pattern are produced through an image capture and/or image combining process.

In step 1420 image capture is synchronized with illumination image display, e.g., the projection of illumination and concealing frames by the illumination device 108. While step 1420 is shown as part of image capture step 1418, e.g., in cases where synchronization is based on received signals from the illumination device 108.

Figure 23:
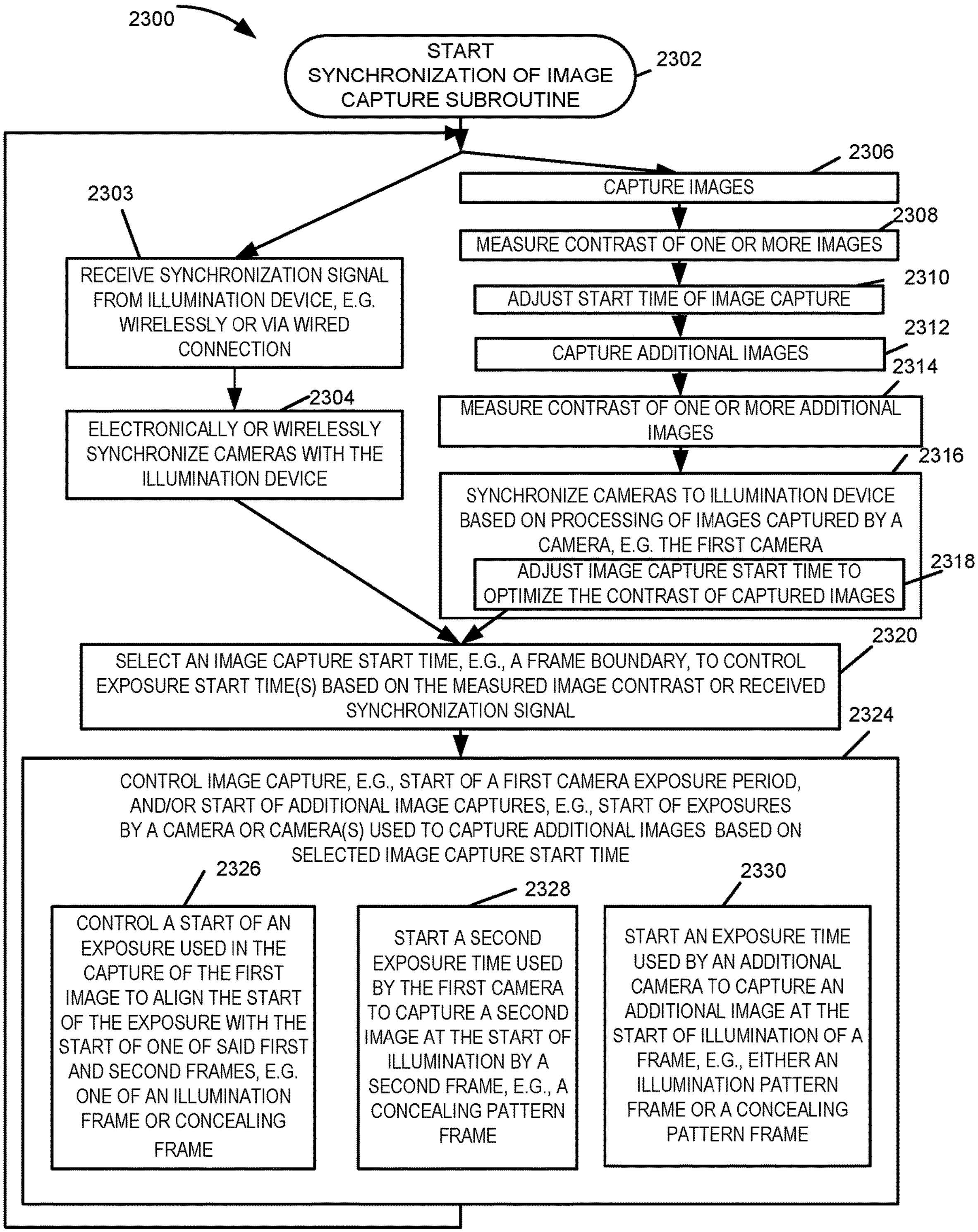
FIG. 23 shows a camera synchronization routine which can be used to synchronize image capture with illumination of an area by an illumination device of the present invention.

In some embodiments step 1420 is implemented by the processor 202 calling the synchronization of image capture subroutine 2300 shown in FIG. 23 which will now be discussed.

The synchronization sub-routine 2300 begins in step 2302 in response to being called and executed by the processor 202 which then controls various operations in accordance with the steps of the routine. From start step 2302 operation proceeds to synchronization related steps 2303 and 2306. In step 2303 which is implemented when wireless or wired synchronization signals sent by the illumination device 108 are used for camera synchronization, synchronization signals are received from the illumination device 108 either via a wire connection or wirelessly. Operation proceeds from step 2303 to step 2304 in which the cameras 114, 116, 174, and/or 176 are synchronized with the illumination device 108 based on the received signals. In this way image capture, e.g., the start of exposure times used by one or more cameras, can be easily synchronized with illumination device 108 frame display. With camera synchronization with the illumination device 108 having been implemented in step 2304 operation proceeds to step 2320.

In cases where synchronization signals from the illumination device 108 are not used for synchronization purposes, the processor 202 can, and sometimes does, use captured images to control synchronization with the display device. In step 2306 images are captured by a camera C1 114, C2 116, C3 174 or C4 176. At this point synchronization with the display of frames by the illumination device 108 may not have been achieved. Operation proceeds from step 2306 to step 2308 in which the contrast of one or more of the images captured in step 2306 is measured. Then, in step 2308 the start time of image capture is adjusted. Following the adjustment of the image capture start time, e.g. start of an exposure, additional images are captured in step 2312. In step 2314 the contrast of the additional images is measured. Thus, by the end of step 2314 the processor 202 has information for multiple different exposure start times and the contrast of images captured with each of the different start times. Operation proceeds from step 2314 to step 2316, in which the processor 202 synchronizes cameras to the illumination device 108 based on processing of images captured by a camera, e.g., the first camera C1 114. In some embodiments step 2316 includes step 2318 in which the image capture start time is adjusted to optimize the contrast of the captured images. This can be done by adjusting the capture start time to optimize, e.g., maximize, the contrast of captured images. This is likely to happen if the camera exposure start time is synchronized with the start of the display of a frame by illumination device 108. In some embodiments the start time which was determined based on image capture and contrast measurements to provide images having the highest contrast is used as the exposure start time used by the camera(s) when capturing an image or image sequence.

Operation proceeds from step 2318 to step 2320. In step 2320 image capture start times are determined for individual cameras C1 114, C2 116, C3 174, C4 176 with, in many cases, the start time of each exposure used to capture an image being synchronized with a frame boundary, e.g., the start of a displayed frame used to illuminate the scene area. The image capture start time determined in step 2320 can be based on the measured contrast of captured images and/or a received synchronization signal. In some cases, depending on whether a patterned image or non-patterned image is to be captured and the exposure time being used, synchronization of a camera image capture, e.g., exposure, may not have to be synchronized with the display of frames and in such cases the capture start time may be, and sometimes is, selected without reliance on achieving synchronization with the display device. This is often the case when a camera, e.g., additional camera C3 174 or C4 176, is dedicated to capturing non-patterned images and an exposure time which is an integer multiple of a known combined period of the illumination frame duration and concealing frame duration is used to capture a non-patterned image. However, in most cases of capturing patterned images it is desirable to use a synchronization time, synchronized with the start of a frame used to illuminate the area where the image is being captured with capture start times of the type shown in FIG. 21 being selected in many embodiments in step 2320 when a patterned image is to be captured.

Operation proceeds from step 2320 to step 2324, in which the processor 202 controls image capture of one or more cameras, e.g., camera sensor exposure, based on the image capture start time determined for a corresponding camera in step 2320. Different cameras C1 114, C2 116, C3 174, C4 176 can be, and sometimes are, controlled to use different start times and/or exposures depending on whether a patterned image is to be captured, a non-patterned image is to be captured or the camera is being used to capture multiple images to be combined to form a non-patterned image. All of the exposure durations and start times shown in FIGS. 21 and 22 are contemplated and are used in the same or different embodiments. An individual row of FIGS. 21 and 22 shows the exposure and exposure start time corresponding to an individual camera. Multiple cameras, e.g., cameras C1 114, C2 116 may be controlled to use the same exposure and start times for image capture while another camera, e.g., additional camera C3 174 or C4 176, may be, and sometimes is, used to capture images using a different exposure duration and/or start time. For example, cameras C1 114, C2 116 may be controlled to capture one or more patterned images using exposure and corresponding start times shown in FIG. 21 while an additional camera C3 174, C4 176 is controlled using exposure and start times shown in FIG. 22 to capture images which do not include an illumination pattern or which can be combined to produce a non-patterned image.

In some embodiments step 2324 includes steps 2326, 2328 and/or 2330. In step 2326 the processor 202 controls a start of a first camera C1 114, second camera C2 116, third camera C3 174, or fourth camera C4 174 exposure used in capturing a first image so that the start of the exposure is aligned with the start of an illumination frame or a concealing frame which is being displayed by illumination device 108 to illuminate area 1240 where the image is being captured. Such an alignment is particularly useful when trying to capture patterned images in which an image pattern due to illumination is desired.

In step 2328 the start of a second exposure time used by the first camera C1 114, second camera C2 116, third camera C3 174, or fourth camera C4 176 to capture a second image is controlled to correspond to the start of illumination by a second frame of the area 1240 in which images are being displayed. In the case where the first frame is an illumination frame the second frame will be a concealing frame in step 2328. However, if the first frame was a concealing frame the second frame captured in step 2328 by exposing the camera sensor will be an illumination frame. This is because first frame used for illumination may be an illumination frame or a concealing frame with the second frame used for illumination being the other one of the illumination frame or concealing frame so that the first and second captured images will be a pair of frames including an illumination pattern and a concealing pattern which were used to illuminate the area 1240 and thus an object in the area 1240. The second exposure time used in step 2328 will normally immediately follow the first exposure time used in step 2326.

In step 2330 the start of an exposure time used by an additional camera C3 174 or C4 176 is controlled to correspond to the start of illumination by a frame including either an illumination pattern or a concealing pattern. The exposure duration used in step 2330 by the additional camera may determine whether the captured image includes a pattern or not. Multiple images can be captured consecutively by the additional camera C3 174 or C4 176 based on a single exposure start time with the images in some cases being subsequently combined to produce an image that does not include an illumination image pattern despite individual images including an illumination pattern. The lower portion of FIG. 22 shows various exposure start times and image capture periods which can be used to capture images which can be, and sometimes are, combined to form a non-patterned image.

Operation is shown proceeding from step 2324 to the top of the flow and steps 2303, 2306 to indicate that the synchronization process can be performed on an ongoing basis with multiple images being captured and processed over time. However, in some embodiments where subroutine 2300 is called from the step of another method, e.g., by step 1420 of the method shown in FIG. 14, operation may return to the point where the call was made to the synchronization sub-routine 2300.

Referring once again to FIG. 14 with synchronization with the illumination device 108 having been achieved in step 1420 operation proceeds to image capture steps 1422 and/or 1424. Both 1422 and 1424 are performed in some embodiments but depending on the implementation one of steps 1422 and 1424 may be performed.

In step 1422 the processor 202 controls a camera e.g., camera C1 114 or cameras, e.g., first and second cameras C1 114 and C2 116, to capture one or more images including a pattern, e.g., a pattern caused by an illumination pattern projected by illumination device 108. In some embodiments step 1422 includes step 1422A in which a first camera C1 114 is controlled to capture a patterned image and step 1422B in which a second camera C2 116 is controlled to capture a patterned image. In the case of stereoscopic depth determinations, capturing of patterned images by two cameras at the same time can be useful in collecting images suitable for stereoscopic depth determinations. In the case of structured light based depth determinations based on a single captured image, capture of a patterned image by a single camera C1 114 can be sufficient.

In addition to capturing a patterned image where the image includes an illumination pattern, it can be desirable to capture or generate a non-patterned image of the same area or object included in an image which shows an illumination pattern. Step 1423 represents a step of producing one or more images without an illumination pattern. The producing of a non-patterned image in step 1423 may be by image capture or combining of captured images. In step 1424 one or more images without an illumination pattern are captured, e.g., using one of the exposure start times and/or exposure durations shown in FIG. 22. In some embodiments step 1424 includes step 1425 in which a non-patterned image is captured by an additional camera C3 174, C4 176. In some embodiments step 1425 includes step 1426 in which a camera used capture a patterned image, e.g., first camera C1 114, is used at a different time to capture a non-patterned image.

With image capture been performed in step 1418, operation proceeds to step 1428 which is used in some but not all embodiments. In step 1428 captured images, e.g., images including an illumination pattern, are combined to produce one or more images without an illumination pattern. The lower portion of FIG. 22 shows various image combinations which can be made to produce a non-patterned image form images including in image pattern captured by a camera. In many cases the combining involves combining pixel values on a per pixel basis from the different images being combined to produce an image which would have resulted if the combined image had been captured with an exposure time equal to the exposure time obtained by exposing the camera sensor for the sum of the exposure times of the images being combined.

As noted above the combined images are normally images which were captured sequentially by an individual camera to keep the combining process as simple as possible. Operation proceeds from step 1428 to step 1430. In cases where images are not combined, step 1428 is skipped, and operation proceeds directly from step 1418 to step 1430.

In step 1430 captured and/or generated images are stored, e.g., in memory 204 for depth determination, model training and/or other purposes. In step 1430 both images of an object or area including an illumination pattern are stored as well as captured or generated non-patterned images of the object or area. Thus, both images including an illumination pattern which are useful for depth determination operation and non-patterned images of the same object or area are stored in step 1430 with the correspondence between the images being indicated or known based on information stored with the images and/or how the images are stored in memory. Thus, both patterned and non-patterned images corresponding to the same object which were captured or generated from images captured at a given time are available for use in various operations that may be performed subsequent to image capture.

Operation proceeds from storage step 1430 to step 1432 in which depth information is determined for a captured image. In step 1432 a depth map for an area, e.g., including an object to be modeled or examined, is generated. In some embodiments the depth map is based on an image captured during an illumination period in which an illumination pattern was projected or a concealing period in which a concealing pattern was projected. Stereoscopic depth determination and/or a structured light based depth determination is made in step 1432 as part of generating a depth map. The depth map includes 3D object size and/or shape information given that it includes the distance or depth from a reference camera used to capture an image of the object to different points on the object in some embodiments. Multiple depth maps based on images captured from different directions can be and sometimes are used in generating a 3D model of an object.

Operation proceeds from step 1432 to model training step 1433, in which 3D and/or 2D models of an object included in the captured images are generated. In some embodiments in step 1433 a 3D object recognition model is generated which can be used for object recognition in the case where 3D information is available. The depth information generated in step 1432 is useful in generating the 3D object model. In some cases a 2D object recognition model is also generated in step 1433, e.g., a model which can be used to recognize an object based on a 2D captured image. By generating both 3D and 2D information and models a variety of recognition operations can be performed and supported based on the captured images.

Operation proceeds from step 1433 to step 1434, in which depth information, generated models, e.g., 2D and/or 3D models, along with non-patterned images of an object and/or illumination patterned images of the object are stored in memory 204 as part of stored information (SI) 1061.

With information and images having been stored in step 1434, operation proceeds to step 1436 in which an apparatus, e.g., vehicle or robotic device 104, is controlled based on depth information, e.g., a depth map, generated in step 1432. While in some embodiments the control of the apparatus may involve controlling a vehicle in other embodiments it may involve controlling movement of a pick arm used to pick up objects while in still other embodiment it may be used to control an air gun or arm used to move object which are to be rejected due to defects or otherwise sorted based on determined depth information.

The stored images and models can be, and sometimes are, communicated to other devices for use in control of remote devices and/or recognition of objects. The stored images and models can be used for model training and/or to update other models at a future time.

Operation is shown proceeding from step 1436 to steps 1408, 1418 to show that the illumination, image capture, depth determination, apparatus control and/or other operations shown in FIG. 14 can be, and sometimes are, performed on an ongoing basis.

FIGS. 15-20 will now be discussed to help explain how a Digital Light Projector (DLP) can be, and sometimes is, used as the illumination device/light projector 208 used in a manner consistent with various features which have already been discussed.

In the case of a DLP embodiment, the frame pattern, e.g., image pattern, displayed during a frame period, e.g., 1/60 of a second or less, is the result of displaying one or more sub-frames during the frame period, e.g., with individual light emitting elements being controlled to be in a fully on-state or fully off state during a subframe with the average light output over the frame time which includes multiple sub-frame resulting in the displayed frame image, e.g., illumination pattern or concealing pattern.

Figure 15:
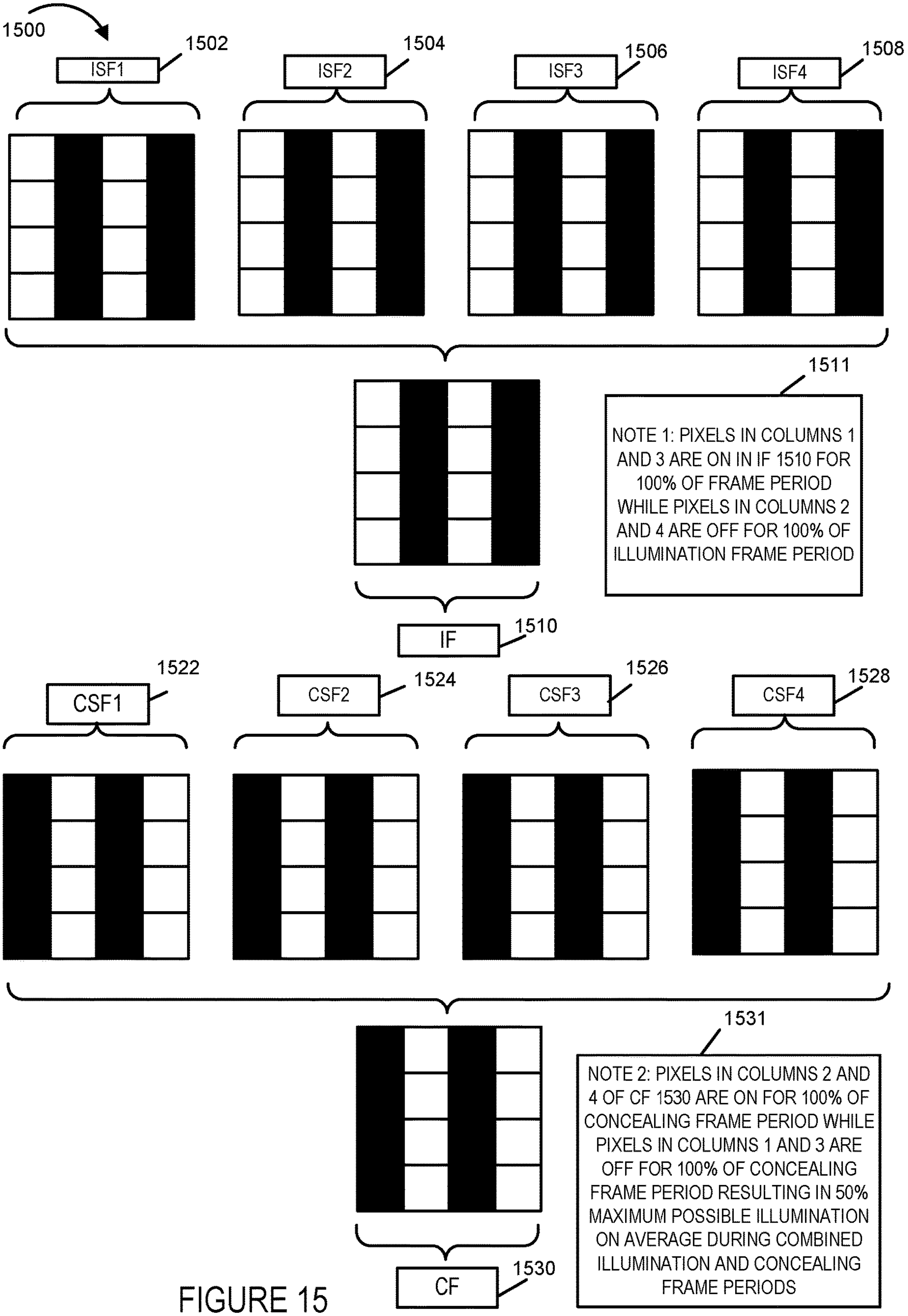
FIG. 15 shows illumination and concealing images, e.g., sub-frames and corresponding frames, which are displayed in some embodiments using a digital light projector.

FIG. 15 shows illumination and concealing images, e.g., sub-frames and corresponding frames, which are displayed in some embodiments using a digital light projector. In the case of FIGS. 15-20 squares are used to represent a set of light emitting devices corresponding to individual pixels with the understanding that at the lowest level the individual light emitters can be controlled to form the desired pattern. Simple column patterns are shown to help explain the invention with regard to a DLP embodiment. However, much more complicated illumination and concealing patterns are possible with such patterns being of the type shown in other figures. In addition color patterns can be supported using the same technique which is explained in the context of a monochrome black/white example.

In FIG. 15, diagram 1500 shows how an illumination frame 1510 which includes alternating light and dark columns forming an illumination pattern can be generated using a DLP which displays illumination sub-frames (ISFs) ISF1 1502, ISF2 1504, ISF3 1506 and ISF4 1508 sequentially during the illumination frame period corresponding to IF 1510 with each subframe being displayed for 1/4 of the time period corresponding to the duration of illumination frame 1510. In FIG. 15 blocks 1511 and 1531 include information notes. Note that that as a result of the sequential display of ISFs 1502, 1504, 1506, and 1508 the IF 1510 will have a frame in which the pixels of columns 1 and 3 are on in all the subframes and the pixels of columns 2 and 4 will be off during all the subframes resulting in IF 1510 having the pixels of columns 1 and 3 on while the pixels of columns 2 and 4 are off. Concealing sub-frames CSF1 1522, CSF2 1524, CSF3 1526 and CSF4 1528 have the inverse pattern of the illumination frames with the first and third columns of pixels being off in all subframes of the concealing frame and the second and fourth columns of pixels being on during each of the subframes resulting in the off, on, off, on column pattern of concealing frame 1530. Note that in the DLP implementation the patterns in the illumination frame and concealing frame are the result of the composite of the subframes forming the illumination frame and concealing frame, respectively, with each pixel being in an on or off state at any given time to which a subframe corresponds.

Figure 16:
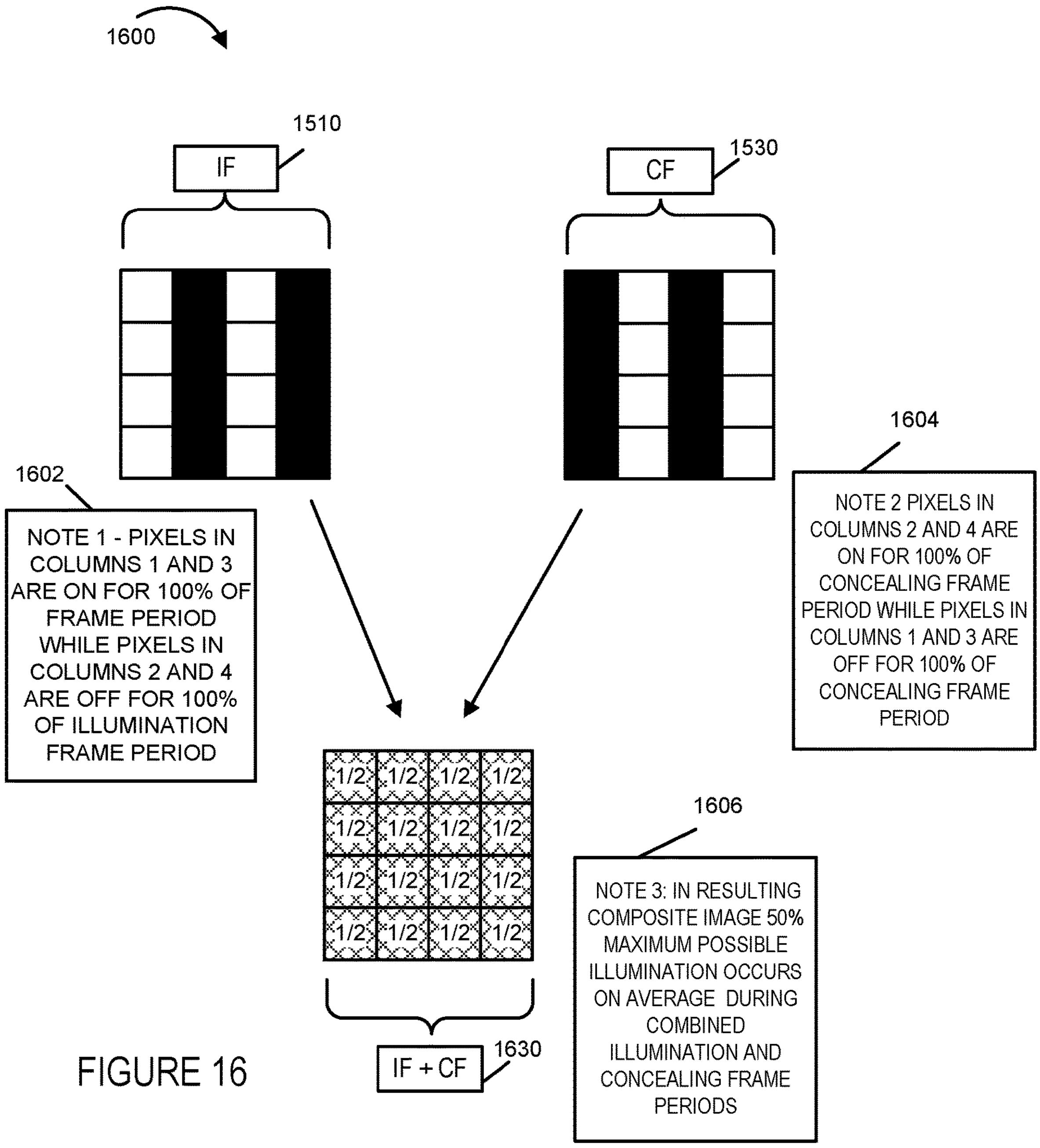
FIG. 16 shows an image which will be perceived when illumination frame and concealing frame are viewed, captured with an exposure period corresponding to their combined duration and/or combined to form a single image equivalent to an image with the combined exposure time of the illumination frame and concealing frame of the frames shown in FIG. 15.

FIG. 16 is a diagram 1600 showing an image 1630 which will be perceived when illumination frame 1510 and concealing frame 1530 are viewed consecutively or captured with an exposure period corresponding to their combined duration of IF 1510 and CF 1530. Note that in the combined image the perceived intensity of each of the pixels is 1/2 the full output of the pixel since each pixel is on for 50% of the exposure period to which frame 1630 corresponds. Frame/image 1630 can be, and sometimes is, generated by combining captured images corresponding to IF 1510 and CF 1530 into a single composite image 1630. In FIG. 16, blocks 1602, 1604, 1606 provide information notes that are useful in understanding the figure. Note that in image 1630 the amount of illumination over the area to which the image corresponds is uniform.

Figure 17:
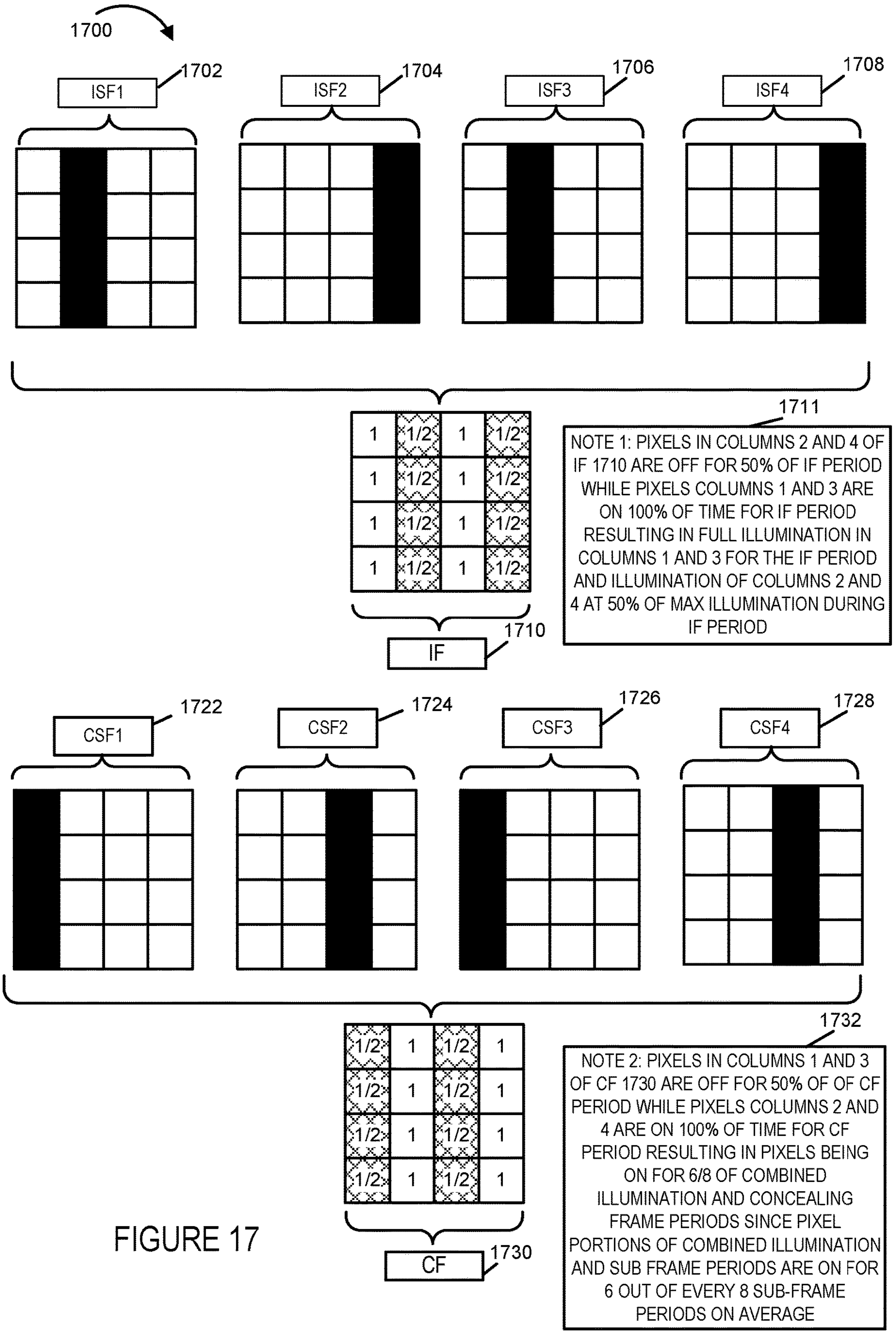
FIG. 17 shows illumination and concealing images, e.g., sub-frames and corresponding frames, which are displayed in some embodiments using a digital light projector.

FIG. 17 is a diagram 1700 showing illumination and concealing images, e.g., sub-frames and corresponding frames, which are displayed in some embodiments using a DLP as the illumination device 108. In FIG. 17, boxes 1711, 1732 provide informational notes which help explain the figure.

Illumination sub-frames (ISFs) ISF1 1702, ISF2 1704, ISF3 1706 and ISF4 1708 will be displayed sequentially during the illumination frame period corresponding to IF 1710 with each subframe being displayed for 1/4 of the time period corresponding to the duration of illumination frame 1710. Note that as a result of the sequential display of ISFs 1702, 1704, 1706, and 1708 the IF 1710 will have a frame in which the pixels of columns 1 and 3 are on in all the subframes and the pixels of columns 2 and 4 will be off during 50% (1/2) of the subframes resulting in IF 1710 having the pixels of columns 1 and 3 full on while the pixels of columns 2 and 4 are perceived as having an illumination level of 1/2 the maximum full on level.

Concealing sub-frames CSF1 1722, CSF2 1724, CSF3 1726 and CSF4 1728 have the inverse pattern of the illumination sub-frames 1702, 1704, 1706, 1708 with the first and third columns of pixels being off in 50% of the sub-frames of the concealing frame and pixel columns two and four being on during each of the subframes of the concealing frame resulting in the pixels of columns 1 and 3 appearing to have a 50% intensity and pixels of columns 2 and 4 to be at the full on intensity in concealing frame 1730.

Figure 18:
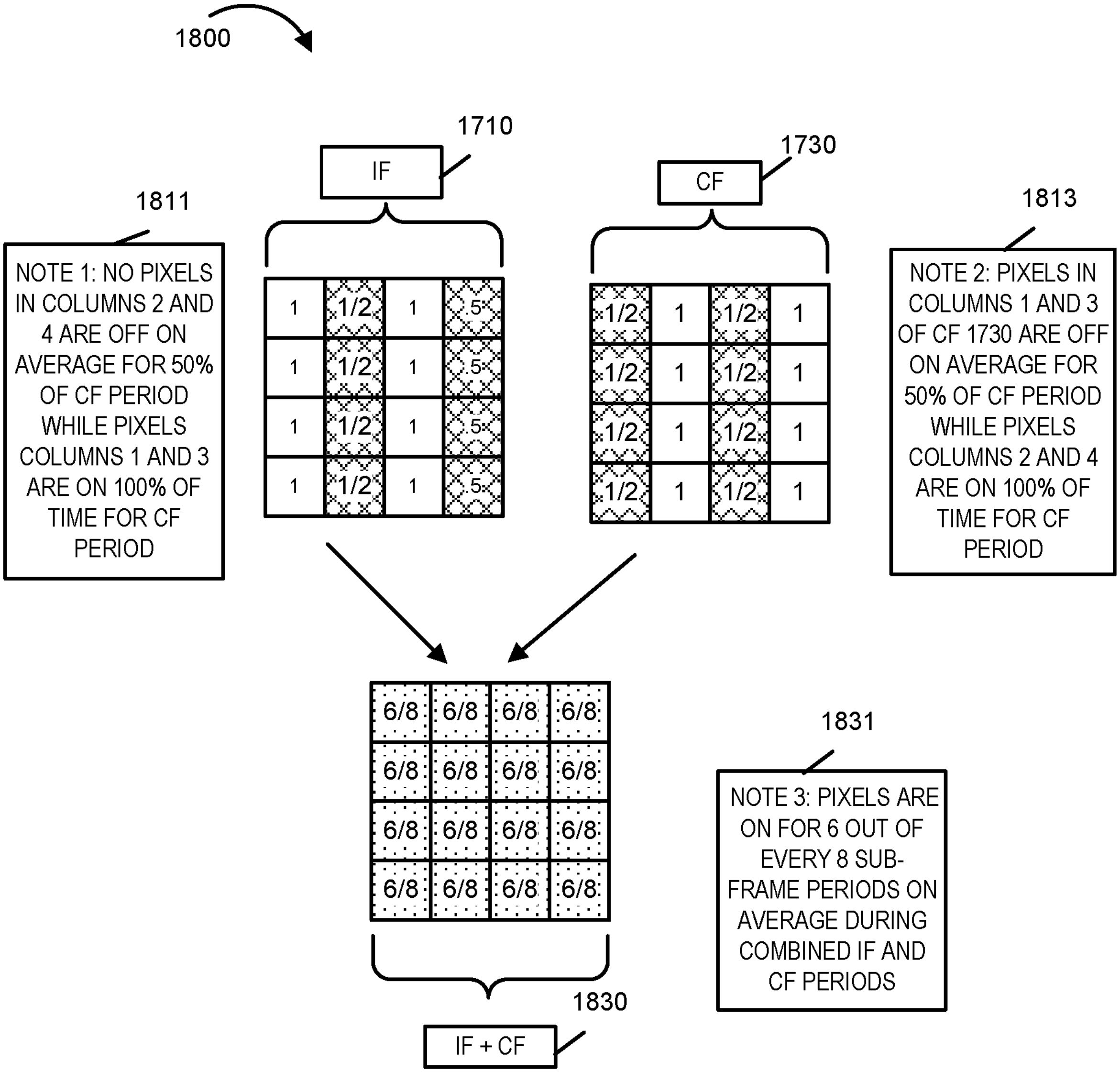
FIG. 18 shows an image which will be perceived when illumination frame and concealing frame are viewed, captured with an exposure period corresponding to their combined duration and/or combined to form a single image equivalent to an image with the combined exposure time of the illumination frame and concealing frames shown in FIG. 17.

FIG. 18 is a diagram 1800 showing an image 1830 which will be perceived or captured when illumination frame 1710 and concealing frame 1730 are viewed consecutively or captured with an exposure period corresponding to their combined duration of IF 1710 and CF 1730. In FIG. 18 boxes 1811, 1813, 1831 provide information notes which are useful in understanding the figure. Note that in the combined image the perceived intensity of each of the pixels is 6/8 the full output of the pixel since each pixel is on for 6/8 of the exposure period to which frame 1830 corresponds. Frame/image 1830 can be and sometimes is generated by combining captured images corresponding to IF 1710 and IF 1730 into a single composite image 1830. Note that in image 1830 the amount of illumination over the area to which the image corresponds is uniform.

Figure 19:
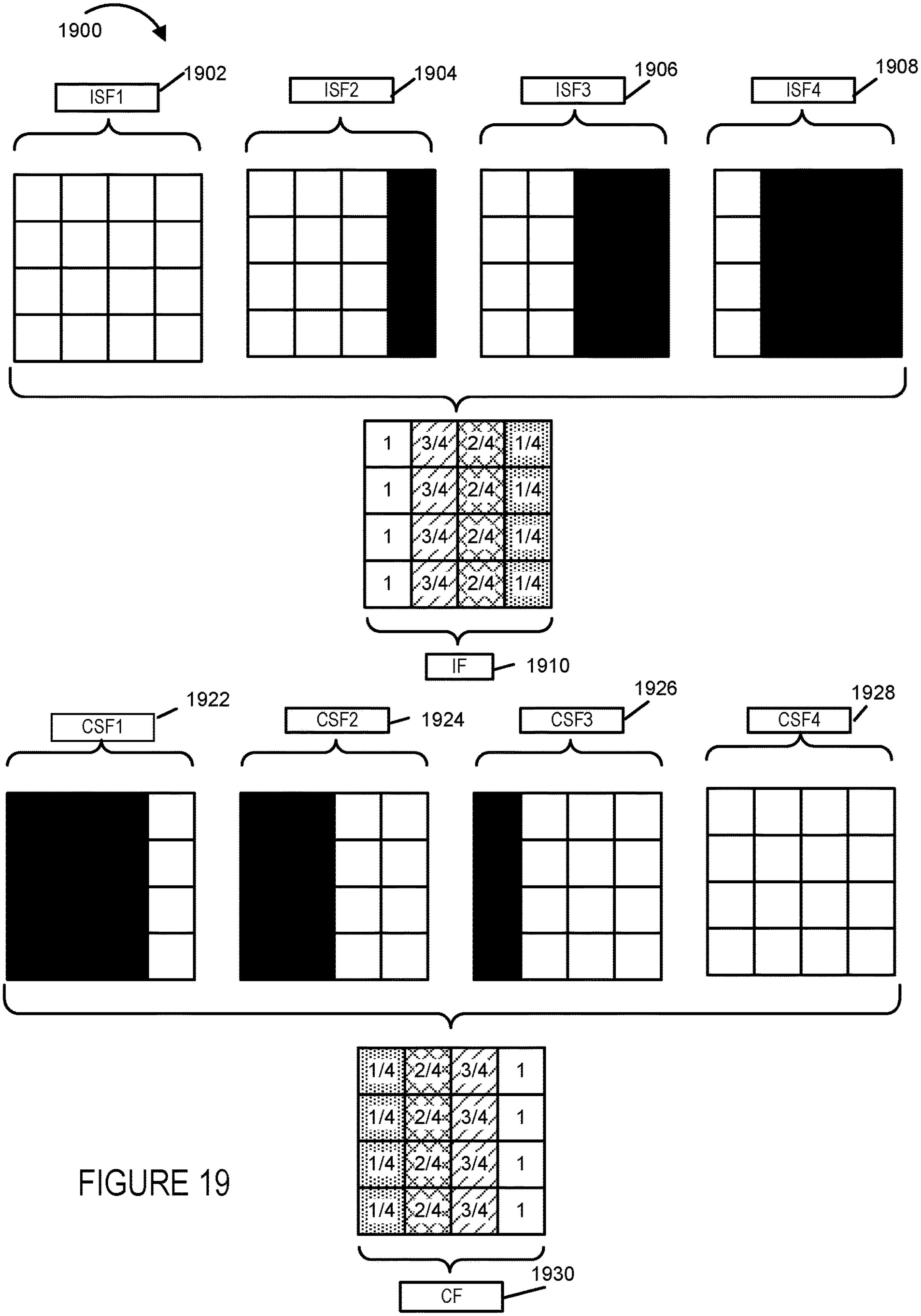
FIG. 19 shows illumination and concealing images, e.g., sub-frames and corresponding frames, which are displayed in some embodiments using a digital light projector.

FIG. 19 is a diagram 1900 showing illumination and concealing images, e.g., sub-frames and corresponding frames, which are displayed in some embodiments using a DLP as the illumination device 108.

Illumination sub-frames (ISFs) ISF1 1902, ISF2 1904, ISF3 1906 and ISF4 1908 will be displayed sequentially during the illumination frame period corresponding to IF 1910 with each subframe being displayed for ¼ of the time period corresponding to the duration of illumination frame 1910. Note that as a result of the sequential display of ISFs 1902, 1904, 1906, and 1908 the IF 1910 will have a frame in which the pixels of column 1 will be on for the full frame duration, the pixels of column 2 will be on for ¾ of the frame duration, the pixels of column 3 will be on for 2/4 the frame duration and the pixels of column 4 will be on for ¼ the frame duration, resulting in the first column appearing the brightest and each successive column being darker resulting in a light gradient across the illumination frame 1910 as part of the illumination pattern.

Concealing sub-frames CSF1 1922, CSF2 1924, CSF3 1926 and CSF4 1928 have the inverse pattern of the illumination frames 1902, 1904, 1906, 1908 with fourth column being the brightest since the pixels are on in that column for all of the subframes of the concealing frame period, with the pixels of column 3 being on for ¾ of the concealing frame period, with the pixels of column 2 being on for 2/4 the concealing frame period and with the pixels of column 1 being on for ¼ the concealing frame period. The fraction of time the pixels are on during the frame duration will be perceived as an intensity level for that portion of the frame, e.g., with column 1 of the concealing frame 1930 appearing to have an intensity ¼ the maximum possible output of the pixel elements since the pixel elements are on in column 1 for only ¼ of the concealing frame period.

Figure 20:
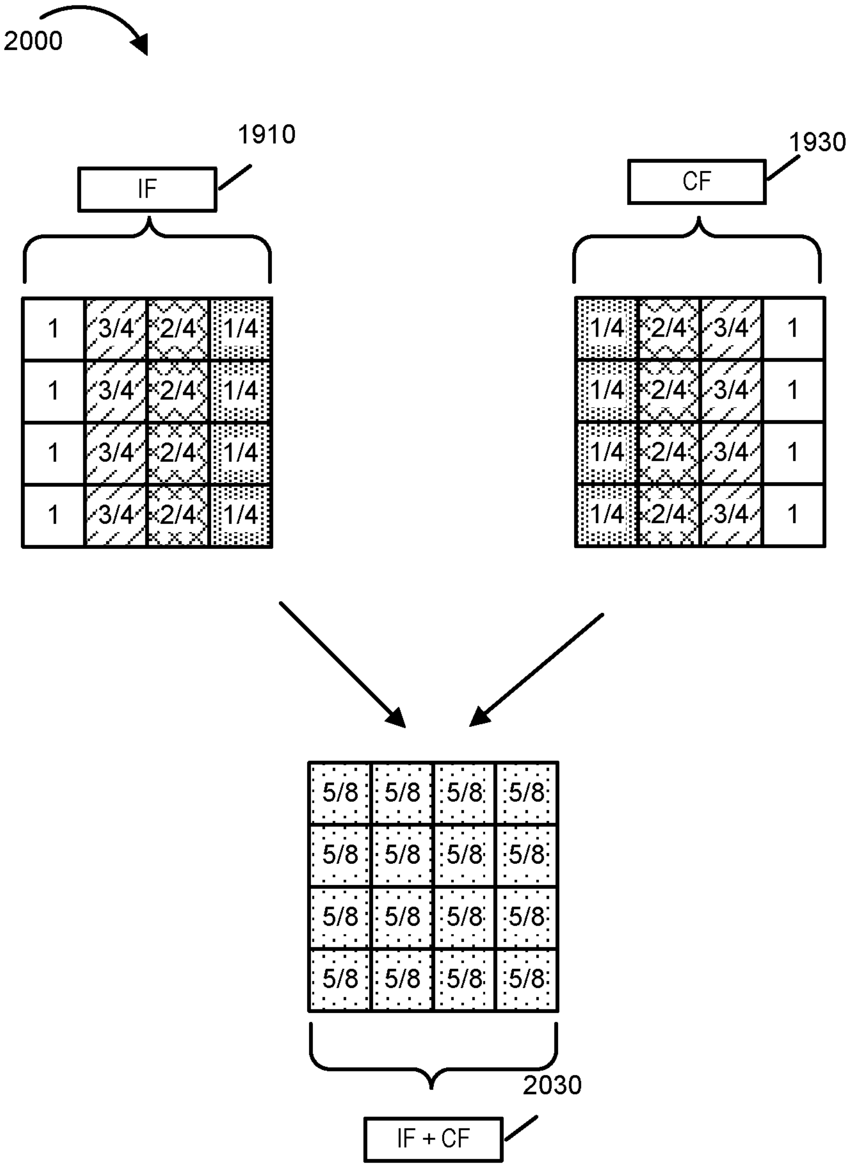
FIG. 20 shows an image which will be perceived when illumination frame and concealing frame are viewed, captured with an exposure period corresponding to their combined duration and/or combined to form a single image equivalent to an image with the combined exposure time of the illumination frame and concealing frames shown in FIG. 19.
Figure 21:
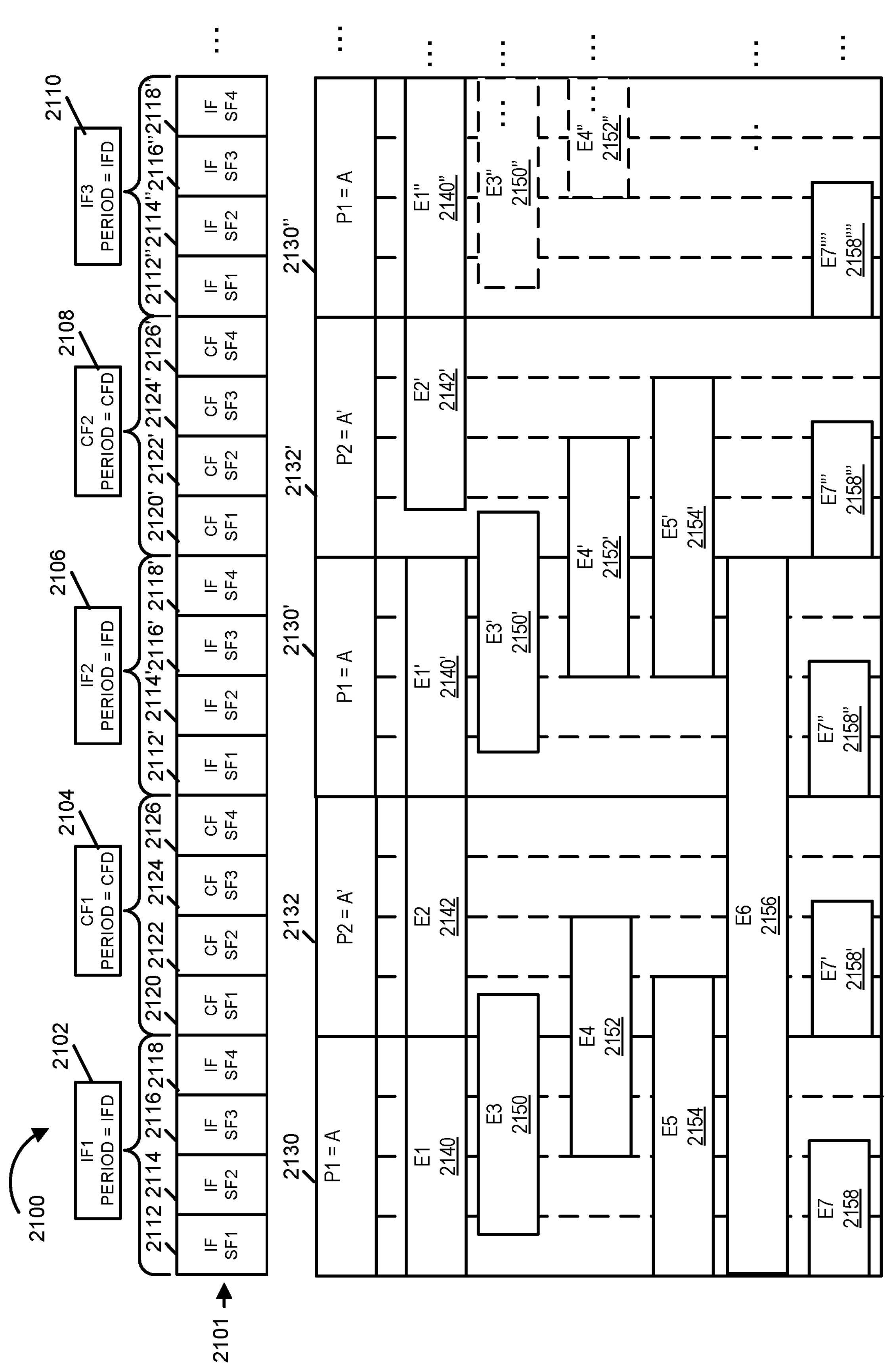
FIG. 21 shows various exposure times and/or exposure start times relative to display of illumination and concealing frames that will result in an image including an illumination pattern being captured where the captured illumination pattern may be due to a pattern displayed during an illumination image (e.g., illumination frame) display time and/or concealing image (e.g., concealing frame) display time.

FIG. 20 is a diagram 2000 showing an image 2030 which will be perceived or captured when illumination frame 1910 and concealing frame 1930 are viewed consecutively or captured with an exposure period corresponding to their combined duration of IF 1910 and CF 1930. Note that in the combined image 2030 the perceived intensity of each of the pixels is ⅝ the full output of the pixel since each pixel is on for ⅝ of the exposure period to which frame 2030 corresponds. Frame/image 2030 can be, and sometimes is, generated by combining captured images corresponding to IF 1910 and CF 1930 into a single composite image 2030. Note that in image 2030 the amount of illumination over the area to which the image corresponds is uniform.

FIG. 21 is a diagram 2100 shows various exposure times and/or exposure start times relative to display of illumination and concealing frames that will result in an image including an illumination pattern being captured. The captured illumination pattern which will be visible on object on which the illumination and concealing frames are projected may be due to a pattern displayed during an illumination image (e.g., illumination frame) display time and/or concealing image (e.g., concealing frame) display time.

In FIG. 21 time is shown progressing from left to right with the reference 2101 being used to indicate an illumination sequence projected by illumination device 108 in one embodiment. A first illumination frame 2102 is displayed during period 2130 which has a period P1 during which illumination pattern A is projected by the illumination device 108. A first concealing frame CF1 2104 is displayed during concealing frame period 2132 which has a period P2 during which concealing pattern A' is displayed. The period of the first illumination frame IF1 2102 is abbreviated IFD for illumination frame duration. The IFD corresponds to the period P1 2130. The period of the first concealing frame CF1 2104 is abbreviated CFD for concealing frame duration. The CFD corresponds to the period P2 2132. The frame reference number 2102 is used to refer to the illumination frame IF 1 2102 and also, in some cases, the set of subframes which make up the illumination frame IF 1, e.g., in the case of a DLP embodiment sense the set of sub-frames form the illumination frame when displayed.

In some embodiments a consistent illumination pattern image is displayed during the illumination frame period 2102 but in a DLP embodiment the illumination frame period may be divided into multiple sub-frame periods. In such a case subframes like those shown in the examples of FIGS. 15-19 may be displayed as part of projecting the illumination and/or concealing frame. In the FIG. 21 example, the first illumination frame (IF) 2102 includes four sub-frames (SFs) IF SF1 2112, IF SF2 2114, IF SF3 2116, IF SF4 2118. Similarly the first concealing frame 2104 includes concealing frame (CF) subframes CF SF1 2120, CF SF2 2122, CF SF3 2124, and CF SF4 2126. With regard to the remaining illumination frames 2106, 2110 and concealing frames 2108, the frames include the same or similar subframes with a ' being used following a reference number to indicate another instance of a particular frame, subframe or exposure period. Dashed lines are used to show exposure periods which are only partially shown while a sequence of dots, e.g., . . . , is used to show that the sequence can, and sometimes does, continue.

Diagram 2100 shows exposure times which can, and sometimes are, used to capture an image or images which will show an illumination pattern due to the exposure corresponding to an illumination pattern or a concealing pattern that is not fully canceled out during the exposure.

As shown in the first row exposure E1 2140 corresponding to illumination frame period 2130 in which the pattern of illumination frame 2102 is projected will result in capture of an image including an illumination pattern. Similarly, exposure E2 2142 which corresponds to the display of the pattern of concealing frame 2104 will result in the capture of an image including the concealing frame pattern. By aligning the exposure times E1 and E2 so that they start at the beginning of the corresponding frame display time the intensity and/or contrast of the captured image pattern is maximized.

A pattern including an illumination image can also be captured by using an exposure time which is equal to a frame period but not aligned to the start of the frame display period as shown in the case of exposure E3 2150. However, in the case of a miss-aligned exposure time, the contrast visible in the pattern may be lower than if the capture period was aligned with the start of the frame display since a portion of the concealing frame 2104 may work to conceal some of the illumination frame pattern of frame 2102.

In the case of a frame having the period equal to that of the illumination and capture frame a pattern may be captured in the case of frame display/capture miss-alignment as in the case of exposure E4 2152 but in such a case whether a pattern is visible may depend on the alignment of the exposure period and/or the content of the subframes captured during such an exposure.

In the case of an exposure period which is not an integer multiple of the frame period, a pattern will be captured as in the case of exposure E5 2154 which has an exposure duration of 1.25 times the period P1, which matches the illumination frame duration and also matches the concealing frame duration in the FIG. 21 example.

A pattern will also be captured when an exposure corresponding to an odd integer multiple of the frame period is used as in the case of exposure E6 2156 where the exposure period is 3 times the frame period.

Using an exposure period less than a full frame time such as the case of exposure E7 2158 will also result in a captured image including a pattern due to the illumination device 108 displaying a pattern.

FIG. 22 shows various exposure times and/or exposure start times relative to display of illumination and concealing frames that will result in a captured image not showing an illumination pattern. FIG. 22 also shows how a non-patterned image can be generated by combining multiple captured images which each include a visible illumination pattern. The illumination image sequence 2101 in FIG. 22 is the same as the one shown in FIG. 21 and thus the same reference numbers will be used when referring to the frames and sub-frames of the sequence 2101 in both figures.

In FIG. 22 time is shown progressing from left to right. A first illumination frame 2102 is displayed during period 2130 which has a period P1 during which illumination pattern A is projected by the illumination device 108. A first concealing frame CF1 2104 is displayed during concealing frame period 2132 which has a period P2 during which concealing pattern A' is displayed. The period of the first illumination frame IF1 2102 is abbreviated IFD for illumination frame duration. The IFD corresponds to the period P1 2130. The period of the first concealing frame CF1 2104 is abbreviated CFD for concealing frame duration. The CFD corresponds to the period P2 2132. In the FIG. 22 example the illumination frame and concealing frame have the same durations. The time period shown in FIG. 22 may be the same time period as the one shown in FIG. 22. One or more cameras may be operated in parallel with some cameras capturing a patterned image due to the illumination patterns used to illuminate an area and other cameras capturing non-patterned images. Non-patterned images can be captured using various exposures shown in the upper portion of FIG. 22 while patterned images that can be captured and combined to form a non-patterned image are shown in the lower portion of FIG. 22 with a +sign being used to represent an intended image combining operation of images in the same row.

In some embodiments a consistent illumination pattern image is displayed during the illumination frame period 2130 but in a DLP embodiment the illumination frame period 2130 may be divided into multiple sub-frame periods in which subframe like those show in the examples of FIGS. 15-19 may be displayed as part of projecting the illumination and/or concealing frame. In the FIG. 22 example, the first illumination frame (IF1) 2102 includes four sub-frames (SFs) IF SF1 2112, IF SF2 2114, IF SF3 2116, IF SF4 2118. Similarly, the first concealing frame 2104 includes concealing frame (CF) subframes CF SF1 2120, CF SF2 2122, CF SF3 2124, and CF SF4 2126. With regard to the remaining illumination frames 2106, 2110 and concealing frame 2108, the frames include the same or similar subframes with a ' being used following a reference number to indicate another instance of a particular frame, subframe or exposure period.

Dashed lines are used to show exposure periods which are only partially shown while a sequence of dots, e.g., . . . , is used to show that the sequence can and sometimes does continue.

Diagram 2200 shows exposure times E8 23—, E9 2232, E10 2234 and E1 2236 which can be, and sometimes are, used to capture an image or images which do not show an illumination pattern due to the exposure corresponding to both an illumination pattern and a concealing pattern and as a result the concealing pattern operating to conceal or conceal the pattern projected during the illumination frame period.

As shown in the first row of exposures, an exposure E8 2300 which includes a full illumination frame and a full concealing frame will not include an illumination pattern due to the illumination pattern and concealing pattern canceling out each other so that the patterns are not visible. In fact, any exposure which is an integer multiple of the combined duration of the concealing frame and illumination frame will produce an image without a visible illumination pattern as represented by exposure E9 2232 which has a duration equal to the combined duration of the illumination frame period and concealing frame period but with the exposure starting at a time which is not aligned with a frame boundary. This fact makes it easy to capture non-pattern images by simply using an exposure time which is equal to, or an integer multiple of, the combined frame duration.

Exposure E10 2234 shows that an even multiple greater than 1 of the combined frame time will result in a non-patterned image capture as will an odd integer multiple of the combined frame time as represented by exposure time E11.

The lower portion of FIG. 2200 shows how images corresponding to consecutive camera exposure times can be combined to form a non-patterned images. Images corresponding to exposure E12 2338 and E13 2240, corresponding to an illumination frame display period and a concealing frame period respectively, can be combined to form a non-patterned image when the combined exposure time matches an integer multiple of the combined illumination frame and concealing frame duration. Similarly multiple images can be combined as long as the overall duration of the consecutive images matches the combined duration of the illumination frame and the concealing frame. This is represented by combining the images corresponding to exposures E14 2242 and E15 2244. This is also represented by combining three images corresponding to exposures E16 2246, E17 2248 and E18 2250 to generate a composite image corresponding to an exposure time matching the combined illumination frame and concealing frame duration.

Combining images corresponding to a full illumination frame period and a full concealing frame period will result in a non-patterned image even if the exposure periods used to capture the images were not contiguous. Such a case corresponds to combining of exposures E19 2250 and E20 2251.

Capturing an image using an exposure time E21 252 evenly spanning an illumination frame and concealing frame boundary or combining two images where each image corresponds to adjacent exposures of equal portions with one portion corresponding to an illumination frame and the other image portion corresponding to a concealing frame will result in a non-pattern image if the image displayed during the illumination frame and concealing frame periods are constant images. However, in the DLP case the result of such a capture or composting operation will depend on the content of the sub-frames to which exposure E21 2252 corresponds with their being a potential for the captured or composite image to include a pattern depending on the content of the subframes corresponding to the exposure period.

Combining images corresponding to a portion of an illumination frame and an equal size portion of a concealing frame will also result in a non-pattern composite image if the concealing frame portion displays an inverse of the illumination image portion captured during the exposure time corresponding to the illumination image as represented by the combination of exposures E22 2254 and E 23 2256. This will be the case if a single constant illumination image pattern is displayed during the illumination frame period and a single constant concealing image pattern is displayed during the concealing frame period.

As discussed above, in various embodiments the consecutive display of images for a short period of time is so that the images are not separately perceivable to the human eye. The second image pattern serves to conceal or hide the first image pattern when viewed by a human viewer. In combination the first and second images when shown sequentially, appear to a viewer in at least some cases as a uniform or generally uniform illumination of an area. For successful pattern concealment from a human viewer the concealing pattern need not be a perfect complementary match to the initial pattern used for illumination purposes. This is particularly the case when non-pattern frames are included in the frame sequence with pattern and corresponding concealing frame pairs.

In some embodiments, slight non-uniformities in each pixel's time-average intensity might be acceptable To achieve pattern concealment, the initial and concealing patterns, when combined, should add up to a uniform intensity but some variation may be acceptable.

As discussed above in some embodiments the second concealing image may not fully mask the pattern of the first image from a human viewer but may and sometimes does conceal the first image pattern to an extent that the combination of first and second image patterns, when viewed sequentially by a human viewer will not be distracting to the viewer.

In at least some embodiments the first image and second image are complementary images which, when viewed sequentially, appear to a viewer as providing uniform or generally uniform illumination, e.g., of an area upon which the first and images are projected. In at least one exemplary embodiment the first and second images are inverses of each other with the first and second images being monochrome images. In one such embodiment white or "on" pixels in the first image correspond to black or "off" pixels in the second image and black or "off" pixels in the first image correspond to "on" pixels in the second image.

In various embodiments the first image and concealing image are output and thus displayed/projected sequentially. In some such cases the first and second image patterns are displayed consecutively with each of the first and second images being displayed for a fraction of a second, e.g., 1/60th of a second or less so that a human will not perceive them as separate images.

The first and second images may be and sometimes are presented as part of a video sequence output by the illumination device 108. The video sequence is projected with the images, e.g., frames, of the video sequence being projected at a consistent frame rate, e.g., 1/60 or 1/120 of a second. While the video sequence includes recurring first and second images in some embodiments In various embodiments the images are preselected or designed so that a human viewer will perceive the sequentially displayed images as providing a uniform or generally uniform illumination of an area without a noticeable pattern being visible to the naked human eye. While the pattern in each of the images is not visible to a human since it is displayed for a short time and followed by a concealing image, the images with patterns can be captured by one or more cameras, e.g., stereoscopic camera pairs, and used for depth determination purposes.

In some embodiments the first images a random or pseudo random pattern and the concealing pattern is a complementary image of the pattern in the first image which when viewed after the first image gives a human viewer an impression of a uniform or nearly uniform light output being used to illuminate an area. In some cases, the concealing image is the complementary image used as the concealing image is the inverse of the pattern in the first image.

While some embodiments rely on monochrome e.g., black and white illumination patterns, other embodiments use color patterns. In the case of black and white images, the second/concealing image would include pixels of opposite values to the values included at the corresponding pixel locations of the first image. Thus, pixels that were black in the first frame are white in the second concealing frame which is displayed consecutive to the first frame and pixels that were white in the first frame are black in the second concealing frame. There are many patterns that can be used in accordance with the invention use. Random noise patterns are used in some embodiments.

In one such embodiment in a first image, each block is randomly assigned the original color or the complementary color with equal probability. The random noise pattern minimizes the likelihood of a random match and the choice of complementary colors maximizes the contrast. The color pattern also reduces the likelihood of a random match (needs to match all 3 channels rather than just 1) compared to a monochrome pattern.

In one color embodiment a color pattern is used for the first frame and for the second concealing frame which is consecutive to the first frame, the pattern is inverted., and in the color example, red pixels (R=255, G=0, B=0) are flipped with the complementary color cyan (R=0, G=255, B=255). These two frames alternate at high frequency so the pattern gets evened out by its inverse over time.

A color image can be constructed wherein each color channel, (e.g., R channel, G channel, B channel) or combination of color channels has the properties described of a monochrome image channel, e.g., luminance channel. Each color channel of a color image can have a noise pattern, gradient, or both in the same manner that a monochrome image can have a noise pattern, gradient, or both.

In some embodiments the light projection device 108 is an illumination device that is a narrow aperture illumination source where rays reaching a point in space are originating from a very small set of angles (e.g., have a unique/nearly unique origin). In the extreme, this is a perfectly collimated source where the rays are parallel.

Various exemplary numbered embodiments will now be discussed. Numbers which refer to a preceding numbered embodiment in each list of numbered embodiments refers to a preceding numbered embodiment in the same list.

First List of Exemplary Numbered Method Embodiments

Numbered Method Embodiment 1. A method of operating a system including a light projection device (108), the method comprising: projecting, from the light projection device (108), for a fraction of a second, a first image to illuminate an area; and projecting, from the light projection device (108), immediately following projecting the first image, a second image to illuminate the area, said second image being different from said first image and being a complementary image to said first image.

Numbered Method Embodiment 2. The method of Numbered Method Embodiment 1, wherein the projected light is visible light.

Numbered Method Embodiment 3. The method of Numbered Method Embodiment 2, wherein projecting said first image includes projecting the first image for 1/60th of a second or less; and wherein projecting said second image includes projecting the second image for 1/60th of a second or less.

Numbered Method Embodiment 4. The method of Numbered Method Embodiment 2, wherein said first image and said second image, through consecutive display of the first and second images, provide a uniform illumination.

Numbered Method Embodiment 5. The method of Numbered Method Embodiment 4, wherein said first image (402, 502, 602, 1102, 1202, or 1302) is a first pattern including a first set of pixels in a first state and a second set of pixels in a second state; and wherein said second image (404, 504, 604, 1104, 1204, or 1304) is a second pattern in which the first set of pixels in the second image is in the second state and the second set of pixels is in the first state.

Numbered Method Embodiment 6. The method of Numbered Method Embodiment 5, wherein the first and second images are monochrome images.

Numbered Method Embodiment 7. The method of Numbered Method Embodiment 6, wherein the first image and second images are inverses of each other.

Numbered Method Embodiment 8. The method of Numbered Method Embodiment 5, wherein the second image is an inverse image of the first image.

Numbered Method Embodiment 8A. The method of Numbered Method Embodiment 1, where the first image has a noise pattern and the second pattern has a complementary noise pattern in one or more channels or combination of channels in the image.

Numbered Method Embodiment 8B. The method of Numbered Method Embodiment 1, wherein the first image has a gradient in the average local intensity values in one or more channels of the image and the second image has a reverse gradient.

Numbered Method Embodiment 8C. The method of Numbered Method Embodiment 8B, wherein the gradient is a linear gradient in the direction of a stereo baseline.

Numbered Method Embodiment 9. The method of Numbered Method Embodiment 1, wherein said first image (402 or 502)) is a monochrome image comprising a first image frame including a plurality of pixel locations: wherein the first image (402 or 502) includes a first set of first intensity (e.g., white which are full intensity) pixels in a first set of pixel locations and a first set of second intensity (e.g., black which are full off) pixels in a second set of pixel locations; wherein said second image (404 or 504) is a monochrome image comprising a second image frame having the same number of pixels and pixel locations as the first image frame; and wherein the second image (404 or 504) includes a second set of second intensity pixels in the first set of pixel locations in the second image frame and a second set of first intensity pixels in the second set of pixel locations in the second image frame.

Numbered Method Embodiment 10. The method of Numbered Method Embodiment 1, wherein projecting, for a fraction of a second, a first image and projecting, immediately following projecting the first image a second image, includes projecting said first and second images a part of a video sequence having a frame rate of at least 1/60th of a second.

Numbered Method Embodiment 11. The method of Numbered Method Embodiment 10, wherein said video sequence includes a recurring sequence of said first and second images.

Numbered Method Embodiment 12. The method of Numbered Method Embodiment 1 wherein said light projecting device (108) is a Collimated light projecting device which projects visible light.

Numbered Method Embodiment 12A. The method of Numbered Method Embodiment cl wherein said light projecting device (108) is a global scan projection device and wherein the cameras (114, 116) used to capture images each include a global shutter image sensor (e.g., the projection device switches between frames on a global basis and is paired in some embodiments with cameras (114, 116) which each include a global image sensor where the whole sensor is exposed at the same time and does not implement a progressive scan when capturing images).

Numbered Method Embodiment 12B. The method of Numbered Method Embodiment 1 wherein said light projecting device (108) is a progressive scan display device and the cameras used to capture images each include a progressive scan image sensor (e.g., the progressive scan projecting device is associated and synchronized with progressive scan cameras with progressive scan image sensors with illumination and image capture scans being synchronized so that areas are illuminated as the are scanned).

Numbered Method Embodiment 12C. The method of Numbered Method Embodiment 1 wherein said light projecting device (108) is a digital micromirror (DMD) device.

Numbered Method Embodiment 12D. The method of Numbered Method Embodiment 1 wherein the light projection device (108) is located in close proximity, e.g., physically adjacent, to the cameras (114, 116) used for depth determination.

Numbered Method Embodiment 12E. The method of Numbered Method Embodiment 1, wherein the light projection device (108) illuminates the field of view of one or more cameras used to capture images for stereoscopic depth determination.

Numbered Method Embodiment 12F. The method of Numbered Method Embodiment 12E wherein the light projection device (108) and cameras (114, 116) are positioned so that image areas occluded from the field of view of the cameras (114, 116) is also occluded from the area illuminated by the light projection device (108) so that the illumination pattern matches or closely matches the image capture area used for depth determination purposes.

Numbered Method Embodiment 13. The method of Numbered Method Embodiment 12 wherein said collimated light projecting device (108) projects light in a first optical direction which is not perpendicular to vertical or horizontal surfaces included in the illuminated area.

Numbered Method Embodiment 13A. The method of Numbered Method Embodiment 1, wherein the system includes multiple light projection devices (108, 109), the multiple light projection devices (108, 109) including the said light projection device (108) and a second light projection device (109); and wherein the method further includes: projecting, from the second light projection device (109), for a fraction of a second, a third image to illuminate an area, projecting, from the second light projection device (109), immediately following projecting the first image, a fourth image to illuminate the area, said fourth image being different from said third image and being a complementary image to said third image, said third and fourth images being the same or different from said first and second images.

Numbered Method Embodiment 13B. The method of Numbered Method Embodiment 1, wherein said light projection device (108) includes multiple separate light emitting devices (103, 105) which, in combination, illuminate a scene area with the multiple separate light emitting devices/elements being used to project said first and second images sequentially.

First List of Exemplary Numbered System Embodiments

Numbered System Embodiment 1. A system (104) comprising: a light projection device (108): a memory (204) storing a first image and a second image: a processor (202) configured to control the light projection device to: project, from the light projection device (108), for a fraction of a second, the first image to illuminate an area and project, from the light projection device (108), immediately following projection of the first image, the second image to illuminate the area, said second image being different from said first image and being a complementary image to said first image.

Numbered System Embodiment 2. The system of Numbered System Embodiment 1, wherein the light projection device (108) is a visible light projector and wherein the projected light is visible light.

Numbered System Embodiment 3. The system of Numbered System Embodiment 2, the processor (202) is configured, as part of being configured to control the projection device (108) to: control the projection device (108) to project the first image for 1/60th of a second or less and then to project the second image for 1/60th of a second or less.

Numbered System Embodiment 4. The system of Numbered System Embodiment 2, wherein said first image and said second image, through consecutive display of the first and second images, provide a uniform illumination.

Numbered System Embodiment 5. The system of Numbered System Embodiment 4, wherein said first image (402, 502, 602, 1102, 1202, or 1302) is a first pattern including a first set of pixels in a first state and a second set of pixels in a second state; and wherein said second image (404, 504, 604, 1104, 1204, or 1304) is a second pattern in which the first set of pixels in the second image is in the second state and the second set of pixels is in the first state.

Numbered System Embodiment 6. The system of Numbered System Embodiment 5, wherein the first and second images are monochrome images.

Numbered System Embodiment 7. The system of Numbered System Embodiment 6, wherein the first image and second images are inverses of each other.

Numbered System Embodiment 8. The system of Numbered System Embodiment 5, wherein the second image is an inverse image of the first image.

Numbered System Embodiment 8A. The system of Numbered System Embodiment 1, where the first image has a noise pattern and the second pattern has a complementary noise pattern in one or more channels or combination of channels in the image.

Numbered System Embodiment 8B. The system of Numbered System Embodiment 1, wherein the first image has a gradient in the average local intensity values in one or more channels of the image and the second image has a reverse gradient.

Numbered System Embodiment 8C. The system of Numbered System Embodiment 8B, wherein the gradient is a linear gradient in the direction of a stereo baseline.

Numbered System Embodiment 9. The system of Numbered System Embodiment 1, wherein said first image is a monochrome image (402 or 502) comprising a first image frame including a plurality of pixel locations: wherein the first image (402, 502) includes a first set of first intensity (e.g., full intensity) pixels in a first set of pixel locations and a first set of second intensity (e.g., black, full off) pixels in a second set of pixel locations: wherein said second image is a monochrome image comprising a second image frame having the same number of pixels and pixel locations as the first image frame; and wherein the second image includes a second set of second intensity pixels in the first set of pixel locations in the second image frame and a second set of first intensity pixels in the second set of pixel locations in the second image frame.

Numbered System Embodiment 10. The system of Numbered System Embodiment 1, wherein projecting, for a fraction of a second, a second image, immediately following projecting the first image, includes projecting said first and second images as part of a video sequence having a frame rate of at least 1/60th of a second.

Numbered System Embodiment 11. The system of Numbered System Embodiment 10, wherein said video sequence includes a recurring sequence of said first and second images.

Numbered System Embodiment 12. The system of Numbered System Embodiment 1 wherein said light projecting device (108) is a Collimated light projecting device which projects visible light.

Numbered System Embodiment 12A. The system of Numbered System Embodiment 1, wherein said light projecting device (108) is a global scan projection technology device and wherein the cameras used to capture images each include a global shutter image sensor (e.g., a projection device which performs switches between displayed frames on a global basis is paired in some embodiments with cameras with a global image sensor where the whole sensor is exposed at the same time).

Numbered System Embodiment 12B. The system of Numbered System Embodiment 1, wherein said light projecting device (108) is a progressive scan display technology device and the cameras (114, 116) used to capture images each include a progressive scan image sensor (e.g., in such a case the progressive scan projecting device is paired with progressive scan cameras with the light projecting device 108 illuminating the scan area in a synchronized manner with the capture of the scene area by the progressive scan image sensors of the cameras being used to capture images).

Numbered System Embodiment 12C. The system of Numbered System Embodiment 1 wherein said light projecting device (108) is a digital micromirror (DMD) device.

Numbered System Embodiment 12D. The system of Numbered System Embodiment 1 wherein the light projection device (108) is located in close proximity to the cameras used for depth determination.

Numbered System Embodiment 12E. The system of Numbered System Embodiment 1, wherein the light projection device (108) illuminates the field of view of one or more cameras (114, 116) used to capture images for stereoscopic depth determination.

Numbered System Embodiment 12F. The system of Numbered System Embodiment 12E wherein the light projection device (108) and cameras (114, 116) are positioned so that image areas occluded from the field of view of the cameras (114, 116) are also occluded from the area illuminated by the light projection device (108) so that the illumination pattern area matches or closely matches the image capture area used for depth determination purposes.

Numbered System Embodiment 13. The system (104) of Numbered System Embodiment 12 wherein said light projecting device (108) which in some but not all embodiments is a collimated light projecting device, projects light in a first optical direction which is not perpendicular to vertical or horizontal surfaces included in the illuminated area.

Numbered System Embodiment 13A. The system (104) of Numbered System Embodiment 1, wherein the system includes multiple light projection devices (108, 109), the multiple light projection devices (108) including the said light projection device (108) and a second light projection device (109); and wherein the processor (202) further controls second light projection device (109) to: project, from the second light projection device (109), for a fraction of a second, a third image to illuminate an area, and project, from the second light projection device (109), immediately following projecting the first image, a fourth image to illuminate the area, said fourth image being different from said third image and being a complementary image to said third image, said third and fourth images being the same or different from said first and second images.

Numbered System Embodiment 13B. The system of Numbered System Embodiment 1, wherein said light projection device (108) includes multiple separate light emitting devices (103, 105) which, in combination, illuminate a scene area with the multiple separate light emitting elements being used to project said first and second images.

Second List of Exemplary Numbered Method Embodiments

Numbered Method Embodiment 1. A method (1400) of capturing images of an area illuminated with an illumination sequence of frames (2101) including a first illumination frame (IF1 2102) corresponding to a first illumination frame period (2130) having a first light pattern followed by a first concealing frame (CF1 2104) having a second light pattern, the first illumination frame period (2130) having a first frame duration (P1), the first concealing frame (CF1 2104) having a second frame duration (P2), the second light pattern concealing the first light pattern when the illuminated area (1240) is observed over a duration corresponding to the combined period having a combined duration (CP) equal to the sum of the first and second frame durations (CP=P1+P2), the method comprising: operating a first camera (C1 114) to capture (1422A) a first image of the illuminated area (1240) using an exposure time which is different from said combined duration (CP), the captured first image including a light pattern due to the illumination of the illuminated area (1240); and making a depth determination (1432) based on the first image.

Numbered Method Embodiment 1AA. The method of Numbered Method Embodiment 1, wherein said first exposure time has a duration equal to the first duration (i.e., the duration of a first illumination frame).

Numbered Method Embodiment 1BB. The method of Numbered Method Embodiment 1AA, wherein said first exposure time (e.g., E1 2140) is aligned to begin with beginning of the first illumination frame period (2130). (In some embodiments synchronization is used to align exposure with a frame boundary and an entire frame is then captured.)

Numbered Method Embodiment 1BC. The method of Numbered Method Embodiment 1, wherein said first illumination frame (IF1 2102) and the first concealing frame (CF1 2104) have the same duration (P1=P2) and wherein the exposure time is aligned to begin with the start of one of the first illumination frame period (2130) or the start of first concealing frame period (2132).

Numbered Method Embodiment 1A. The method of Numbered Method Embodiment 1, further comprising: controlling (1436) a machine (e.g., vehicle, robotic device, sorting machine such as a sorting machine used for quality control purpose) based on the determined depth to one or more objects in said first image (where in the case of multiple objects the depths to different objects can be and sometimes are different).

Numbered Method Embodiment 2. The method of Numbered Method Embodiment 1, further comprising: producing (1423) an additional image of the illuminated area (1240) which does not include said first light pattern, producing (1423) the additional image including at least one of: i) operating an additional camera (e.g., C3 174 or C4 176) (e.g., an additional camera that is used to capture non-patterned images of the scene area) to capture the additional image of the illuminated area (1240), using an exposure time which is an integer multiple of the combined frame duration: ii) generating (1428) the additional image by combining first and second images captured by said first camera or an additional camera (C2 116, C3 174 or C4 176), (note that normally the images being combined will be from the same camera), said first image corresponding to a first exposure frame time and said second image corresponding to a second exposure frame time that follows (e.g., immediately follows in most cases) said first exposure frame time, or iii) operating the first camera (C1 114) to capture the additional image of the illuminated area (1240) using an exposure time which is an integer multiple of the combined frame duration.

Numbered Method Embodiment 3. The method of Numbered Method Embodiment 2, further comprising: storing (1430) the additional image which does not include an illumination pattern; and performing (1433) a model training operation, using the additional image, (e.g., a 2D model training operation based on non-patterned images of an object) to train a model (e.g., a 2 D model) to recognize an object in the additional image.

Numbered Method Embodiment 3A. The method of Numbered Method Embodiment 2, wherein said first and second light patterns are not visible in said additional image.

Numbered Method Embodiment 3AB. The method of Numbered Method Embodiment 2, wherein the method includes said step of generating (1428) the additional image by combining first and second images captured by said first camera (C1 114) or an additional camera (C2 116, C3 174 or C4 176), said first image corresponding to a first exposure frame time and said second image corresponding to a second exposure frame time following (e.g. immediately following) said first exposure frame time; and wherein the method further includes: synchronizing (1420), prior to capture of the first and second images, the first camera with the illumination device illuminating said area (e.g., based on a wired signal, wirelessly or based on the detecting the timing of the illumination frames projected by the illumination device.

Numbered Method Embodiment 3ABA. The method of Numbered Method Embodiment 3AB, wherein the illumination device illuminates the area with a repeating pattern of first and second frames; and wherein synchronizing (1420), prior to capture of the first and second images, the first camera with the illumination device illuminating said area includes: measuring the contrast of one or more images: adjusting the start time used to capture one or more additional images: measuring the contrast of the one or more additional images; and selecting an image capture start time which optimizes the contrast in individual captured images.

Numbered Method Embodiment 3AC. The method of Numbered Method Embodiment 3AB, further comprising: starting the exposure time used by the first camera to capture the first image at the start of illumination of the area with the first frame; and operating the first camera (C1 114) to capture the second image of the scene area following (e.g. immediately following) capture of the first image.

Numbered Method Embodiment 3AD. The method of Numbered Method Embodiment 2, wherein the method includes said step of operating the additional camera to capture an additional image of the illuminated area (1424) using an exposure time which is an integer multiple of the combined frame duration.

Numbered Method Embodiment 4. The method of Numbered Method Embodiment 1, wherein making (1432) a depth determination includes performing a structured light depth determination based on the pattern included in the first image. (In some cases the structured light depth determination is made based on the light pattern included in the captured image, e.g., based on the spacing between detected lines or points in the captured light pattern. This depth determination is done in some embodiments based on a single captured image without the need for the content of other captured images to be considered as in the case of stereoscopic depth determination).

Numbered Method Embodiment 5. The method of Numbered Method Embodiment 1, further comprising: operating a second camera (C2 116) to capture (1422B) a second image of the illuminated area at the same time the first camera (C1 114) captures (1422A) the first image (e.g., in some embodiments a plurality of cameras including the first camera (C1 114) and second camera (C2 116) are operated in a synchronized manner to capture images of the illuminated scene area (1240) from different camera positions); and wherein making a depth determination based on the first image includes making a stereoscopic depth determination based on both the first and second images.

Numbered Method Embodiment 6. The method of Numbered Method Embodiment 5, wherein the second camera (C2 116) uses a second exposure time which is a non-even multiple of the frame duration to capture the second image (note that as a result of using an exposure time which is not an even multiple of the frame duration and thus will differ from the combined frame duration P1+P2, the second image which will include a pattern due to patterned illumination of the scene area (1240)).

Numbered Method Embodiment 7. The method of Numbered Method Embodiment 6, wherein the first exposure time is less than or equal to the first frame time.

Numbered Method Embodiment 7A. The method of Numbered Method Embodiment 6, wherein the first exposure time is a non-integer multiple of the frame time, e.g., 1.5 times the frame time of the patterned illumination frame).

Numbered Method Embodiment 7B. The method of Numbered Method Embodiment 7, wherein the first exposure time used by the first camera (C1 114) to capture the first image and the second exposure time used by the second camera (C2 116) to capture the second image are the same and correspond to the interval of time with the first and second cameras capturing the first and second images in parallel for use in stereoscopic depth determinations.

Numbered Method Embodiment 8. The method of Numbered Method Embodiment 1, further comprising: controlling (2316) a start of an exposure used in the capture of the first image to align the start of the exposure with the start of one of said first and second frames (e.g., aligning the exposure and frame start times allows a pattern with the highest possible contrast to be captured when the time matches the frame time period, aligning the start of the exposure to either the start of the patterned illumination frame or concealing frame since both frames include a pattern and in the case where a single frame is captured pattern concealment will not occur).

Numbered Method Embodiment 9. The method of Numbered Method Embodiment 8, further comprising: prior to controlling the start of the exposure, electronically or wirelessly synchronizing (2304) the first camera (C1 114) with an illumination device (108) used to project said first and second frames to thereby illuminate the area (1240).

Numbered Method Embodiment 10. The method of Numbered Method Embodiment 8, prior to controlling the start of the exposure, synchronizing (2310) the first camera (C1 114) to the illumination device (108) based on processing of images captured by the first camera (C1 114).

Numbered Method Embodiment 11. The method of Numbered Method Embodiment 10 wherein synchronizing (2310) the first camera (C1 114) to the illumination device (108) based on processing of images captured by the first camera (C1 114) includes: adjusting (2311) image capture start time of the first camera (C1 114) to optimize the contrast of images captured by the first camera (C1 114).

Second List of Exemplary Numbered System Embodiments

Numbered Apparatus Embodiment 1. An system for use in an area illuminated with an illumination sequence of frames (2101) including a first illumination frame (IF1 2102) corresponding to a first illumination frame period (2130) and having a first light pattern followed by a first concealing frame (CF1 2104) having a second light pattern, the first illumination frame period (2130) having a first frame duration (P1), the first concealing frame (CF1 2104) having a second frame duration (P2), the second light pattern concealing the first light pattern when the illuminated area (1240) is observed over a duration corresponding to the combined period having a combined duration (CP) equal to the sum of the first and second frame durations (CP=P1+P2), comprising: a first camera (114); and a processor (202), the processor (202) being configured to: control the first camera (C1 114) to capture (1422A) a first image of the illuminated area (1240) using an exposure time which is different from said combined duration (CP), the captured first image including a light pattern due to the illumination of the illuminated area (1240); and make a depth determination (1432) based on the first image.

Numbered Apparatus Embodiment 1AA. The system of Numbered Apparatus Embodiment 1, wherein said first exposure time has a duration equal to the first duration (i.e., the duration of a first illumination frame).

Numbered Apparatus Embodiment 1BB. The system of Numbered Apparatus Embodiment 1AA, wherein said first exposure time (e.g., E1 2140) is aligned to begin with beginning of the first illumination frame period (2130). (In some embodiments synchronization is used to align exposure with a frame boundary and an entire frame is then captured.)

Numbered Apparatus Embodiment 1BC. The system of Numbered Apparatus Embodiment 1, wherein said first illumination frame (IF1 2102) and the first concealing frame (CF1 2104) have the same duration (P1=P2) and wherein the exposure time is aligned to begin with the start of one of the first illumination frame period (2130) or the start of first concealing frame period (2132).

Numbered Apparatus Embodiment 1A. The system of Numbered Apparatus Embodiment 1, wherein the processor (202) is further configured to: control (1436) a machine (e.g., vehicle, robotic device, sorting machine such as a sorting machine used for quality control purpose) based on the determined depth to one or more objects in said first image (where in the case of multiple objects the depths to different objects can be and sometimes are different).

Numbered Apparatus Embodiment 2. The system of Numbered Apparatus Embodiment 1, wherein the processor is further configured to: produce (1423) an additional image of the illuminated area (1240) which does not include said first light pattern by: i) controlling an additional camera (e.g., C3 174 or C4 176) (e.g., an additional camera that is used to capture non-patterned images of the scene area) to capture the additional image of the illuminated area (1240), using an exposure time which is an integer multiple of the combined frame duration: ii) combining first and second images captured by said first camera or an additional camera (C2 116, C3 174 or C4 176), (note that normally the images being combined will be from the same camera), said first image corresponding to a first exposure frame time and said second image corresponding to a second exposure frame time that follows (e.g., immediately follows in most cases) said first exposure frame time, or iii) controlling the first camera (C1 114) to capture the additional image of the illuminated area (1240) using an exposure time which is an integer multiple of the combined frame duration.

Numbered Apparatus Embodiment 3. The system of Numbered Apparatus Embodiment 2, further comprising: a storage device (204) that stores (1430) the additional image which does not include an illumination pattern; and wherein the processor (202) is further configured to: perform (1433) a model training operation, using the additional image, (e.g., a 2D model training operation based on non-patterned images of an object) to train a model (e.g., a 2 D model) to recognize an object in the additional image.

Numbered Apparatus Embodiment 3A. The system of Numbered Apparatus Embodiment 2, wherein said first and second light patterns are not visible in said additional image.

Numbered Apparatus Embodiment 3AB. The system of Numbered Apparatus Embodiment 2, wherein the processor (202) is configured to combine first and second images captured by said first camera (C1 114) or an additional camera (C2 116, C3 174 or C4 176), said first image corresponding to a first exposure frame time and said second image corresponding to a second exposure frame time following (e.g. immediately following) said first exposure frame time; and wherein the processor 202 is further configured to: synchronize (1420), prior to capture of the first and second images, the first camera 114 with the illumination device 108 illuminating said area 1240 (e.g., based on a wired signal, wirelessly or based on the detecting the timing of the illumination frames projected by the illumination device).

Numbered Apparatus Embodiment 3ABA. The system of Numbered Apparatus Embodiment 3AB, wherein the illumination device illuminates the area with a repeating pattern of first and second frames; and wherein the processor (202) is configured, as part of being configured to synchronize the first camera 114 with the illumination device (108) to: measure the contrast of one or more images: adjust the start time used to capture one or more additional images: measure the contrast of the one or more additional images; and select an image capture start time which optimizes the contrast in individual captured images as part of synchronizing (1420) the first camera with the illumination device.

Numbered Apparatus Embodiment 3AC. The system of Numbered Apparatus Embodiment 3AB, wherein the processor 202 is further configured to: start the exposure time used by the first camera to capture the first image at the start of illumination of the area with the first frame; and control the first camera (C1 114) to capture the second image of the scene area following (e.g. immediately following) capture of the first image.

Numbered Apparatus Embodiment 3AD. The system of Numbered Apparatus Embodiment 2, wherein the processor is configured to control the additional camera to capture an additional image of the illuminated area (1424) using an exposure time which is an integer multiple of the combined frame duration.

Numbered Apparatus Embodiment 4. The system of Numbered Apparatus Embodiment 1, wherein the processor 202 is configured to perform a structured light depth determination based on the pattern included in the first image as part of making a depth determination.

Numbered Apparatus Embodiment 5. The system of Numbered Apparatus Embodiment 1, wherein the processor 202 is further configured to: control a second camera (C2 116) to capture (1422B) a second image of the illuminated area at the same time the first camera (C1 114) captures (1422A) the first image (e.g., in some embodiments a plurality of cameras including the first camera (C1 114) and second camera (C2 116) are operated in a synchronized manner to capture images of the illuminated scene area (1240) from different camera positions); and wherein the processor 202 is configured, as part of making a depth determination, to make a stereoscopic depth determination based on both the first and second images.

Numbered Apparatus Embodiment 6. The system of Numbered Apparatus Embodiment 5, wherein the processor 202 is configured to control the second camera (C2 116) to use a second exposure time which is a non-even multiple of the frame duration to capture the second image (note that as a result of using an exposure time which is not an even multiple of the frame duration and thus will differ from the combined frame duration P1+P2, the second image which will include a pattern due to patterned illumination of the scene area (1240)).

Numbered Apparatus Embodiment 7. The system of Numbered Apparatus Embodiment 6, wherein the first exposure time is less than or equal to the first frame time.

Numbered Apparatus Embodiment 7A. The system of Numbered Apparatus Embodiment 6, wherein the first exposure time is a non-integer multiple of the frame time, e.g., 1.5 times the frame time of the patterned illumination frame).

Numbered Apparatus Embodiment 7B. The system of Numbered Apparatus Embodiment 7, wherein the first exposure time used by the first camera (C1 114) to capture the first image and the second exposure time used by the second camera (C2 116) to capture the second image are the same and correspond to the interval of time with the first and second cameras capturing the first and second images in parallel for use in stereoscopic depth determinations.

Numbered Apparatus Embodiment 8. The system of Numbered Apparatus Embodiment 1, wherein the processor 202 is further configured to: control (2316) a start of an exposure used in the capture of the first image to align the start of the exposure with the start of one of said first and second frames (e.g., aligning the exposure and frame start times allows a pattern with the highest possible contrast to be captured when the time matches the frame time period, aligning the start of the exposure to either the start of the patterned illumination frame or concealing frame since both frames include a pattern and in the case where a single frame is captured pattern concealment will not occur).

Numbered Apparatus Embodiment 9. The system of Numbered Apparatus Embodiment 8, wherein the processor 202 is further configured to: synchronize (2304) the first camera (C1 114) with the illumination device (108) used to project first and second frames to thereby illuminate the area (1240).

Numbered Apparatus Embodiment 10. The system of Numbered Apparatus Embodiment 8, wherein the processor 202 is configured to synchronize (2310) the first camera (C1 114) to the illumination device (108) based on images captured by the first camera (C1 114).

Numbered Apparatus Embodiment 11. The system of Numbered Apparatus Embodiment 1, wherein the processor 202 is configured to: adjust (2311) image exposure start time of the first camera (C1 114) to optimize the contrast of images captured by the first camera (C1 114).

Third List of Exemplary Numbered Method Embodiments

Numbered Method Embodiment 1. A method of operating a system (104) including a light projection device (108), the method comprising: projecting (1410), from the light projection device (108), during a first period of time (2130), a first set (2102) of one or more images (e.g., where the first set includes a single image having the illumination pattern A in the case where the first set of images is projected as a stationary image for the first period of time or a set of sub-frames, e.g., including IF SF1 2112, IF SF2 2114, IF SF3 2116, IF S4 2118 in the case of a DLP embodiment that projects sub-frames which in combination produce the pattern A) to illuminate an area (1240), said first set of one or more images corresponding to a first pattern (e.g., illumination pattern A); and projecting (1412), from the light projection device (108), during a second period of time (2132) following said first period of time (2130), a second set (2104) of one or more images (e.g., a single image having the concealing pattern A' in the case of a stationary image being projected for the second period of time or in the case of a DLP embodiment a set of sub-frames CF SF1 2120, CF SF2 2122, CF SF3 2124, CF SF4 2126 which in combination produce the concealing pattern A'), said second set (2104) of one or more images corresponding to a second pattern, said second pattern (e.g. A') being a concealing pattern with respect to the first pattern (A).

Numbered Method Embodiment 1AA. The method of Numbered Method Embodiment 1, wherein said first set of one or more images (2102) includes multiple sub-frame images (IF SF1 2112, IF SF2 2114, IF SF3 2116, IF S4 2118) each of which is projected by the light projection device (108) for a different portion of said first period of time (2130), at least some, and in some embodiments all, of the first set of multiple sub-frame images being different images.

Numbered Method Embodiment 1AAA. The method of Numbered Method Embodiment 1AA, wherein the multiple sub-frame images (IF SF1 2112, IF SF2 2114, IF SF3 2116, IF S4 2118) in said first set of one or more images (2102) are displayed during said first period (2130) of time for the same or different amounts of time (e.g., each image in the first set of multiple sub-frame images may be displayed for the same fraction of the first period (2130) of time or they can be displayed for different fractions of the first period of time (2130)).

Numbered Method Embodiment 1A. The method of Numbered Method Embodiment 1, wherein said first set of one or more images includes a first image (2102) which is displayed by the light projection device (108) for the entire first period of time (2130).

Numbered Method Embodiment 1B. The method of Numbered Method Embodiment 1A, wherein said second set of one or more images includes a single second image (2104) which is displayed by the light projection device for the entire second period of time (2132).

Numbered Method Embodiment 1AB. The method of Numbered Method Embodiment 1AA, wherein said second set of one or more images (2104) includes a second set of multiple sub-frame images (CF SF1 2120, CF SF2 2122, CF SF3 2124, CF SF4 2126) each of which is projected by the light projection device (108) for a different portion of said second period of time 2132, at least some (but possibly all) of the first set of multiple images (CF SF1 2120, CF SF2 2122, CF SF3 2124, CF SF4 2126) being different images.

Numbered Method Embodiment 1ABA. The method of Numbered Method Embodiment 1AB, wherein the multiple sub-frame images (CF SF1 2120, CF SF2 2122, CF SF3 2124, CF SF4 2126) in said second set of one or more images (2104) are displayed during said second period of time (2132) for the same or different amounts of time (e.g., each image in the second set of multiple images may be displayed for the same fraction of the second period of time or they can be displayed for different fractions of the second period of time).

Numbered Method Embodiment 1C. The method of Numbered Method Embodiment 1, wherein the first (2130) and second (2132) periods of time are the same and correspond to a frame time of 1/60th of a second or less.

Numbered Method Embodiment 1D. The method of Numbered Method Embodiment 1, wherein the first (2130) and second (2132) periods of time are different in duration, but with at least one of the first (2130) and second (2132) periods of time having a duration of 1/60th of a second or less.

Numbered Method Embodiment 1E. The method of Numbered Method Embodiment 1, wherein said first set (2102) of one or more images and the second set of one or more images are complementary sets of images.

Numbered Method Embodiment IF. The method of Numbered Method Embodiment 1, wherein said first pattern (A) and said second pattern (A') are inverses of each other.

Numbered Method Embodiment 2. The method of Numbered Method Embodiment 1, wherein said steps of projecting (1410) said first set (2102) of one or more images and projecting (1412) said second set (2104) of one or more images is performed as part of projecting (1408) an image sequence (2101) including repeating periods of time ((2130, 2132), (2130', 2132')) in which said first and second sets of one or more images are projected.

Numbered Method Embodiment 3. The method of Numbered Method Embodiment 2, wherein projecting of the first set of one or more images and projecting the second set of one or more images is performed using visible light.

Numbered Method Embodiment 4. The method of Numbered Method Embodiment 2, wherein said first set of one or more images (2102) and said second set of one or more images (2104), through repeated consecutive display of the first (2102) and second (2104) sets of one or more images, provide uniform illumination.

Numbered Method Embodiment 5. The method of Numbered Method Embodiment 1, further comprising: repeating the steps of projecting (1410) the first set (2102) of one or more images and projecting (1412) the second set (2104) of one or more images at predetermined recurring time intervals.

Numbered Method Embodiment 6. The method of Numbered Method Embodiment 5, wherein the projecting (1410) the first set (2102) of one or more images and projecting (1412) the second image set (2104) of one or more images at predetermined recurring intervals includes projecting the first set (2102) of one or more images and second set (2104) of one or more images as interleaved image sequences with the second set (2104) of one or more images being projected immediately following said first set (2102) of one or more images to form a repeating sequence.

Numbered Method Embodiment 7. The method of Numbered Method Embodiment 6, wherein said first period of time (2130) corresponds to a first frame duration; and wherein repeating the step of projecting the first set (2102) of one or more images includes projecting the first set (2102) of one or more images at an even integer multiple of said first frame duration.

Numbered Method Embodiment 8. The method of Numbered Method Embodiment 7, wherein said second period of time (2132) corresponds to a second frame duration which is equal in length to the first frame duration; and wherein repeating the step of projecting the second set (2104) of one or more images includes projecting the second set (2104) of one or more images at an even multiple of said first frame duration.

Third List of Exemplary Numbered System Embodiments

Numbered System Embodiment 1. A system (104) comprising: a light projection device (108): a memory (204); and a processor configured to controlling the light projection device to: project (1410), from the light projection device (108), during a first period of time (2130), a first set (2102) of one or more images (e.g., where the first set includes a single image having the illumination pattern A in the case where the first set of images is projected as a stationary image for the first period of time or a set of sub-frames, e.g., including IF SF1 2112, IF SF2 2114, IF SF3 2116, IF S4 2118 in the case of a DLP embodiment that projects sub-frames which in combination produce the pattern A) to illuminate an area (1240), said first set of one or more images corresponding to a first pattern (e.g., illumination pattern A); and project (1412), from the light projection device (108), during a second period of time (2132) following said first period of time (2130), a second set (2104) of one or more images (e.g., a single image having the concealing pattern A' in the case of a stationary image being projected for the second period of time or in the case of a DLP embodiment a set of sub-frames CF SF1 2120, CF SF2 2122, CF SF3 2124, CF SF4 2126 which in combination produce the concealing pattern A'), said second set (2104) of one or more images corresponding to a second pattern, said second pattern (e.g. A') being a concealing pattern with respect to the first pattern (A).

Numbered System Embodiment 2. The system of Numbered System Embodiment 1, wherein the processor (202) is configured to control the light projection device 108 to project (1410) said first set (2102) of one or more images and project (1412) said second set (2104) of one or more images as part of projecting (1408) an image sequence (2101) including repeating periods of time ((2130, 2132), (2130', 2132')) in which said first and second sets of one or more images are projected.

Numbered System Embodiment 3. The system of Numbered System Embodiment 2, wherein the light projection device is a visible light projector.

Numbered System Embodiment 4. The system of Numbered System Embodiment 2, wherein said first set (2102) of one or more images and the second set of one or more images are complementary sets of images.

Numbered System Embodiment 5. The system of Numbered System Embodiment 2, wherein said first set of one or more images includes a first image (2102) which is displayed by the light projection device (108) for the entire first period of time (2130); and wherein said second set of one or more images includes a single second image (2104) which is displayed by the light projection device for the entire second period of time (2132).

Numbered System Embodiment 6. The system of Numbered System Embodiment 1, wherein said first set of one or more images (2102) includes multiple sub-frame images (IF SF1 2112, IF SF2 2114, IF SF3 2116, IF S4 2118) each of which is projected by the light projection device (108) for a different portion of said first period of time (2130), at least some, and in some embodiments all, of the first set of multiple sub-frame images being different images.

Numbered System Embodiment 7. The system of Numbered System Embodiment 6, wherein said second set of one or more images (2104) includes a second set of multiple sub-frame images (CF SF1 2120, CF SF2 2122, CF SF3 2124, CF SF4 2126) each of which is projected by the light projection device (108) for a different portion of said second period of time 2132, at least some (but possibly all) of the first set of multiple images (CF SF1 2120, CF SF2 2122, CF SF3 2124, CF SF4 2126) being different images.

Numbered System Embodiment 8. The system of Numbered System Embodiment 2, wherein said first set of one or more images (2102) and said second set of one or more images (2104), through repeated consecutive display of the first (2102) and second (2104) sets of one or more images, provide uniform illumination.

Numbered System Embodiment 9. The system of Numbered System Embodiment 1, wherein the processor 202 is further configured to control the illumination device 108 to: repeatedly project (1410) the first set (2102) of one or more images and the second set (2104) of one or more images at predetermined recurring time intervals.

Numbered System Embodiment 10. The system of Numbered System Embodiment 9, wherein the projecting (1410) the first set (2102) of one or more images and projecting (1412) the second image set (2104) of one or more images at predetermined recurring intervals includes projecting the first set (2102) of one or more images and second set (2104) of one or more images as interleaved image sequences with the second set (2104) of one or more images being projected immediately following said first set (2102) of one or more images to form a repeating sequence.

Numbered System Embodiment 11. The system of Numbered System Embodiment 10, wherein said first period of time (2130) corresponds to a first frame duration; and wherein repeating the step of projecting the first set (2102)

of one or more images includes projecting the first set (2102) of one or more images at an even integer multiple of said first frame duration.

Numbered System Embodiment 12. The system of Numbered System Embodiment 7, wherein said second period of time (2132) corresponds to a second frame duration which is equal in length to the first frame duration; and wherein repeating the step of projecting the second set (2104) of one or more images includes projecting the second set (2104) of one or more images at an even multiple of said first frame duration.

Numbered List of Exemplary Non-Transitory Machine Readable Embodiments

Non-transitory machine readable embodiment 1. A non-transitory machine readable medium including processor executable instructions which when executed by a processor of an apparatus including a light projection device causes the processor to control the light projection device to: project (1410), from the light projection device (108), during a first period of time (2130), a first set (2102) of one or more images (e.g., where the first set includes a single image having the illumination pattern A in the case where the first set of images is projected as a stationary image for the first period of time or a set of sub-frames, e.g., including IF SF1 2112, IF SF2 2114, IF SF3 2116, IF S4 2118 in the case of a DLP embodiment that projects sub-frames which in combination produce the pattern A) to illuminate an area (1240), said first set of one or more images corresponding to a first pattern (e.g., illumination pattern A); and project (1412), from the light projection device (108), during a second period of time (2132) following said first period of time (2130), a second set (2104) of one or more images (e.g., a single image having the concealing pattern A' in the case of a stationary image being projected for the second period of time or in the case of a DLP embodiment a set of sub-frames CF SF1 2120, CF SF2 2122, CF SF3 2124, CF SF4 2126 which in combination produce the concealing pattern A'), said second set (2104) of one or more images corresponding to a second pattern, said second pattern (e.g. A') being a concealing pattern with respect to the first pattern (A).

Non-transitory machine readable embodiment 2. A non-transitory machine readable medium including processor executable instructions which when executed by a processor control the capture and use of one or more images in an area illuminated with an illumination sequence of frames including a first illumination frame corresponding to a first illumination frame period having a first light pattern followed by a first concealing frame having a second light pattern, the first illumination frame period having a first frame duration, the first concealing frame having a second frame duration, the second light pattern concealing the first light pattern when the illuminated area is observed over a duration corresponding to the combined period having a combined duration equal to the sum of the first and second frame durations, the processor, as part of controlling the capture and use of one or more image performing the steps of: controlling a first camera to capture a first image of the illuminated area using an exposure time which is different from said combined duration, the captured first image including a light pattern due to the illumination of the illuminated area; and making a depth determination based on the first image.

Various features and embodiments relate to capturing a single image with a pattern in it due to the use of a patterned illumination light source where a first patterned frame is projected from an illumination source followed by a concealing frame, e.g., with an inverse pattern, to conceal the pattern first frame. Each frame may be formed from one or more sub-frames which in combination result in the overall pattern of the first frame being observed but potentially with different patterns being displayed in subframes to contribute to forming the overall frame. The illumination source may be, and sometimes is, a digital light projector (DLP) with a frame rate of 60 frames per second or faster, with a frame time of 1/60th of a second being used in some embodiments for each of the patterned frame and corresponding concealing frame. In various embodiments the first and second frames have the same frame time (FT) also sometimes referred to as a frame duration. In one such embodiment an image capture exposure time which is a non-even multiple of the frame time/frame duration is used to capture an image including an illumination pattern. The non-even multiple of the frame time which is used as the exposure time is 1, in the case of some embodiments, where the camera is synchronized with the illumination source, e.g., to maximize the image pattern captured due to the pattern of the illumination light source. Non-patterned images are captured in one such embodiment using a camera using an exposure time which is an even integer multiple of the frame time/duration. By using an exposure time which is an even integer multiple of the frame period both an illumination frame and concealing frame will be captured during the exposure time resulting it the illumination pattern being concealed and thus not visible in the captured image. The light projector 108 used for illumination in some cases is a digital light projector which projects multiple subframes during a frame period to output a frame having the illumination pattern with the composite of the subframe images resulting in the intended illumination frame pattern.

In some embodiments a non-patterned image is generated from two captured patterned images which are captured by a first camera. In one such embodiment the first camera is synchronized with the illumination device 108 and thus the illumination of the area 1240 by first and second illumination frames. Synchronization can be via an electrical or wireless connection between the illumination device/projector 108 and cameras 114, 116, 174, 176 used to capture images but in many cases is based on the captured images and adjustment of the capture start time is based on image analysis, e.g., to maximize the contrast in captured images. This reflects the fact that the visible illumination pattern in an image when it is clearly visible will result in a higher overall image contrast than in the case where the illumination pattern is not clearly visible in a captured image. In some embodiments, capture of the first image starts at the start of a first illumination frame (e.g., after synchronization is achieved). Capture of a second image which is to be combined with the first image to form a non-patterned images starts at the start of a second concealing illumination frame. When combined the image generated by the first and second images will not include a visible illumination pattern since the concealing frame serves to hide the illumination pattern of the first illumination frame.

In some embodiments contrast measurements, adjusting the start time of exposure times used in capturing images, e.g., to optimize the contrast of captured images, is used to achieve camera synchronization with the illumination device 108. This is possible since the pattern will be most visible when the image capture (e.g., exposure) start time is aligned with the start time of frames used to illuminate the area leading to higher image contrast when image capture is synchronized with the illumination timing. This allows for synchronization with the illumination device based on the processing of captured images and adjustment of the image capture start time without the need for direct communication between the illumination device and image capture devices, e.g., cameras 114, 116,174, 176.

In some embodiments capture of a non-pattern image is performed by an additional camera 174 or 176 or one of the cameras 114, 116 used for stereoscopic image capture rather than generate a non-pattern image from two captured images which include a pattern.

The invention is not limited to stereoscopic depth determination and can be used where a structured light depth determination is made based on a pattern, e.g., visible light pattern, included in a captured image.

In the case of stereoscopic depth determination multiple cameras C1 114 and C2 116 are used to capture images including a visible illumination pattern and the images are then used in performing stereoscopic depth determinations.

While in many embodiments exposure times are controlled to be integer multiples of the frame time, any non-even integer multiple of a frame time can and sometimes is used to capture an image which will include a visible illumination pattern which can be useful for stereoscopic depth determination even if it is not the displayed illumination pattern. Using non-integer multiple of the frame time to capture images including a visible illumination pattern can be and sometimes is used, e.g., when synchronization with the illumination device is not implemented or sup In some embodiments synchronization of one or more cameras 114, 116, 174, 176 is achieved with the illumination device 108 based on signals received, e.g., by the processor 202 controlling image capture or by the individual cameras, from the illumination device 108, e.g., projector), wireless signals received by the cameras from the illumination device 108 or by processing captured images and adjusting the capture start time based on a characteristics of the captured images, e.g., contract of individual images. In some cases synchronization is achieved by adjusting the start time of image capture to maximize the contrast of individual captured images which is likely to be high when the illumination pattern is clearly visible due to synchronization between camera exposure times used to capture images and illumination frame times. The duration of a frame maybe and sometimes is predetermined and known while in other cases the duration of illumination and concealing frames is detected by the processor 202 based on captured images and how frequently the content of captured images changes.

In one exemplary method of capturing images an area 1240 is illuminated with an illumination sequence of frames including a first illumination frame corresponding to a first illumination frame period (where in some embodiments the first illumination frame (IF) includes one or more illumination sub-frames/images (IFSFs) which are displayed during different portions of the first frame period) having a first light pattern (e.g., a pattern which is the result of aggregating light from the different IFSFs in the case where a sequence of sub-frames is displayed during the first frame period) followed by a first concealing frame having a second light pattern (e.g., a concealing pattern which is the result of aggregating light from the different concealing frame sub-frames (CFSFs) in the case where a sequence of sub-frames is displayed during the concealing frame period), the first illumination frame period having a first frame duration, the first concealing frame having a second frame duration, the second light pattern concealing the first light pattern when the illuminated area is observed over a duration corresponding to the combined period of the first and second frame durations (e.g., a contiguous time period corresponding to the sum of the first and second frame durations (called the combined frame duration), or an integer multiple thereof. In one such embodiment a processor 202 operates a first camera to capture a first image of the illuminated area using an exposure time which is different from said combined duration, the captured first image including a light pattern due to the illumination of the area; and then makes a depth determination based on the first image (e.g., to determine the depth to one or more objects in the image where the depth may be from a reference camera to the object or some other reference point to the individual object or objects).

Numerous additional variations on the methods and apparatus of the present invention described above will be apparent to those skilled in the art in view of the above description of the invention.

Various features relate to methods and apparatus for illuminating an area by projecting image patterns that are well suited for facilitating depth determinations in a manner that is not distracting and with the projected image patterns often being imperceptible to a human observer.

In some cases, this involves projecting a first illumination pattern followed by projecting a second different illumination pattern, sometimes referred to as a concealing pattern, with each pattern being projected for a fraction of a second, e.g., 1/60th of a second or less.

The first illumination pattern and concealing pattern form a concealing image pair are sometimes referred to as a complimentary image pattern pair or complimentary images. In some embodiments complementary images are first and second images, i.e., a pair of images, where each of the complementary images is different from the other image in the image pair. In some but not necessarily all embodiments complementary images are images that, when pixels values corresponding to the same location but from different ones of the complementary images are added together, have a uniform intensity or have a locally uniform intensity While a camera or cameras can, and in some embodiments do, capture each pattern displayed as a sequence of illumination and concealing patterns separately, a human viewer interprets the patterns as a single composite image. By using a concealing pattern, which is complementary to the initially displayed illumination pattern, a human observer will observe uniform illumination of the scene area onto which the illumination pattern and concealing illumination pattern are projected.

By projecting a sequence of patterns and capturing one or more images of the patterns, images well suited for depth determination are obtained. The image or images captured during an illumination period corresponding to a frame display time, e.g., a 1/60 of a second, which is a period in which projection of a pattern occurs, are used to make depth determinations.

The determined depth to objects, e.g., as indicated relative to a reference camera or other fixed location relative to a camera, are used in one or more operations, e.g., machine control operations and/or 3D modeling operations. For example, the determined depth information can be, and sometimes is, used to control a robotic device, e.g., warehouse robot, to perform a pick operation, e.g., picking of an item from a rack, for shipment to a customer as part of an order. In another case, the depth information is used to control a machining operation or other operation, e.g., as part of a manufacturing operation. Other applications for depth information, generated in accordance with the invention, can include inspection of items for quality control and/or other reasons.

The individual illumination patterns, which are displayed sequentially for illumination purposes, will be interpreted by the human observer as a composite of the sequentially displayed patterns. A human observer will perceive the illumination as being uniform or at least locally uniform. Thus, the illumination process can be used safely in environments where humans are present without causing unwanted distractions. In fact, the illumination can even be effective in increasing work area safety by increasing the general illumination in an area.

In some embodiments one or more cameras, used to capture images, are synchronized based on an electrical or other signal, e.g., wireless signal, sent from the illumination device to the camera(s) used to capture images. This is to synchronize image capture time with the display of an individual image, thereby allowing the camera to capture images of the individual patterns displayed, with each captured image frame corresponding to a displayed image pattern once illumination device and camera device synchronization has been achieved. While electrical/wireless synchronization is used in some embodiments to synchronize illumination pattern display and image capture, in other embodiments images are captured, and the captured images are used to achieve camera synchronization with the display rate of the illumination device. For example, this is done in some embodiments by shifting image capture time, e.g., frame capture, so that the energy in each frame capture time, in which a pattern is displayed for depth determination purposes, is the same or approximately the same. Such an approach is well suited for embodiments where images used as illumination images display patterns which, in both the initial and subsequent concealing image, provide the same amount of illumination despite displaying very different patterns, e.g., with the concealing image being complementary to the initial image pattern displayed in the preceding frame in at least some embodiments.

In some cases, a non-patterned image, e.g., uniform image, is displayed between sets of patterned images intended to support depth determination purposes. The non-pattern image allows an image of objects in an area to be captured without a pattern being displayed on them as part of the illumination process. Images captured during a non-patterned illumination period can be, and sometimes are, stored for use in supporting objection recognition training operations where a non-patterned image is used. The non-patterned image can be, and sometimes is, associated with one or more corresponding patterned images. This allows depth information generated for an object, captured in a patterned image, to be correlated or otherwise associated with an image of the same object, captured in a non-patterned image captured during an illumination period in which a pattern is not displayed but illumination is still provided by the illumination device. In some embodiments the non-patterned image, e.g., uniform illumination image, is generated with the same overall average light output as an individual image used to display a pattern. Thus, on a per pixel basis, in some cases, each pixel of the non-patterned image is half as bright as the "on" pixels of a patterned image. This is because, in some cases, half of the pixels of a pattern image are "on". e.g., white, while the other half of the pixels of the pattern image are "off", e.g., black, while in the non-pattern image all the pixels are on but set at an image intensity, which is intended to result in the same overall light output of an image displaying a pattern, e.g., where only half the pixels are "on".

While the projected image patterns may be unobservable to a human viewer, they are useful in facilitating depth determinations because the patterns can be captured by one or more cameras in an area. Where the projected image pattern includes structured lines, e.g., a set of straight and/or curved lines, a single camera may be used to make depth determinations from one or more captured images. In the case of stereoscopic depth determinations, two or more cameras, at physically different locations, are often used to capture images with differences between the captured images being used to determine depth.

While line patterns can be displayed using the methods of the present invention in a way that is not easily perceived by a human, and thus in a manner that is not distracting to human observers, in many cases the displayed patterns are not line patterns but rather patterns which are more random in their nature. Such patterns, which appear random or pseudo random in nature, are particularly well suited for use in supporting stereoscopic depth determinations, where the displayed image patterns are captured by two or more cameras at the same time, and the images captured by the different cameras are used for stereoscopic depth determination purposes.

In various embodiments the illumination pattern and complementary pattern have one, more of all of the following features:

i. The patterns displayed as part of the illumination process are concealed to a human viewer when averaged over time.
ii. The individual image patterns displayed during individual illumination/frame display times have a texture pattern that makes it easier to match portions of an image pattern captured by different cameras to facilitate stereoscopic depth determination. For example, in one exemplary embodiment the texture includes a random noise pattern which has an impulsive autocorrelation function so that the pattern included in a displayed image produces a sharp minima in a cost function used in comparing image portions of different captured images which can lead to a more accurate and precise match between portions of different images as compared to when other image patterns are used for depth determination purposes.
iii. The pattern of an individual frame displayed for depth determination purposes has a gradient over the image for complexity reduction during matching of image portions of different captured images as part of stereoscopic depth determination. The gradient can be, and sometimes is, a gradient in the average local intensity values of one or more channels in the image where the channels can be, for example, color and/or luminance channels. In some embodiments the gradient direction in a pattern matches a stereo baseline orientation, e.g., horizontal or vertical, with in some embodiments, the illumination pattern of an image having a horizontal gradient. The gradient in some embodiments can repeat within an image pattern.

Some aspects and/or features are directed a non-transitory computer readable medium embodying a set of software instructions, e.g., computer executable instructions, for controlling a computer or other device, e.g., a vehicle or robotic device, to operate in accordance with the above discussed methods.

The techniques of various embodiments may be implemented using software, hardware and/or a combination of software and hardware. Various embodiments are directed to a control apparatus, e.g., controller or control system, which can be implemented using a microprocessor including a CPU, memory and one or more stored instructions for controlling a device or apparatus to implement one or more of the above described steps. Various embodiments are also directed to methods, e.g., a method of controlling a vehicle or drone or remote control station and/or performing one or more of the other operations described in the present application. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above, various features of the present invention are implemented using modules and/or components. Such modules and/or components may, and in some embodiments are, implemented as software modules and/or software components. In other embodiments the modules and/or components are implemented in hardware. In still other embodiments the modules and/or components are implemented using a combination of software and hardware. In some embodiments the modules and/or components are implemented as individual circuits with each module and/or component being implemented as a circuit for performing the function to which the module and/or component corresponds. A wide variety of embodiments are contemplated including some embodiments where different modules and/or components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a vehicle which implements one or more of the steps of the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method of capturing images of an area illuminated with an illumination sequence of frames including a first illumination frame corresponding to a first illumination frame period having a first light pattern and a first frame duration followed by a first concealing frame having a second light pattern and a second frame duration, the second light pattern concealing the first light pattern when an illuminated area is observed over a duration corresponding to a combined period having a combined duration equal to a sum of the first and second frame durations, the method comprising: operating a first camera to capture a first image of the illuminated area using an exposure time which is different from said combined duration, the captured first image including a light pattern due to the illumination of the illuminated area; operating a second camera to capture a second image of the illuminated area using said exposure time, said second camera being operated to capture the second image at the same time the first camera is being operated to capture the first image, said exposure time being a non-even multiple of the first frame duration and being different from said combined duration; and making a stereoscopic depth determination based on both the first and second images image.

2. The method of claim 1, wherein said first frame and the first concealing frame have the same duration and wherein the exposure time is aligned to begin with the start of one of the first frame or the start of the first concealing frame.

3. The method of claim 1, further comprising:

producing an additional image of the illuminated area which does not include said first light pattern, producing the additional image including at least one of:

i) operating an additional camera to capture the additional image of the illuminated area, using a second exposure time which is an integer multiple of the combined duration;

or ii) operating the first camera to capture the additional image of the illuminated area using the second exposure time which is an integer multiple of the combined duration.

4. The method of claim 3, further comprising:

storing the additional image; and performing a model training operation, said step of performing a model training operation including using the additional image to train a model to recognize an object in the additional image.

5. The method of claim 1, further comprising:

synchronizing, based on captured images, the first camera with an illumination device used to project the first frame and the first concealing frame.

6. The method of claim 1, wherein making the stereoscopic depth determination is based on a captured light pattern included in the first and second images.

7. The method of claim 1, wherein the first frame duration and second frame duration are the same.

8. The method of claim 7, wherein the non-even multiple of the frame duration is one, said exposure time being equal to the duration of the first and second frames.

9. The method of claim 1, wherein the first exposure time is less than or equal to the first frame duration.

10. The method of claim 1, wherein the exposure time is longer than the first frame duration.

11. The method of claim 1, further comprising:

controlling a start of an exposure used in the capture of the first image to align with the start of one of said first and second frames.

12. The method of claim 11, further comprising:

prior to controlling the start of the exposure used in the capture of the first image, electronically or wirelessly synchronizing the first camera with an illumination device used to project said first frame and the first concealing frame.

13. The method of claim 11, further comprising:

prior to controlling the start of the exposure used in the capture of the first image, synchronizing the first camera to the illumination device based on processing of images captured by the first camera.

14. The method of claim 1, further comprising:

adjusting an image capture start time of the first camera to optimize the contrast of images captured by the first camera.

15. A system for use in an area illuminated with an illumination sequence of frames including a first frame having a first light pattern and a first frame duration followed by a first concealing frame having a second light pattern and a second frame duration, the second light pattern concealing the first light pattern when an illuminated area is observed over a duration corresponding to a combined period having a combined duration equal to the sum of the first and second frame durations, the system comprising:

a first camera;

a second camera; and a processor, the processor being configured to:

control the first camera to capture a first image of the illuminated area using an exposure time which is different from said combined duration, the captured first image including a light pattern due to the illumination of the illuminated area;

control the second camera to capture a second image of the illuminated area using said exposure time, said second camera being operated to capture the second image at the same time the first camera is being operated to capture the first image, said exposure time being a non-even multiple of the first frame duration and being different from said combined duration; and make a stereoscopic depth determination based on both the first and the second images.

16. The system of claim 15, wherein the processor is further configured to:

produce an additional image of the illuminated area which does not include said first light pattern by: i) controlling an additional camera to capture the additional image of the illuminated area, using a second exposure time which is an integer multiple of the combined duration; or ii) controlling the first camera to capture the additional image of the illuminated area using the second exposure time which is an integer multiple of the combined duration.

17. The system of claim 16, further comprising:

a storage device that stores the additional image; and wherein the processor is further configured to:

use the additional image to train a model to recognize an object in the additional image.

18. The system of claim 15, wherein the non-even multiple of the frame duration is one, said exposure time being equal to the duration of the first frame.

19. The system of claim 15, wherein the exposure time is less than the first frame duration.

20. A non-transitory machine readable medium including processor executable instructions which when executed by a processor control the capture and use of one or more images in an area illuminated with an illumination sequence of frames including a first frame having a first light pattern and a first frame duration followed by a first concealing frame having a second light pattern and a second frame duration, the second light pattern concealing the first light pattern when an illuminated area is observed over a duration corresponding to a combined period having a combined duration equal to a sum of the first and second frame durations, the processor, as part of controlling the capture and use of one or more images performing the steps of:

controlling a first camera to capture a first image of the illuminated area using an exposure time which is different from said combined duration, the captured first image including a light pattern due to the illumination of the illuminated area;

controlling the second camera to capture a second image of the illuminated area using said exposure time, said second camera being operated to capture the second image at the same time the first camera is being operated to capture the first image, said exposure time being a non-even multiple of the first frame duration and being different from said combined duration; and making a stereoscopic depth determination based on the first and second images.

* * * * *